United States Patent
Kim et al.

(10) Patent No.: US 11,856,448 B2
(45) Date of Patent: *Dec. 26, 2023

(54) METHOD AND DEVICE FOR PROCESSING BUFFER STATUS REPORT ON BASIS OF NETWORK REQUEST IN NEXT GENERATION MOBILE COMMUNICATION SYSTEM

(71) Applicant: SAMSUNG ELECTRONICS CO., LTD., Suwon-si (KR)

(72) Inventors: Donggun Kim, Seoul (KR); Seungri Jin, Suwon-si (KR); Soenghun Kim, Suwon-si (KR); Alexander Sayenko, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/662,527

(22) Filed: May 9, 2022

(65) Prior Publication Data

US 2022/0264363 A1    Aug. 18, 2022

Related U.S. Application Data

(63) Continuation of application No. 16/622,902, filed as application No. PCT/KR2018/006709 on Jun. 14, 2018, now Pat. No. 11,330,462.

(30) Foreign Application Priority Data

Jun. 15, 2017 (KR) .................. 10-2017-0075941

(51) Int. Cl.
*H04W 28/02* (2009.01)
*H04W 28/06* (2009.01)
*H04W 80/02* (2009.01)

(52) U.S. Cl.
CPC ....... *H04W 28/0278* (2013.01); *H04W 28/06* (2013.01); *H04W 80/02* (2013.01)

(58) Field of Classification Search
CPC . H04W 28/0278; H04W 28/06; H04W 28/04; H04W 80/02; H04W 88/02; H04W 88/08; H04W 24/10; H04W 24/08
(Continued)

(56) References Cited

U.S. PATENT DOCUMENTS 8,902,741 B2 * 12/2014 Zhu ..................... H04L 1/1635
370/320
9,264,928 B2    2/2016 Liu et al.
(Continued)

FOREIGN PATENT DOCUMENTS

KR    10-2015-0034299 A    4/2015
KR    10-2015-0106401 A    9/2015
(Continued)

OTHER PUBLICATIONS

Supplementary European Search Report in connection with European Application No. 18816994.0 dated Apr. 7, 2020, 11 pages.
CMCC, et al., "Batch 1A: Update of MAC test case 7.1.4.6," R5-091551, 3GPP TSG RAN WG R5 Meeting #42bis, Seoul, Korea, Mar. 23-27, 2009, 8 pages.
(Continued)

*Primary Examiner* — Candal Elpenord

(57) ABSTRACT

According to the present invention, a method by which a terminal transmits a buffer status report (BSR) in a wireless communication system comprises the steps of: receiving, from a base station, a message including information for a BSR request; triggering the BSR on the basis of the information; and transmitting the BSR to the base station. The triggered BSR is a periodic BSR, and the triggering step causes a timer for the periodic BSR to expire. The information for a BSR request is indicated by a polling field included in a medium access control (MAC) sub-head.

16 Claims, 39 Drawing Sheets

(58) Field of Classification Search
USPC .................. 370/329–330, 229–230, 329–230
See application file for complete search history.

(56) References Cited

U.S. PATENT DOCUMENTS

| | | |
|---|---|---|
| 9,532,264 B2 | 12/2016 | Zhang et al. |
| 9,756,614 B2 | 9/2017 | Xu et al. |
| 2013/0100908 A1 | 4/2013 | Xu et al. |
| 2014/0198734 A1 | 7/2014 | Yamada et al. |
| 2014/0321371 A1 | 10/2014 | Anderson et al. |
| 2015/0043352 A1 | 2/2015 | Jang et al. |
| 2015/0071059 A1 | 3/2015 | Fu et al. |
| 2015/0282234 A1 | 10/2015 | Sartori et al. |
| 2016/0044734 A1 | 2/2016 | Park et al. |
| 2016/0234714 A1 | 8/2016 | Basu Mallick et al. |
| 2016/0374110 A1 | 12/2016 | Lee et al. |
| 2018/0324768 A1 | 11/2018 | Shaheen et al. |
| 2020/0092685 A1* | 3/2020 | Fehrenbach .......... H04W 36/18 |
| 2021/0014722 A1* | 1/2021 | Han .................. H04W 28/0268 |

FOREIGN PATENT DOCUMENTS

| | | | |
|---|---|---|---|
| KR | 10-2016-0136418 A | 11/2016 | |
| KR | 10-2018-0111413 A | 10/2018 | |
| WO | 2015142081 A1 | 9/2015 | |
| WO | 2015/144048 A1 | 10/2015 | |
| WO | 2016/163661 A1 | 10/2016 | |

OTHER PUBLICATIONS

NTT Docomo, Inc., "Buffer Status Report update when UE Tx buffer is not empty," R2-080457 (Resubmission), 3GPP TSG RAN WG2 #60bis, Sevilla, Spain, Jan. 14-18, 2008, 4 pages.

NTT Docomo, Inc., et al., "NW requested BSR for NR," R2-1704340 Resubmission of R2-1703167, 3GPP TSG-RAN WG2 Meeting 98, Hangzhou, China, May 15-19, 2017, 3 pages.

International Search Report dated Sep. 20, 2018 in connection with International Patent Application No. PCT/KR2018/006709, 3 pages.

Written Opinion of the International Searching Authority dated Sep. 20, 2018 in connection with International Patent Application No. PCT/KR2018/006709, 8 pages.

European Patent Office, "European Search Report", dated Feb. 24, 2021, in connection with European Patent Application No. 20205727. 9, 12 pages.

Intel Corporation (UK) Ltd: "Correction to LTE Test Case 8.6.1.3", 3GPP TSG-RAN5 Meeting #75, R5-172909 Hangzhou, CN, May 15, 2017-May 19, 2017, 11 pages.

3rd Generation Partnership Project; Technical Specification Group Radio Access Network; Evolved Universal Terrestrial Radio Access (E-UTRA); Layer 2—Measurements (Release 13), 3GPP TS 36.314, V13.1.0, Mar. 2016, 23 pages.

Korean Intellectual Property Office, "Office Action" dated Oct. 17, 2021, in connection with Korean Patent Application No. 10-2017-0075941, 8 pages.

European Search Report dated Nov. 8, 2023, in connection with European Patent Application No. 23188969.2, 12 pages.

\* cited by examiner

FIG. 1H
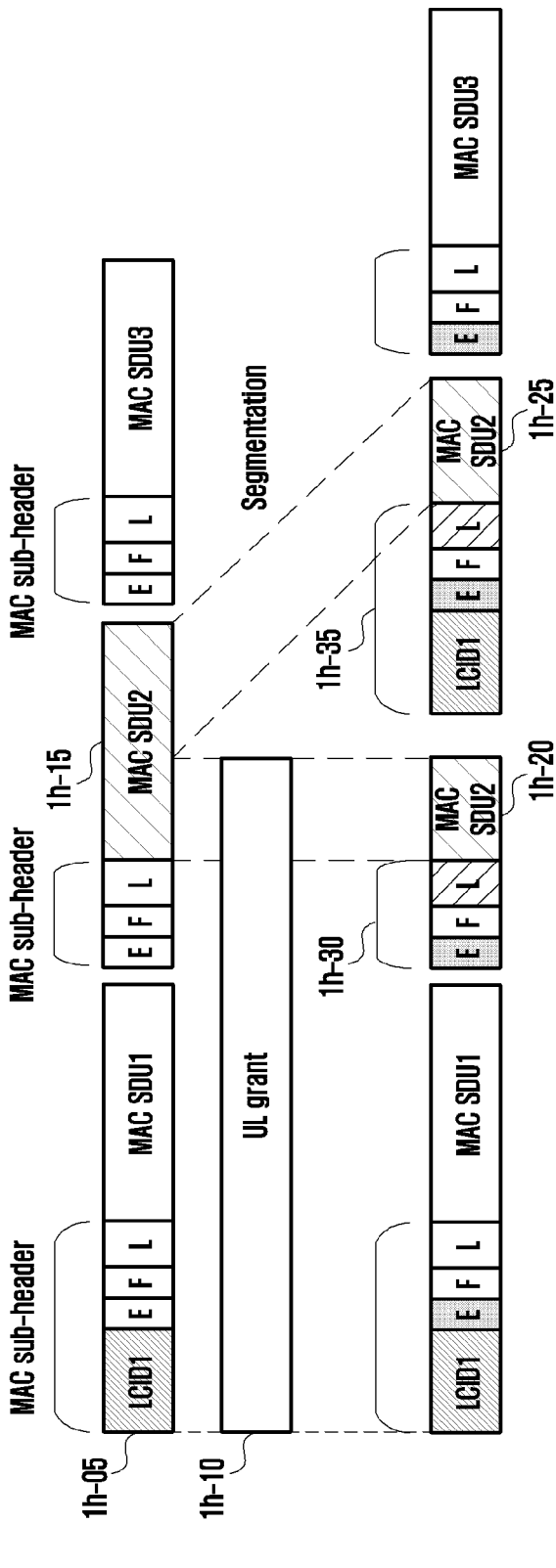
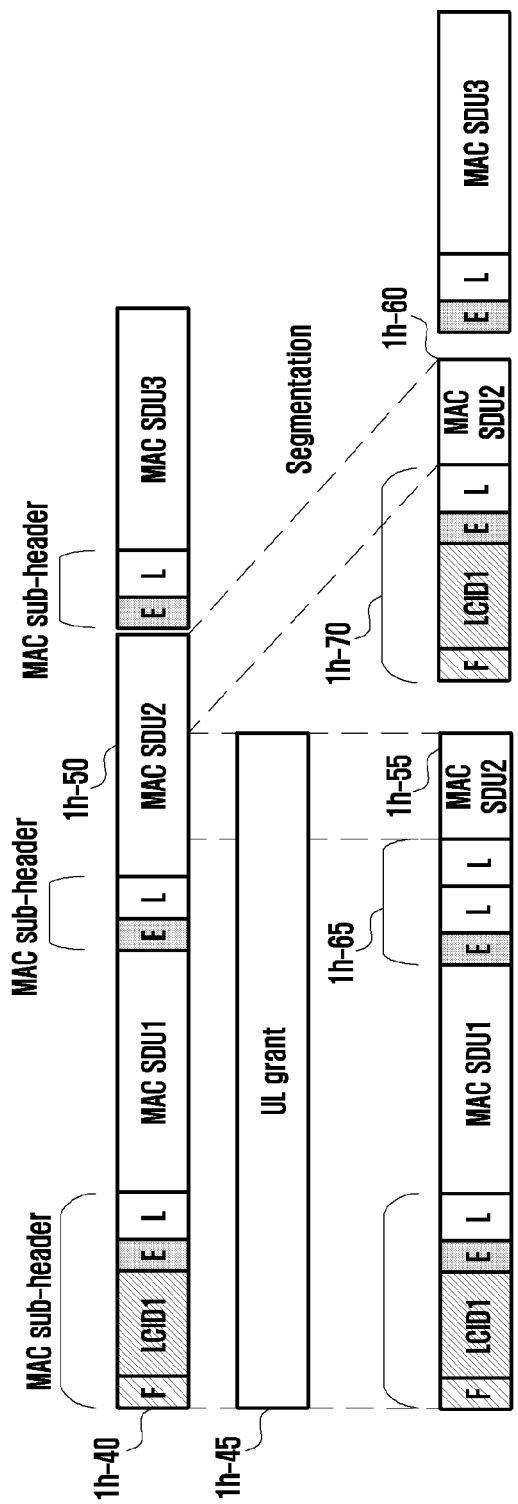

FIG. 2F
Poll bit for network request BSR within MAC sub-header
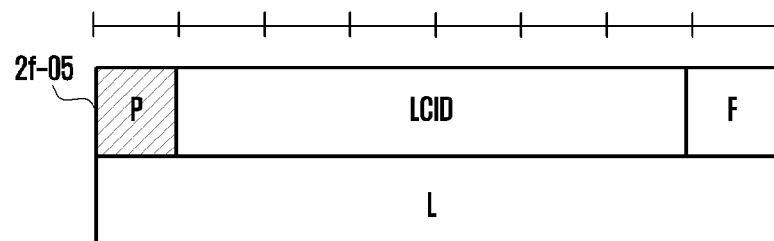
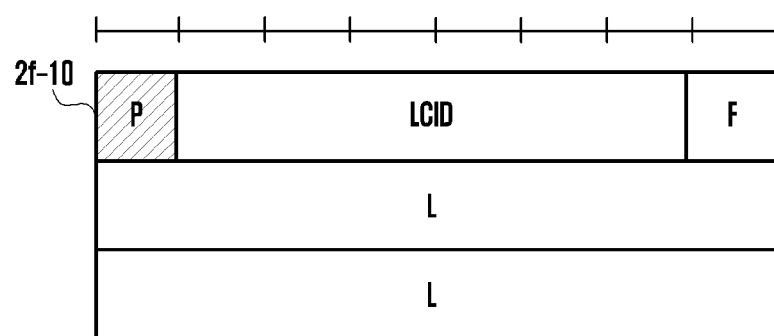

METHOD AND DEVICE FOR PROCESSING BUFFER STATUS REPORT ON BASIS OF NETWORK REQUEST IN NEXT GENERATION MOBILE COMMUNICATION SYSTEM

CROSS-REFERENCE TO RELATED APPLICATIONS

This application is a continuation of application Ser. No. 16/622,902, now U.S. Pat. No. 11,330,462 issued May 10, 2022, which is a 371 of International Application No. PCT/KR2018/006709 filed on Jun. 14, 2018, which claims priority to Korean Patent Application No. 10-2017-0075941 filed on Jun. 15, 2017, the disclosures of which are herein incorporated by reference in their entirety.

BACKGROUND

1. Field

The disclosure relates to a method and device for processing a network request-based buffer status report (BSR) in a next generation mobile communication system.

2. Description of Related Art

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post-LTE system. For this reason, the 5G communication system or the pre-5G communication system is referred to as a beyond 4G network communication system or a post-LTE system.

In order to achieve a high data transmission rate, implementation of the 5G communication system in a mmWave band (for example, 60 GHz band) is being considered. In the 5G communication system, technologies such as beamforming, massive MIMO, full dimensional MIMO (FD-MIMO), array antenna, analog beam-forming, and large scale antenna are being discussed as means to mitigate a propagation path loss in the mmWave band and increase a propagation transmission distance.

Further, the 5G communication system has developed technologies such as an evolved small cell, an advanced small cell, a cloud radio access network (RAN), an ultra-dense network, device to device communication (D2D), a wireless backhaul, a moving network, cooperative communication, coordinated multi-points (CoMP), and received interference cancellation to improve the system network.

In addition, the 5G system has resulted in the development of hybrid FSK and QAM modulation (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access technologies, and the like.

Meanwhile, the Internet has evolved to an Internet of Things (IoT) network in which distributed components, such as objects, exchange and process information from a human-oriented connection network in which humans generate and consume information. An Internet of Everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, machine-to-machine (M2M) communication, machine-type communication (MTC), and the like for connection between objects has recently been conducted. In an IoT environment, through collection and analysis of data generated in connected objects, an intelligent Internet technology (IT) service to create a new value for human life may be provided. The IoT may be applied to fields, such as smart homes, smart buildings, smart cities, smart cars, connected cars, smart grids, health care, smart home appliances, or high-tech medical service, through the convergence and combination of the conventional Information technology (IT) and various industries.

Accordingly, various attempts to apply the 5G communication to the IoT network are made. For example, the 5G communication technology, such as a sensor network, machine-to-machine (M2M) communication, and machine-type communication (MTC), has been implemented by a technique, such as beamforming, MIMO, and array antennas. The application of a cloud RAN as the big data processing technology may be an example of convergence of the 5G technology and the IoT technology.

Recently, research on a next generation mobile communication system is being actively conducted according to the development of communication systems. Accordingly, the demand for a data structure that can satisfy both a data transmission rate and a transmission delay is increasing day by day.

SUMMARY

An aspect of the disclosure is to devise a MAC sub-header structure that is advantageous for processing of a terminal and reducing overhead, in order to support a high data transmission rate and a low transmission delay in a next generation mobile communication system.

Another aspect of the disclosure is to propose a method for requesting a buffer status report to each terminal in order for a network to efficiently manage transmission resources in a next generation mobile communication system.

Still another aspect of the disclosure is to newly define a method for calculating a transmission delay time of an uplink data packet in a next generation mobile communication system, wherein if a terminal transmits corresponding information to a minimization of drive test (MDT) server, this enables a base station to use the information for future network operations. In LTE, an uplink PDCP packet delay time is measured for each QoS class identifier (QCI). However, in NR, because there is a change in a QoS structure, a new method for measuring an uplink PDCP packet delay is proposed.

A method of a transmission end according to an embodiment, for solving the above described problems, includes: generating a plurality of MAC SDUs corresponding to a logical channel; generating a plurality of MAC sub-headers for the plurality of MAC SDUs; and transmitting the MAC PDUs generated to include the plurality of MAC SDUs and the plurality of MAC sub-headers to a reception end, wherein a first MAC sub-header of the plurality of MAC sub-headers includes an LCID field, and the remaining MAC sub-headers of the plurality of MAC sub-headers do not include LCID fields.

According to another embodiment, LCID fields for the plurality of MAC SDUs corresponding to the logical channel may be included in only a MAC sub-header corresponding to a first MAC SDU of the plurality of MAC SDUs.

According to another embodiment, L fields indicating the lengths of the plurality of MAC SDUs corresponding to the logical channel may have the same length.

According to another embodiment, F fields indicating the lengths of the L fields may be included in only the first MAC sub-header of the plurality of MAC sub-headers.

A transmission end according to an embodiment, for solving the above described problems, includes: a transmission/reception unit configured to transmit and receive a signal; and a control unit configured to generate a plurality of MAC SDUs corresponding to a logical channel; generate a plurality of MAC sub-headers for the plurality of MAC SDUs; and transmit the MAC PDUs generated to include the plurality of MAC SDUs and the plurality of MAC sub-headers to a reception end, wherein a first MAC sub-header of the plurality of MAC sub-headers includes an LCID field, and the remaining MAC sub-headers of the plurality of MAC sub-headers do not include the LCID field.

A method of a terminal according to an embodiment, for solving the above described problems, includes: receiving, from a base station, a message including information for requesting of a buffer status report (BSR); triggering the BSR on the basis of the information; and transmitting the BSR to the base station.

According to another embodiment, the triggered BSR is a periodic BSR, and the triggering of the BSR may include expiring a timer for the periodic BSR.

According to another embodiment, the information for requesting of the BSR may be indicated by a polling field included in a medium access control (MAC) sub-header.

According to another embodiment, the information for requesting of the BSR may be indicated by a logical channel ID (LCID) included in a MAC control element (CE).

A method of a terminal according to an embodiment, for solving the above described problems, includes: a transmission/reception unit configured to transmit and receive a signal; and a control unit configured to receive, from a base station, a message including information for requesting of a buffer status report (BSR), trigger the BSR on the basis of the information, and transmit the BSR to the base station.

A method of a base station according to an embodiment, for solving the above described problems, includes: transmitting, to a terminal, a message including information for requesting of a buffer status report (BSR); and receiving, from the terminal, the BSR triggered on the basis of the information.

A base station according to an embodiment, for solving the above described problems, includes: a transmission/reception unit configured to transmit or receive a signal; and a control unit configured to transmit, to a terminal, a message including information for requesting of buffer status report (BSR), and receive, from the terminal, the BSR triggered on the basis of the information.

A method of a terminal according to an embodiment, for solving the above described problems, includes: receiving, from a base station, a message for configuring measurement of an uplink packet delay; measuring a packet delay specific to one or more QoS flows on the basis of the message; and transmitting information on the measured packet delay to the base station.

According to another embodiment, the message may include information indicating a QoS flow, for which a packet delay is to be measured, from among the QoS flows for the terminal, and information on a delay threshold value for each QoS flow, for which the packet delay is to be measured.

According to another embodiment, the packet delay may be measured as a time delay from a time at which a packet arrives in an SAP to a time at which the packet is delivered to a PHY layer.

According to another embodiment, the packet delay may be measured by an SDAP layer of the terminal.

A terminal according to an embodiment, for solving the above described problems, includes: a transmission/reception unit configured to transmit or receive a signal; and a control unit configured to receive, from a base station, a message for configuring measurement of an uplink packet delay, measure a packet delay specific to one or more QoS flows on the basis of the message, and transmit information on the measured packet delay to the base station.

A method of a base station according to an embodiment, for solving the above described problems, includes: transmitting, to a terminal, a message for configuring measurement of an uplink packet delay; and receiving, from the terminal, information on the packet delay measured specific to one or more QoS flows on the basis of the message.

A base station according to an embodiment, for solving the above described problems, includes: a transmission/reception unit configured to transmit and receive a signal; and a control unit configured to transmit, to a terminal, a message for configuring measurement of an uplink packet delay, and receive, from the terminal, information on the packet delay measured specific to one or more QoS flows on the basis of the message.

According to an embodiment of the disclosure, by proposing an efficient MAC sub-header structure in a next generation mobile communication system, it is possible to reduce overhead at data transmission and to efficiently perform data processing of a terminal.

According to another embodiment of the disclosure, by proposing a method for allowing a network to request a buffer status report from each terminal in the next mobile communication system, transmission resources of the network can be efficiently managed.

According to another embodiment of the disclosure, by informing a base station of a delay time taken from a time when a terminal receives a data packet to a time when the terminal actually transmits the data packet, for uplink data transmission in the next generation mobile communication system, the base station can identify a processing time and a traffic load in the terminal for each quality of service (QoS) flow or each data radio bearer (DRB), so that the traffic load and processing time can be used in distribution and coverage operations for the later time.

BRIEF DESCRIPTION OF THE DRAWINGS

FIG. 1H is a diagram illustrating an operation in consideration of data pre-processing when segmentation is performed in the (1-3)th embodiment of the MAC sub-header structure of the disclosure;

FIG. 2F is a diagram illustrating a (2-1)th embodiment of a method for requesting a buffer status report based on the network in the disclosure;

FIG. 3I is an overall diagram illustrating a method for measuring a delay of the uplink PDCP packet in the next generation mobile communication system proposed in the disclosure;

DETAILED DESCRIPTION

Figure 1A:
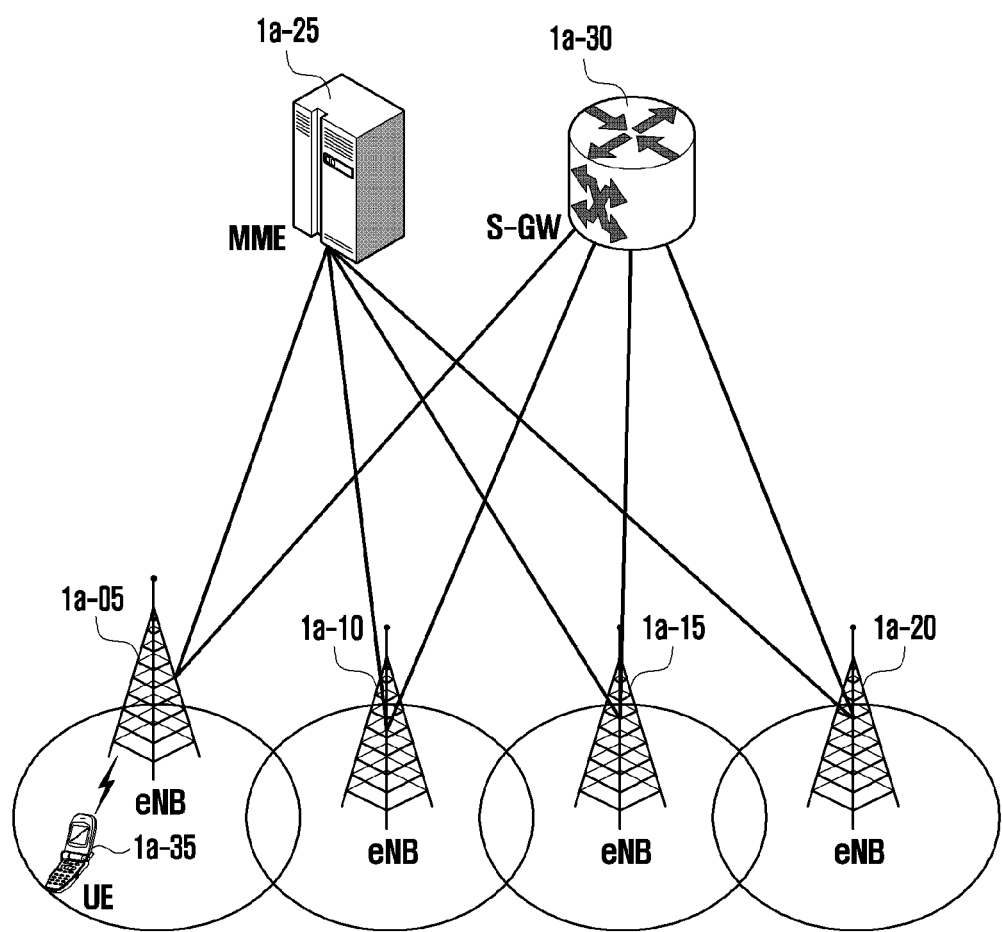
FIG. 1A is a diagram illustrating a structure of an LTE system to which the disclosure may be applied.

Hereinafter, the operating principle of the disclosure will be described in detail with reference to the accompanying drawings. In describing the disclosure below, a detailed description of related known configurations or functions incorporated herein will be omitted when it is determined that the detailed description thereof may unnecessarily obscure the subject matter of the disclosure. The terms which will be described below are terms defined in consideration of the functions in the disclosure, and may be different according to users, intentions of the users, or customs. Therefore, the definitions of the terms should be made based on the contents throughout the specification.

In describing the disclosure below, a detailed description of related known configurations or functions incorporated herein will be omitted when it is determined that the detailed description thereof may unnecessarily obscure the subject matter of the disclosure. Hereinafter, embodiments will be described with reference to the accompanying drawings.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Terms used for identifying a connection node, terms indicating network entities, terms indicating messages, terms indicating interfaces between network objects, terms indicating various identification information, etc. used in the following description are illustrated for convenience of explanation. Therefore, the disclosure may not be limited by the terminologies provided below, and other terms that indicate subjects having equivalent technical meanings may be used.

For convenience of description, the disclosure uses terms and names defined in a 3rd generation partnership project long term evolution (3GPP LTE). However, the disclosure is not limited by the above terms and names, and may be equally applied to systems conforming to other standards. In the disclosure, eNB may be used interchangeably with gNB for convenience of description. That is, a base station described as an eNB may represent a gNB.

First Embodiment

FIG. 1A is a diagram illustrating a structure of an LTE system to which the disclosure may be applied.

Referring to FIG. 1A, as illustrated, a radio access network in an LTE system includes next generation base stations (evolved node B, hereinafter, eNB, Node B or base station) 1a-05, 1a-10, 1a-15, and 1a-20, a mobility management entity (MME) 1a-25, and a serving-gateway (S-GW) 1a-30. A user terminal (user equipment, hereinafter, UE or terminal) 1a-35 accesses an external network through the eNBs 1a-05, 1a-10, 1a-15, and 1a-20 and the S-GW 1a-30.

In FIG. 1A, the eNBs 1a-05, 1a-10, 1a-15, and 1a-20 correspond to existing Node Bs of a UMTS system. The eNB is connected to the UE 1a-35 via a wireless channel and performs a more complicated role than an existing Node B. In the LTE system, because all user traffic including a real-time service, such as Voice over IP (VoIP) over the Internet protocol, is serviced through a shared channel, a device which collects state information, such as buffer states, available transmission power states, and channel states of UEs, to perform scheduling is necessary, and the eNBs 1a-05, 1a-10, 1a-15, and 1a-20 take charge of collecting the state information and performing scheduling. A single eNB typically controls a plurality of cells. For example, in order to implement a transmission rate of 100 Mbps, the LTE system uses an orthogonal frequency division multiplexing (hereinafter, referred to as OFDM) as a radio access technology in a bandwidth of 20 MHz. Further, an adaptive modulation & coding (AMC) scheme that determines a modulation scheme and a channel coding rate according to the channel state of the UE is applied. The S-GW 1a-30 is a device that provides a data bearer, and generates or removes the data bearer under a control of the MME 1a-25. The MME is a device that performs various control functions as well as a mobility management function for the terminal, and is connected to a plurality of base stations.

Figure 1B:
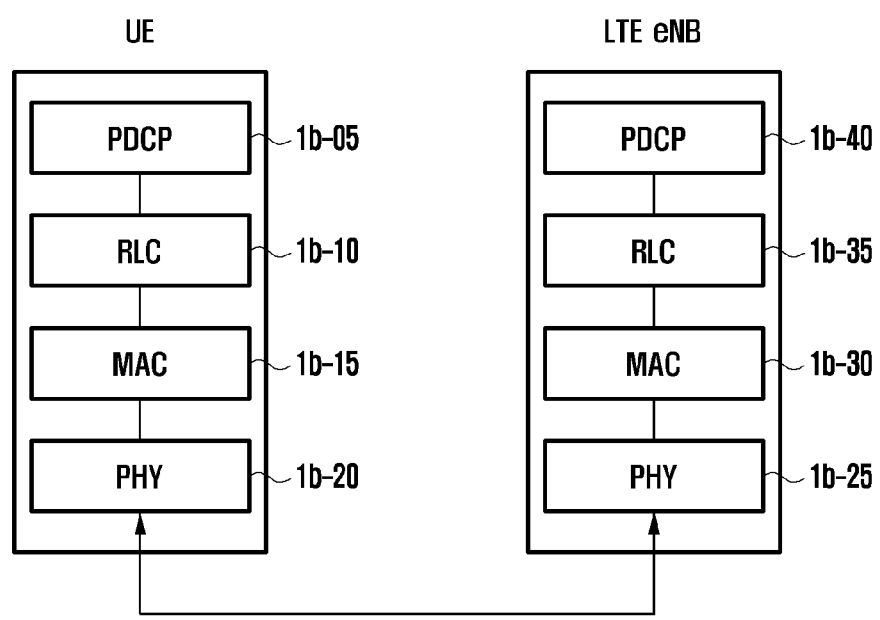
FIG. 1B is diagram illustrating a radio protocol structure in the LTE system to which the disclosure may be applied.

FIG. 1B is diagram illustrating a radio protocol structure in the LTE system to which the disclosure may be applied.

Referring to FIG. 1B, a radio protocol of the LTE system includes packet data convergence protocols (PDCPs) 1b-05 and 1b-40, radio link controls (RLCs) 1b-10 and 1b-35, and medium access controls (MACs) 1b-15 and 1b-30 in the terminal and the eNB, respectively. The packet data convergence protocols (PDCP) 1b-05 and 1b-40 are in charge of operations, such as IP header compression/restoration, and the like. Main functions of PDCP are summarized as follows.

a header compression and decompression function (ROHC only)
a user data transmission function (transfer of user data)
a sequential delivery function (in-sequence delivery of upper layer PDUs at PDCP re-establishment procedure for RLC AM)
a reordering function (for split bearers in DC (only support for RLC AM): PDCP PDU routing for transmission and PDCP PDU reordering for reception)
a duplicate detection function (duplicate detection of lower layer SDUs at PDCP re-establishment procedure for RLC AM)
a retransmission function (retransmission of PDCP SDUs at handover and, for split bearers in DC, of PDCP PDUs at PDCP data-recovery procedure, for RLC AM)
an encryption and decryption function (ciphering and deciphering)
a timer-based SDU delete function (timer-based SDU discard in uplink)

Radio link control (hereinafter, referred to as RLC) 1b-10 and 1b-35 reconfigures packet data units (PDCP PDUs) to appropriate sizes to perform ARQ operations. Main functions of the RLC are summarized as follows.

a data transmission function (transfer of upper layer PDUs)
an ARQ function (error correction through ARQ (only for AM data transfer))
a concatenation, segmentation, and reassembly function (concatenation, segmentation, and reassembly of RLC SDUs (only for UM and AM data transfer))
a re-segmentation function (re-segmentation of RLC data PDUs (only for AM data transfer))
a reordering function (reordering of RLC data PDUs (only for UM and AM data transfer)
a duplicate detection function (duplicate detection (only for UM and AM data transfer))
an error detection function (protocol error detection (only for AM data transfer))
an RLC SDU deletion function (RLC SDU discard (only for UM and AM data transfer))
an RLC re-establishment function (RLC re-establishment)

The MACs 1b-15 and 1b-30 are connected to multiple RLC layer devices included in one terminal, multiplex RLC protocol data units (MAC PDUs) to MAC PDUs, and demultiplex the RLC PDUs from the MAC PDUs. Main functions of the MAC are summarized as follows.

a mapping function (mapping between logical channels and transport channels)
a multiplexing and demultiplexing function (multiplexing/demultiplexing of MAC SDUs belonging to one or different logical channels into/from transport blocks (TB) delivered to/from the physical layer on transport channels)
a scheduling information reporting function (scheduling information reporting)
a HARQ function (error correction through HARQ)
a function of priority control between logical channels (priority handling between logical channels of one UE)
a function of priority control between terminals (priority handling between UEs by means of dynamic scheduling)

an MBMS service identification function (MBMS service identification)

a transmission format selection function (transport format selection)

a padding function (padding)

Physical layers 1b-20 and 1b-25 perform channel-coding and modulation of upper layer data, make the channel-coded and modulated upper layer data into OFDM symbols and transmit the OFDM symbols via a wireless channel, or demodulate and channel-decode the OFDM symbols received through the wireless channel and delivering the same to the upper layer.

Figure 1C:
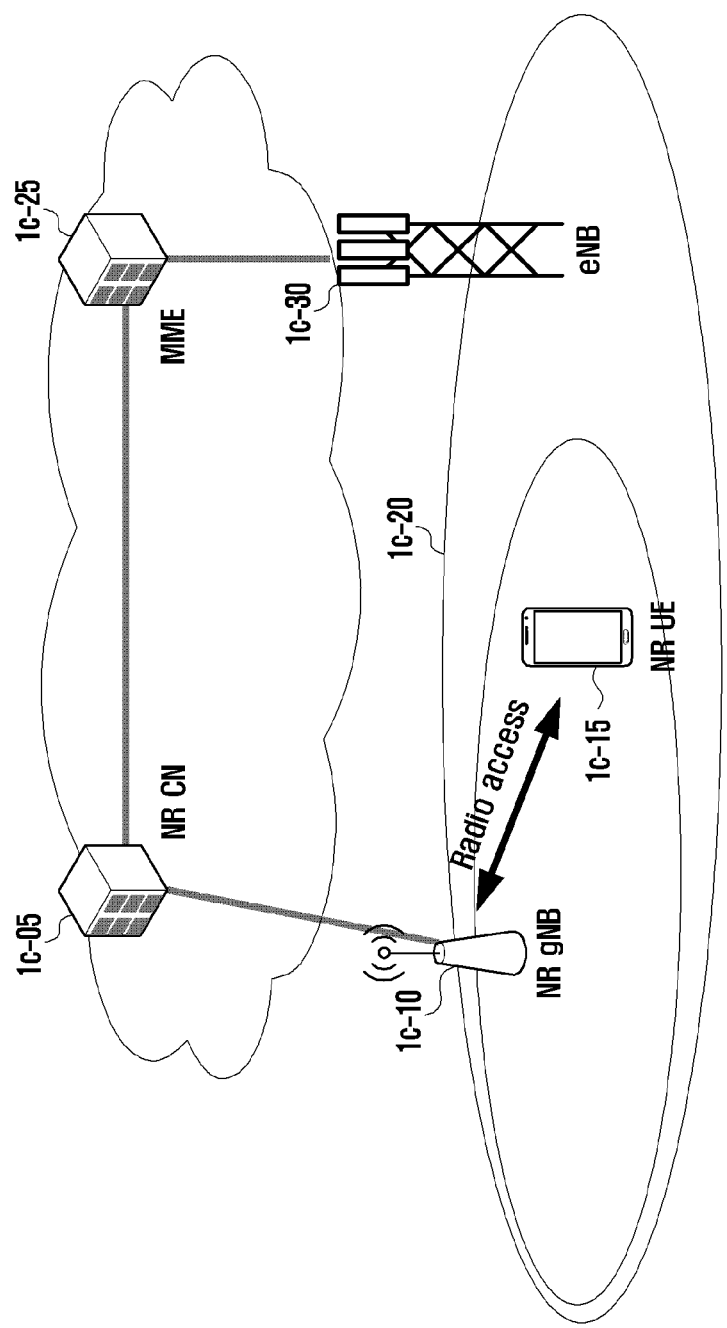
FIG. 1C is diagram illustrating a structure of a next generation mobile communication system to which the disclosure may be applied.

FIG. 1C is diagram illustrating a structure of a next generation mobile communication system to which the disclosure may be applied.

Referring to FIG. 1C, as illustrated, a radio access network of the next generation mobile communication system (hereinafter, NR or 5G) includes a next generation base station (new radio Node B, hereinafter, NR gNB or NR base station) 1c-10 and a new radio core network (NR CN) 1c-05. A user terminal (new radio user equipment, hereinafter, NR UE or terminal) 1c-15 accesses an external network through the NR gNB 1c-10 and the NR CN 1c-05.

In FIG. 1C, the NR gNB 1b-10 corresponds to the evolved Node B (eNB) of the conventional LTE system. The NR gNB is connected to the NR UE 1c-15 via a wireless channel, and may provide a more superior service than an existing node B. In the next generation mobile communication system, because all user traffic is serviced through a shared channel, a device which collects state information, such as buffer states, available transmission power states, and channel states of UEs, to perform scheduling is necessary, and the NR gNB 1c-10 takes charge of collecting the state information to perform scheduling. A single NR gNB typically controls a plurality of cells. In order to implement high-speed data transmission compared to the current LTE, an existing maximum bandwidth or more may be available, and orthogonal frequency division multiplexing (hereinafter, referred to as OFDM) may be used as a radio access technology to further combine a beamforming technology. Further, an adaptive modulation & coding (AMC) scheme that determines a modulation scheme and a channel coding rate according to the channel state of the terminal is applied. The NR CN 1c-05 performs functions, such as mobility support, bearer configuration, and QoS configuration. The NR CN is a device that performs various control functions as well as a mobility management function for the terminal, and is connected to a plurality of base stations. Further, the next generation mobile communication system may be linked to the conventional LTE system, and the NR CN is connected to the MME 1c-25 via a network interface. The MME is connected to the eNB 1c-30 that is an existing base station.

Figure 1D:
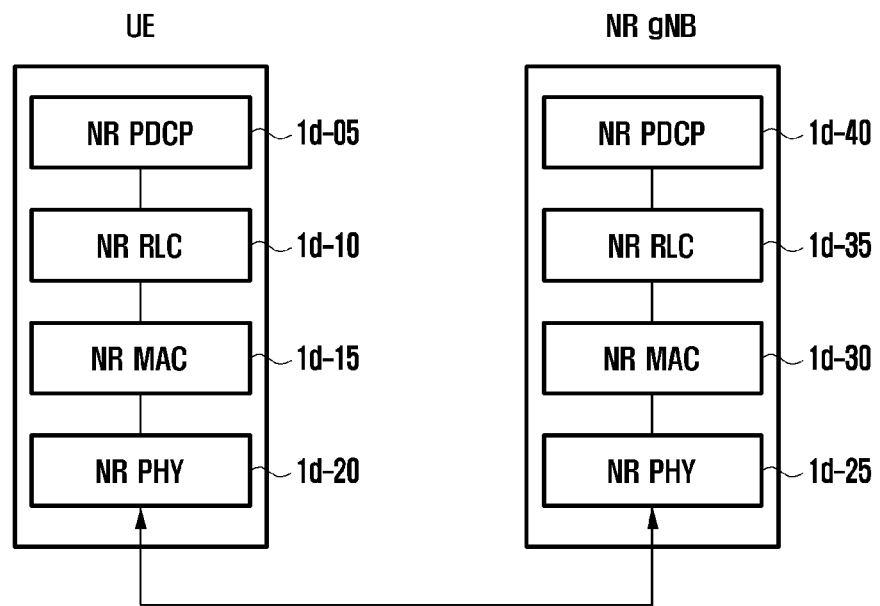
FIG. 1D is diagram illustrating a radio protocol structure of the next generation mobile communication system to which the disclosure may be applied.

FIG. 1D is diagram illustrating a radio protocol structure of a next generation mobile communication system to which the disclosure may be applied.

Referring to FIG. 1D, a radio protocol of the next generation mobile communication system includes NR PDCPs 1d-05 and 1d-40, NR RLCs 1d-10 and 1d-35, and NR MACs 1d-15 and 1d-30 in the terminal and the NR base station, respectively. Main functions of the NR PDCPs 1d-05 and 1d-40 may include a part of the following functions.

a header compression and decompression function (ROHC only)
a user data transmission function (transfer of user data)
a sequential delivery function (in-sequence delivery of upper layer PDUs)
a non-sequential delivery function (out-of-sequence delivery of upper layer PDUs)
a reordering function (PDCP PDU reordering for reception)
a duplicate detection function (duplicate detection of lower layer SDUs)
a retransmission function (retransmission of PDCP SDUs)
an encryption and decryption function (ciphering and deciphering)
a timer-based SDU delete function (timer-based SDU discard in uplink)

In the above, the reordering function of an NR PDCP device refers to a function of rearranging the order (reordering) of PDCP PDUs received in a lower layer, in the order based on PDCP sequence numbers (SN), may include a function of delivering data to an upper layer in the rearranged order or may include a function of directly delivering data without considering the order, may include a function of rearranging the order and recording lost PDCP PDUs, may include a function of reporting states of the lost PDCP PDUs to a transmission side, and may include a function of requesting to retransmit the lost PDCP PDUs.

Main functions of the NR RLCs 1d-10 and 1d-35 may include a part of the following functions.

a data transmission function (transfer of upper layer PDUs)
a sequential delivery function (in-sequence delivery of upper layer PDUs)
a non-sequential delivery function (out-of-sequence delivery of upper layer PDUs)
an ARQ function (error Correction through ARQ)
a concatenation, segmentation, and reassembly function (concatenation, segmentation, and reassembly of RLC SDUs)
a re-segmentation function (re-segmentation of RLC data PDUs)
a reordering function (reordering of RLC data PDUs)
a duplicate detection function (duplicate detection)
an error detection function (protocol error detection)
an RLC SDU deletion function (RLC SDU discard)
an RLC re-establishment function (RLC re-establishment)

In the above, the sequential delivery function (in-sequence delivery) of an NR RLC device refers to a function of delivering RLC service data units (SDUs) received from a lower layer to an upper layer in order, may include a function of, when an originally one RLC SDU is divided into a plurality of RLC SDUs and then received, reassembling and delivering the received RLC PDUs, may include a function of rearranging the received RLC PDUs on the basis of RLC sequence numbers (SNs) or PDCP sequence numbers (SNs), may include a function of rearranging the order and recording lost RLC PDUs, may include a function of reporting states of the lost RLC PDUs to a transmission side, may include a function of requesting to retransmit the lost RLC PDUs, may include a function of, when there is a lost RLC PDU, delivering only RLC SDUs before the lost RLC PDU to the upper layer in order. Alternatively, the sequential delivery function (in-sequence delivery) may include a function of, although there is the lost RLC SDU, if a predetermined timer has been expired, delivering all RLC SDUs received before starting of the timer to the upper layer in order, or may include a function of, although there is the lost RLC SDU, if the predetermined timer has been expired, delivering all RLC SDUs received up to the present time to the upper layer in order. In the above, the RLC PDUs may be processed in the order of reception thereof (in the order of arrival regardless of the order of the sequence numbers or serial numbers) and may be delivered to the PDCP device regardless of the order (out-of-sequence delivery). In the case of segments, segments stored in a buffer or to be received at a later time may be received, reconfigured into one complete RLC PDU, processed, and then may be delivered to the PDCP device. The NR RLC layer may not include a concatenation function, and the function may be performed in an NR MAC layer or may be replace with a multiplexing function of the NR MAC layer.

In the above, the non-sequential delivery function (out-of-sequence delivery) of the NR RLC device refers to a function of delivering RLC PDUs received from a lower layer to an immediate upper layer regardless of the order, may include a function of, when originally one RLC SDU is divided into a plurality of RLC SDUs and received, reassembling and delivering the received RLC SDUs, and may include a function of storing the RLC SN or PDCP SN of the received RLC SDUs, arranging the order thereof, and recording lost RLC SDUs.

The NR MAC 1d-15 or 1d-30 may be connected to multiple NR RLC layer devices included in one terminal, and main functions of the NR MAC may include a part of the following functions.

a mapping function (mapping between logical channels and transport channels)

a multiplexing and demultiplexing function (multiplexing/demultiplexing of MAC SDUs)

a scheduling information reporting function (scheduling information reporting)

a HARQ function (error correction through HARQ)

a function of priority control between logical channels (priority handling between logical channels of one UE)

a function of priority control between terminals (priority handling between UEs by means of dynamic scheduling)

an MBMS service identification function (MBMS service identification)

a transmission format selection function (transport format selection)

a padding function (padding)

NR PHY layers 1d-20 and 1d-25 may perform channel-coding and modulation of upper layer data, making the channel-coded and modulated upper layer data into OFDM symbols and transmitting the OFDM symbols via a wireless channel, or demodulating and channel-decoding the OFDM symbols received through the wireless channel and delivering the same to the upper layer.

Figure 1E:
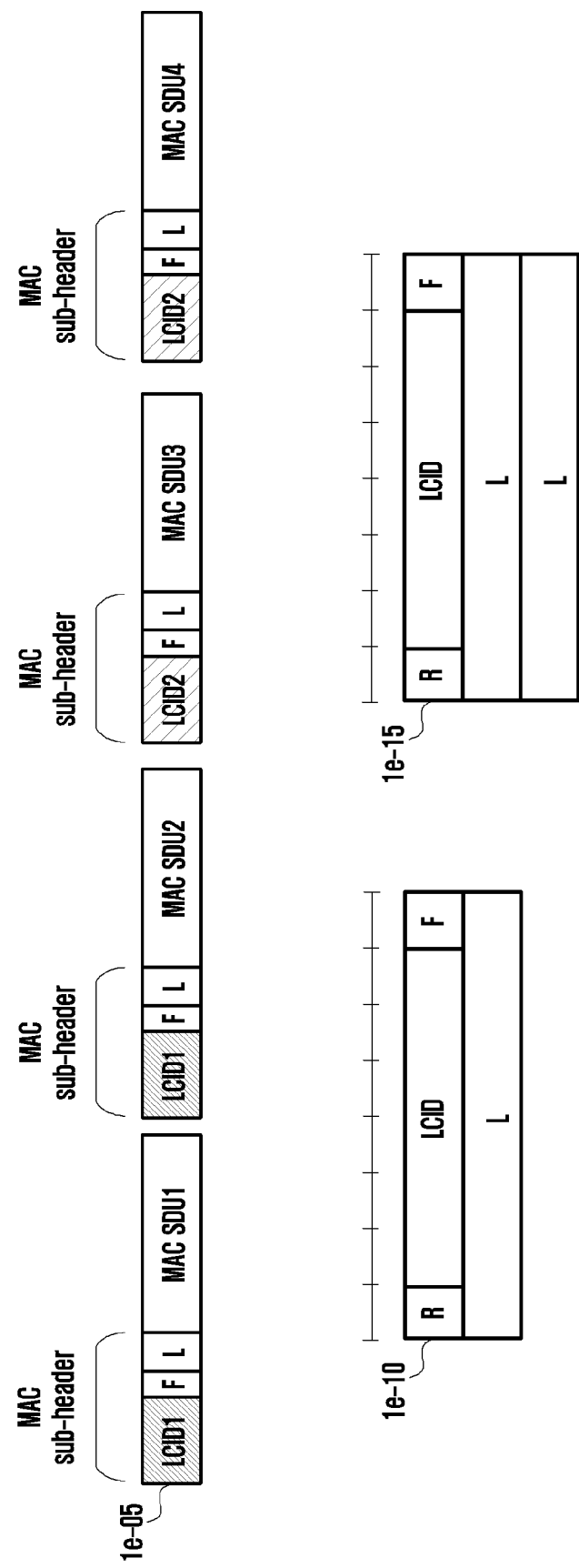
FIG. 1E is a diagram illustrating a (1-1)th embodiment of a MAC sub-header structure which may be applied in the next generation mobile communication system of the disclosure.

FIG. 1E is a diagram illustrating a (1-1)th embodiment of a MAC sub-header structure which may be applied in the next generation mobile communication system of the disclosure.

In the (1-1)th embodiment of the disclosure, the MAC layer device of the terminal may receive a MAC SDU (RLC PDU) from an upper layer device and process data, and may configure a MAC sub-header. The MAC layer device may receive MAC SDUs from different upper layer devices (RLC layer devices) or logical channels. The MAC layer device checks which logical channel each MAC SDU corresponds to, configures a logical channel ID (LDIC), determines an L field length appropriate for the size of the MAC SDU to configure an F field (e.g., if the F field is 0, an L field of a short length is used, and if the F field is 1, an L field of a long length is used), sets an L field with respect to the size of the MAC SDU, and configures the MAC sub-header.

A characteristic of the (1-1)th embodiment may be that a procedure described above is repeated for each MAC SDU, so as to have a repeating structure of MAC sub-header, MAC SDU, MAC sub-header, and MAC SDU, as shown in 1e-05 of FIG. 1E.

Therefore, two types of MAC sub-header formats, such as 1e-05 and 1e-15, may be available depending on the length of the L field. The R field may be a reserved field, the LCID may have a length of 6 bits, the F field may be a 1-bit field indicating the length of the L field, and the L field may have a length of 8 bits and a length of 16 bits.

Each of fields in the MAC sub-header may have a size that is different from the size proposed above, and fields may be configured at different positions. In addition, each field may be configured to be byte-aligned, that is, to fit in size in bytes. If necessary, new fields may be added.

Because the MAC PDU structure has repetition as described above, and two types of MAC sub-header formats are used, it may be possible to generate or receive data uniformly and repeatedly at a transmission end and a reception end very quickly. The structure with repetition as described above may enable a tool, such as a hardware accelerator, to be used, so that a high data transmission rate is supported in the next generation mobile communication system. For example, the structure is advantageous for data pre-processing.

Figure 1F:
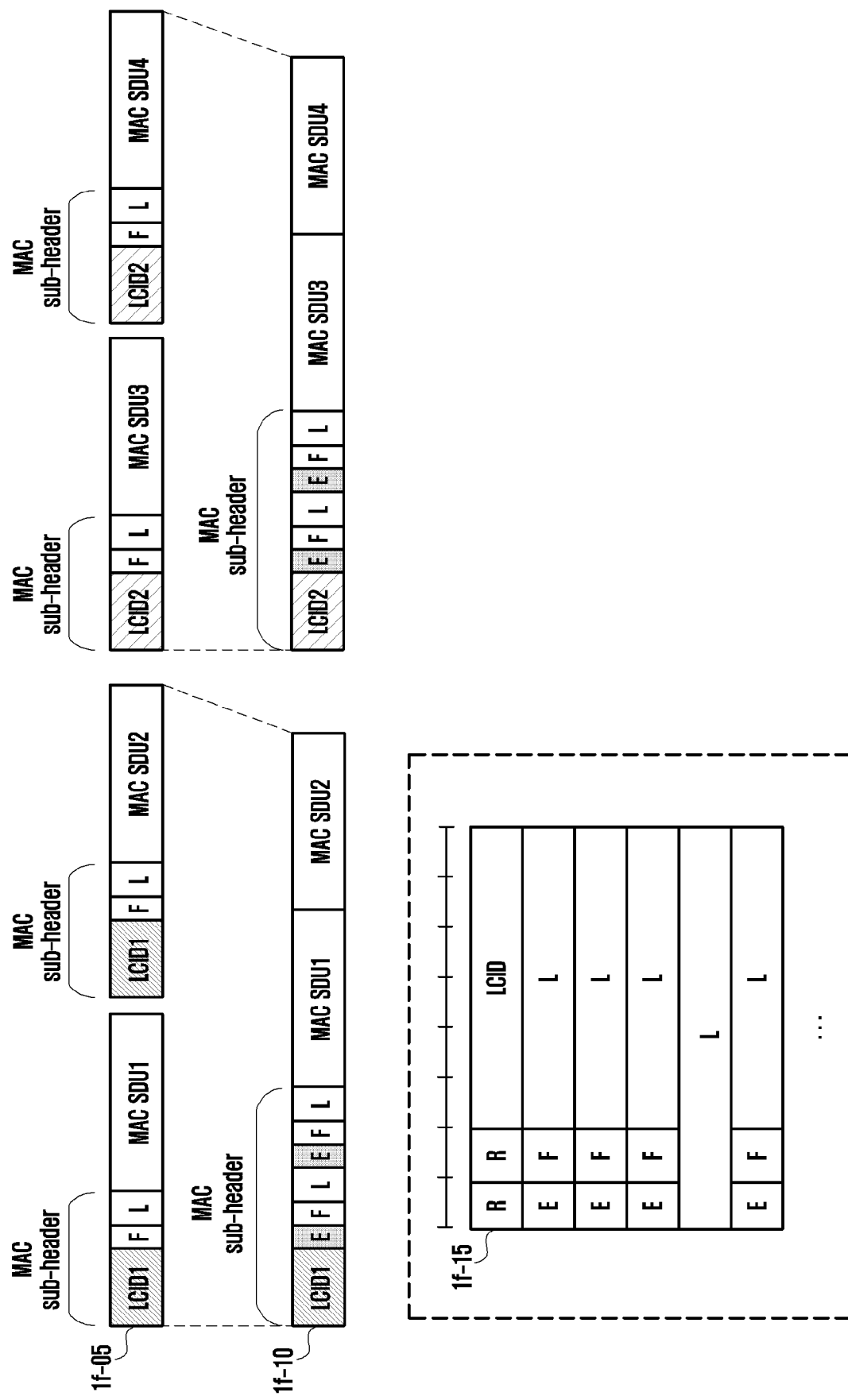
FIG. 1FA and FIG. 1FB are diagrams illustrating a (1-2)th embodiment of the MAC sub-header structure which may be applied in the next generation mobile communication system of the disclosure.
Figure 1F:
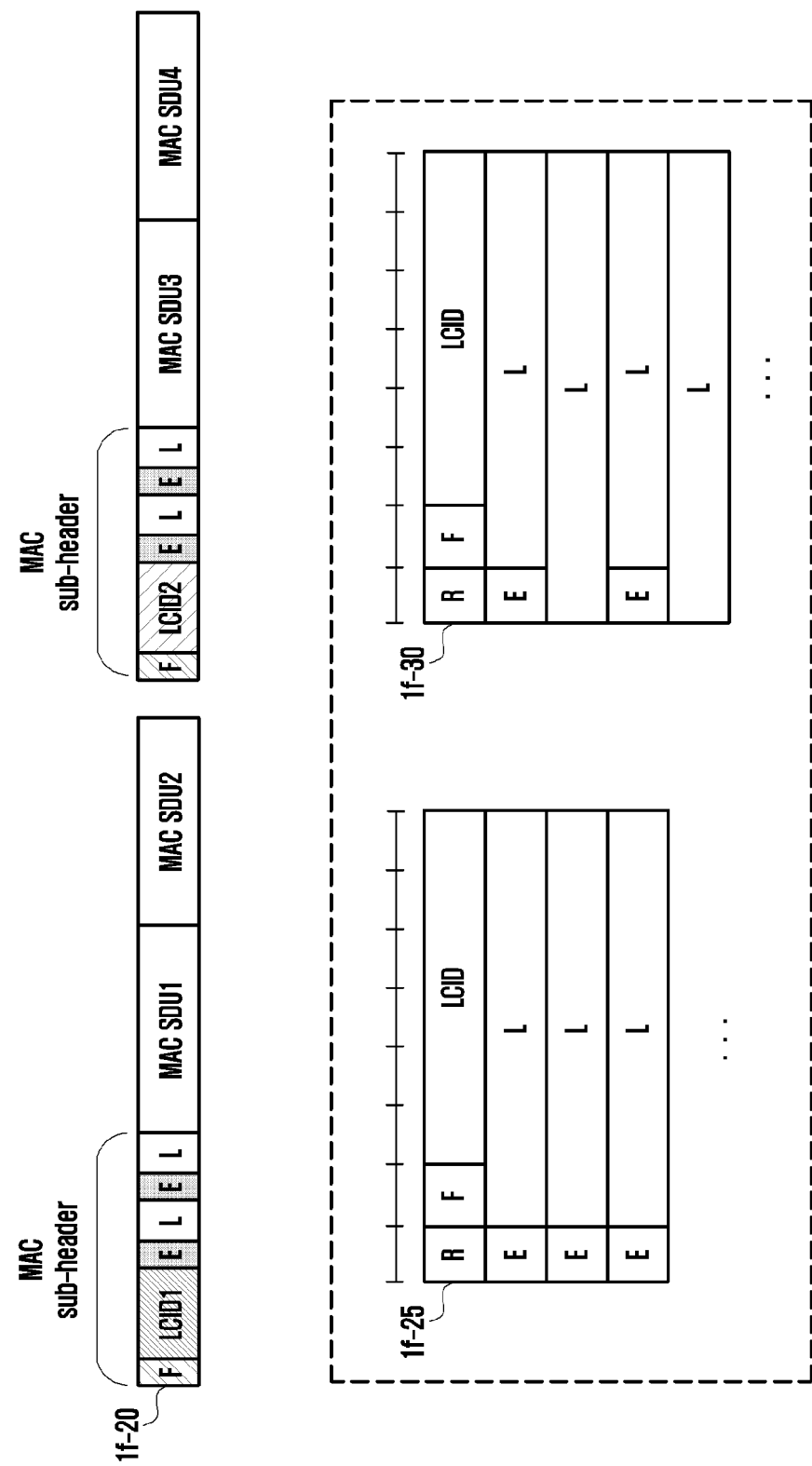

FIG. 1FA is a diagram illustrating a (1-2)th embodiment of a MAC sub-header structure which may be applied in the next generation mobile communication system of the disclosure.

In the (1-2)th embodiment of the disclosure, the MAC layer device of the terminal may receive a MAC SDU (RLC PDU) from an upper layer device and process data, and may configure a MAC sub-header. The MAC layer device may receive MAC SDUs from different upper layer devices (RLC layer devices) or logical channels. The MAC layer device may identify which logical channel corresponds to each MAC SDU and may concatenate MAC SDUs for the same logical channel into one group. Therefore, there may be one MAC sub-header per logical channel. One LCID field is configured in one MAC sub-header, an E field is used to indicate information multiple MAC SDUs corresponding to one logical channel, an L field length for each MAC SDU is determined to configure an F field, and then the presence or absence of a header for a next MAC SDU is indicated by the E field (if the E field is 0, this indicates that there are no other immediately subsequent F field and L field, and if the E field is 1, this indicates that there are other immediately subsequent F field and L field). If there is a following MAC SDU, the E field is configured to 1, an L field length for the following MAC SDU is determined to configure the F field, an L field for the following MAC SDU is configured, and then the presence or absence of a header for the following MAC SDU is indicated by the E field.

As a result, overhead may be further reduced in the (1-2)th embodiment 1f-10 of the MAC sub-header structure, compared to the (1-1)th embodiment 1f-05 of the MAC sub-header structure.

The (1-2)th embodiment of the disclosure may have a MAC sub-header structure in units of logical channels, and a MAC PDU structure repeated in units of MAC SDU groups corresponding to the logical channels. The MAC sub-header structure in units of logical channels may be positioned at the front of a MAC SDU group, and may be one MAC sub-header in which MAC sub-headers for respective MAC SDU are collected. Therefore, when compared with the (1-1)th embodiment, overhead may be reduced by the size of (number of MAC SDUs of each logical channel−1)×LCID fields in each logical channel.

Accordingly, the MAC sub-header structure corresponding to the (1-2)th embodiment of the disclosure may have the same structure as 1*f*-15. In the MAC sub-header structure, a MAC sub-header corresponding to one logical channel has an L field indicating each MAC SDU, wherein the size of the L field may vary depending on the size of each MAC SDU and may be indicated by each F field. Accordingly, the size of a MAC sub-header part corresponding to each MAC SDU may vary (1 byte or 2 bytes) as shown in 1*f*-15. The LCID field may have a size of 6 bits, the E field may have a size of 1 bit, the F field may have a size of 1 bit, the L field of a short length may have a size of 6 bits, and the L field of a long length may have a size of 14 bits.

In 1*f*-20 illustrated in FIG. 1FB, it may be assumed to use L fields of the same length with respect to one logical channel in a modified form of the (1-2)th embodiment of the disclosure. In general, because data (PDCP SDUs) of the same size tends to come with respect to one logical channel, it may be reasonable to use one type of L field for one logical channel. Therefore, one LCID field and one F field may be included in a MAC sub-header corresponding to each logical channel, and only an E field and an L field may be added for each MAC SDU. As a result, the MAC sub-header structure may have two types of MAC sub-header structures, such as 1*f*-25 and 1*f*-30. The MAC sub-header structures of 1*f*-25 and 1*f*-30 may be determined on the basis of F field values. The LCID field may have a size of 6 bits, the E field may have a size of 1 bit, the F field may have a size of 1 bit, the L field of a short length may have a size of 7 bits, and the L field of a long length may have a size of 15 bits.

Each of fields in the MAC sub-header may have a size that is different from the size proposed above, and fields may be configured at different positions. In addition, each field may be configured to be byte-aligned, that is, to fit in size in bytes. If necessary, new fields may be added.

In the (1-2)th embodiment of the disclosure, overhead may be reduced by omitting duplicate fields of the MAC sub-header.

Figure 1G:
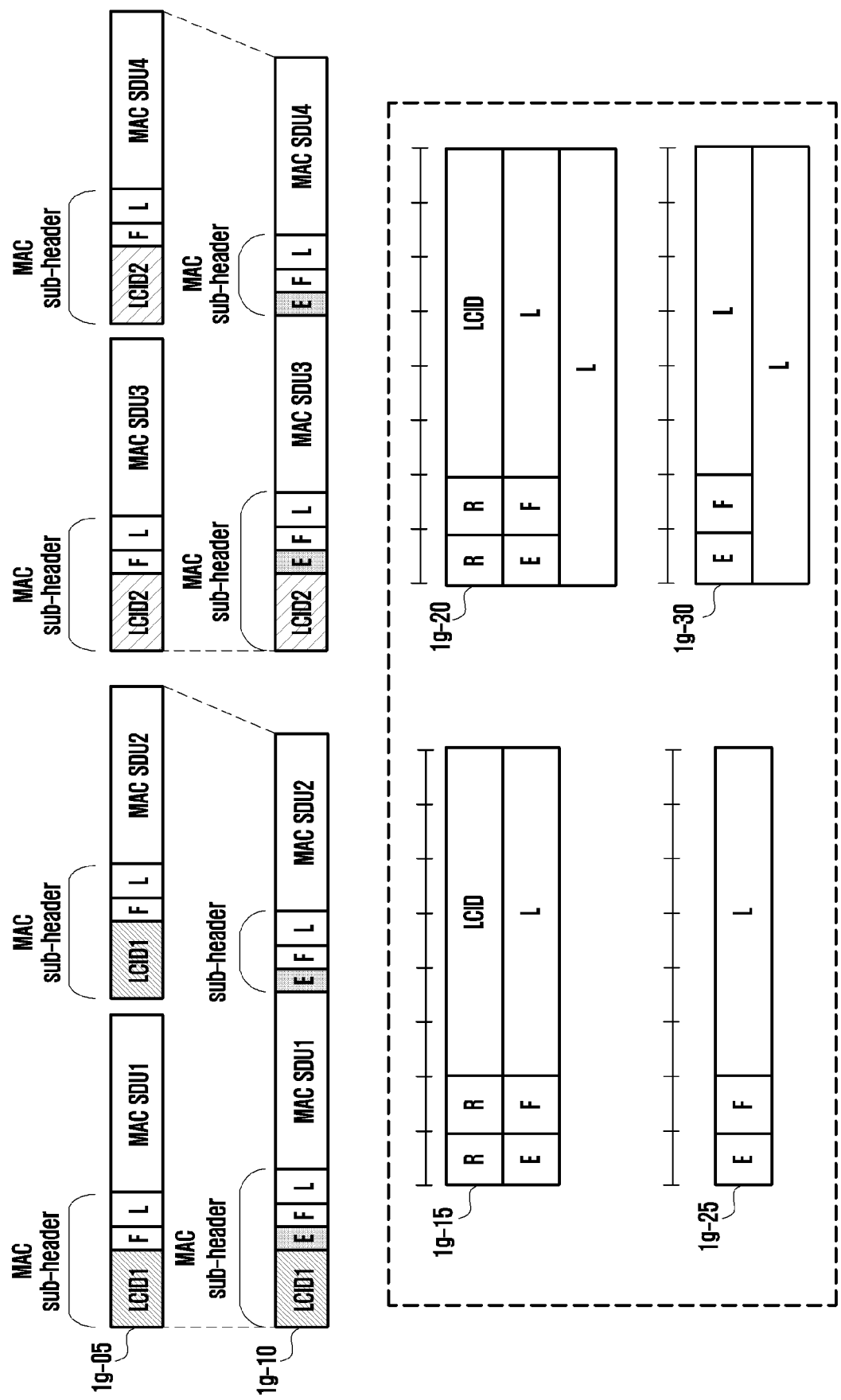
FIG. 1GA and FIG. 1GB are diagrams illustrating a (1-3)th embodiment of the MAC sub-header structure which may be applied in the next generation mobile communication system of the disclosure.
Figure 1G:
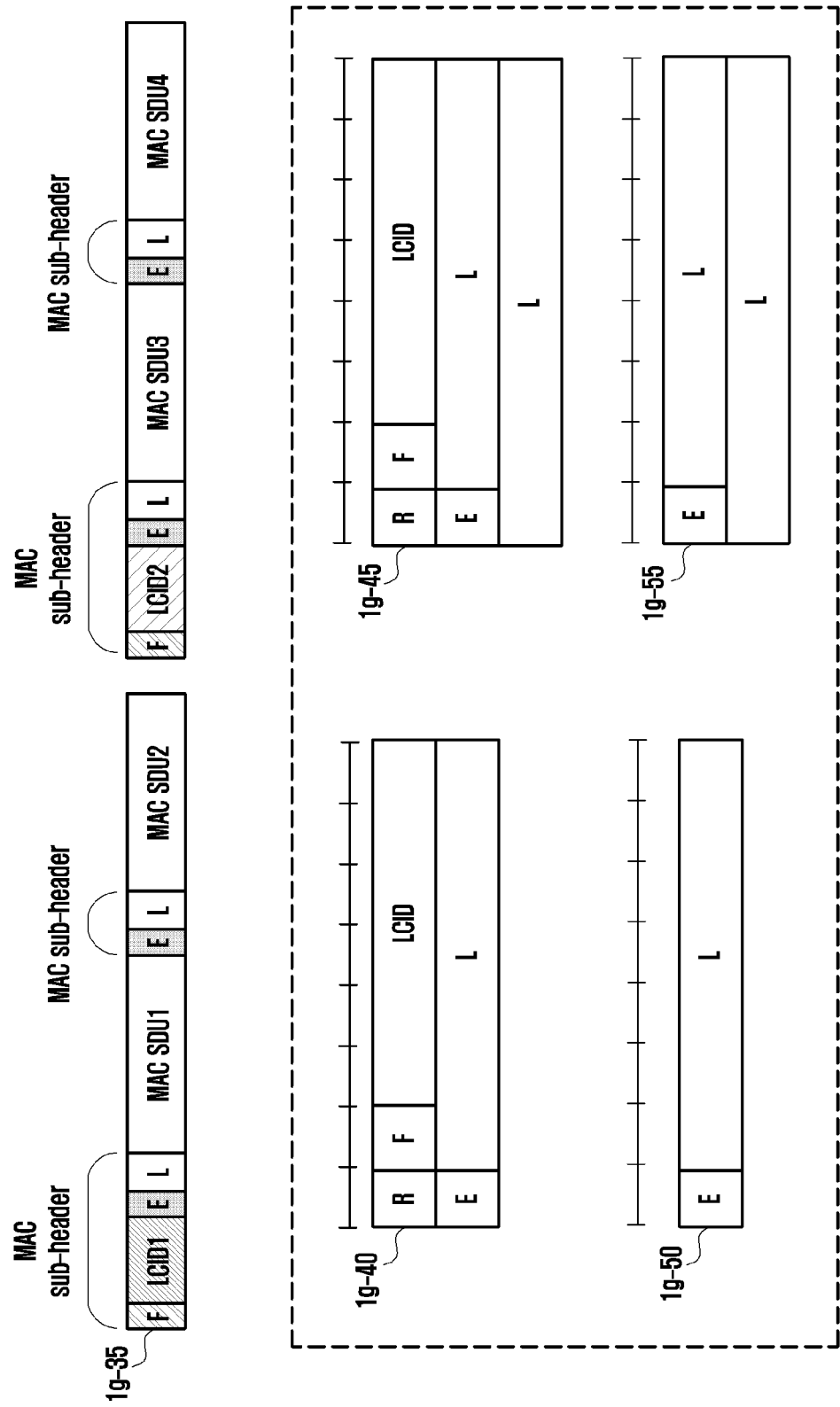

FIG. 1GA is a diagram illustrating a (1-3)th embodiment of a MAC sub-header structure which may be applied in the next generation mobile communication system of the disclosure.

In the (1-3)th embodiment of the disclosure, the MAC layer device of the terminal may receive a MAC SDU (RLC PDU) from an upper layer device and process data, and may configure a MAC sub-header. The MAC layer device may receive MAC SDUs from different upper layer devices (RLC layer devices) or logical channels. The MAC layer device may check which logical channel each MAC SDU corresponds to, may configure an LDCI field, an E field, an F field, and an L field only for one foremost MAC SDU of MAC SDUs for the same logical channel, and may configure a MAC sub-header, as shown in 1*g*-10, only by the E field, the F field, and the L field for following MAC SDUs corresponding to the same logical channel. Therefore, one logical channel may have one LCID field, and the LCID field may be included in a foremost MAC SDU of each logical channel. One LCID field is configured in one MAC sub-header, an E field is used to indicate information on multiple MAC SDUs corresponding to one logical channel, an L field length for each MAC SDU is determined to configure F field, an L field for each MAC SDU is configured, and then the presence or absence of a header for a next MAC SDU is indicated by the E field (if the E field is 0, this indicates that there are no other F field and L field following the MAC SDU, and if the E field is 1, this indicates that there are another F field and L field following the MAC SDU). If there are subsequent MAC sub-header and MAC SDU, the E field is configured to 1, an L field length for the subsequent MAC SDU is determined to configure the F field, an L field for the subsequent MAC SDU is configured, and then the presence or absence of the header for the subsequent MAC SDU is indicated by the E field.

As a result, overhead may be further reduced in the (1-3)th embodiment of the MAC sub-header structure, compared to the (1-1)th embodiment 1*f*-05 or 1*g*-05 of the MAC sub-header structure. As shown in the (1-1)th embodiment, due to the repeating structure of MAC sub-header and MAC SDU, the structure is advantageous for high-speed data processing. For example, the structure is advantageous for data pre-processing.

The (1-3)th embodiment of the disclosure may have a MAC PDU structure repeated in units of MAC sub-headers and MAC SDUs. However, because a first MAC SDU of each logical channel includes an LCID field, a different structure and a size may be available. Therefore, when compared with the (1-1)th embodiment, overhead may be reduced by the size of (number of MAC SDUs of each logical channel−1)×LCID fields in each logical channel.

Accordingly, the MAC sub-header structure corresponding to the (1-3)th embodiment of the disclosure may have the same structure as 1*g*-15, 1*g*-20, 1*g*-25, and 1*g*-30. In the MAC sub-header structure, a MAC sub-header corresponding to one logical channel has an L field indicating each MAC SDU, wherein the size of the L field may vary depending on the size of each MAC SDU and may be indicated by each F field. Accordingly, the size of a MAC sub-header part corresponding to each MAC SDU may vary (1 byte or 2 bytes) as shown in 1*g*-25 or 1*g*-30. The LCID field may have a size of 6 bits, the E field may have a size of 1 bit, the F field may have a size of 1 bit, the L field of a short length may have a size of 6 bits, and the L field of a long length may have a size of 14 bits.

In 1*g*-35 illustrated in FIG. 1GB, it may be assumed to use L fields of the same length with respect to a logical channel in a modified form of the (1-3)th embodiment of the disclosure. In general, because data (PDCP SDUs) of the same size tends to come with respect to one logical channel, it may be reasonable to use one type of L field for one logical channel. Therefore, one LCID field and one F field may be included in a MAC sub-header of a foremost MAC SDU corresponding to each logical channel, and only an E field and an L field may be added for each MAC SDU. As a result, the MAC sub-header structure may have two sets of MAC sub-header structures, such as 1*g*-40 and 1*g*-45, or 1*g*-50 and 1*g*-55. The sets of MAC sub-header structures, such as 1*g*-40 and 1*g*-45, or 1*g*-50 and 1*g*-55, may be determined on the basis of F field values. The LCID field may have a size of 6 bits, the E field may have a size of 1 bit, the F field may have a size of 1 bit, the L field of a short length may have a size of 7 bits, and the L field of a long length may have a size of 15 bits.

Each of fields in the MAC sub-header may have a size that is different from the size proposed above, and fields may be configured at different positions. In addition, each field may be configured to be byte-aligned, that is, to fit in size in bytes. If necessary, new fields may be added.

In the (1-3)th embodiment of the disclosure, overhead may be reduced by omitting duplicate fields of the MAC sub-header, and the repeating structure may be advantageous for high-speed data processing.

FIG. 1H is a diagram illustrating an operation in consideration of data pre-processing when segmentation is performed in the (1-3)th embodiment of the MAC sub-header structure of the disclosure.

In FIG. 1H, a terminal may perform data pre-processing for each logical channel, as shown in 1h-05. The data pre-processing refers to: when an IP packet is received in a PDCP layer, performing data processing to configure a PDCP header, making a PDCP PDU, and delivering the PDCP PDU to an RLC layer, by a PDCP layer device; performing data processing for the received RLC SDU (PDCP PDU) and configuring an RLC header, by an RLC layer device; and, in a MAC layer, data-processing the received MAC SDU(RLC PDU) to configure a MAC header, and performing data processing up to a MAC sub-header in advance. Performing of the data processing in advance refers to performing data processing in advance before receiving a transmission resource from a base station.

In (a) of FIG. 1H, as shown in 1h-05, data pre-processing may be performed on one logical channel by applying the (1-3)th embodiment of a MAC sub-header structure of the disclosure. If, as shown in 1h-10, an uplink transmission resource (UL grant) is received from a base station, and the size of the transmission resource cannot be filled in units of MAC sub-headers and MAC SDUs, for which data pre-processing has been performed, segmentation may be performed. That is, segmentation may be performed on the MAC SDU of 1h-15. When segmentation is performed, the MAC SDU may be divided into segments, such as 1h-20 and 1h-25, and when the segmentation is performed, the size of 1h-20 is changed, so that an L field of the MAC sub-header should be changed, and an SI field or an SO field should be updated or added 1h-30 in the RLC header. The segment of 1h-25 should be newly configured by a MAC sub-header including an LCID field as well as an E field, an F field, and an L field, instead of a MAC sub-header including only an E field, an F field, and an L field. Because 1h-25 becomes a first MAC SDU of a corresponding logical channel after transmitting data to the received transmission resource, a MAC sub-header, such as 1g-15 or 1g-20, which has an LCID field should be configured 1h-30.

In (b) of FIG. 1H, as shown in 1h-40, data pre-processing may be performed on one logical channel by applying a modified structure of the (1-3)th embodiment of a MAC sub-header structure of the disclosure. If, as shown in 1h-45, an uplink transmission resource (UL grant) is received from a base station, and the size of the transmission resource cannot be filled in units of MAC sub-headers and MAC SDUs, for which data pre-processing has been performed, segmentation may be performed. That is, segmentation may be performed on the MAC SDU of 1h-50. When segmentation is performed, the MAC SDU may be divided into segments, such as 1h-55 and 1h-60, and when the segmentation is performed, the size of 1h-55 is changed, so that an L field of the MAC sub-header should be changed, and an SI field or an SO field should be updated or added 1h-65 in the RLC header. The segment of 1h-60 should be newly configured by a MAC sub-header including an LCID field as well as an E field, an F field, and an L field, instead of a MAC sub-header including only an E field, an F field, and an L field. Because 1h-25 becomes a first MAC SDU of a corresponding logical channel after transmitting data to the received transmission resource, a MAC sub-header, such as 1g-40 or 1g-45, which has an LCID field should be configured 1h-30.

Figure 1I:
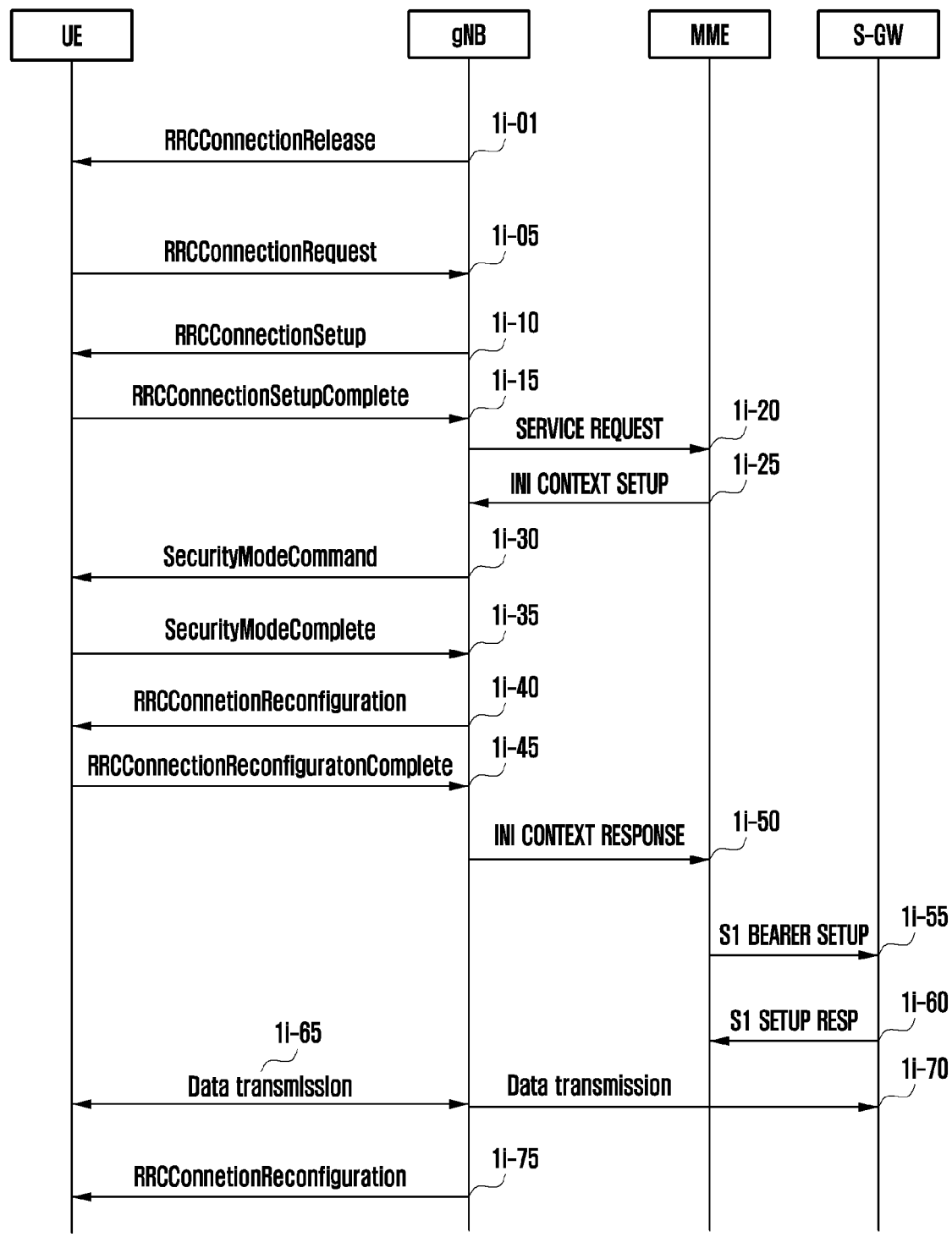
FIG. 1I is a diagram illustrating a procedure of switching from an RRC idle mode to an RRC connected mode to configure a network by a terminal.

FIG. 1I is a diagram illustrating a procedure of switching from an RRC idle mode to an RRC connected mode to configure a network by a terminal.

In FIG. 1I, if there is no data transmission or reception for a predetermined reason or for a predetermined time, a base station that transmits or receives data in an RRC connection mode may transmit an RRCConnectionRelease message 1i-01 to the terminal so that a mode of the terminal is switched to an RRC idle mode. Subsequently, the terminal (hereinafter, an idle mode UE) that is not currently configured for connection performs an RRC connection establishment procedure with the base station when data to be transmitted is generated. The terminal establishes reverse transmission synchronization with the base station via a random access procedure and transmits an RRCConnectionRequest message 1i-05 to the base station. The message includes an identifier of the terminal, a reason (establishmentCause) for establishing a connection, and the like.

The base station transmits an RRCConnectionSetup message 1i-10 so that the terminal establishes an RRC connection. The message may include an indicator indicating a type of a MAC sub-header structure to be used by the terminal. For example, the indicator may indicate to apply the embodiment (1-1)th embodiment or (1-3)th embodiment (or the (1-2)th embodiment). If there is no such an indicator, the terminal may use a default MAC sub-header structure. The default MAC sub-header structure may be the (1-1) the embodiment, and, if necessary, the (1-3)th embodiment (the (1-2)th embodiment) may be designated. Which MAC sub-header structure is to be used may be indicated for each logical channel or bearer. The message includes RRC connection establishment information. The RRC connection is also referred to as a signaling radio bearer (SRB) and is used for transmitting or receiving an RRC message, which is a control message between the terminal and the base station.

The terminal that has established the RRC connection transmits an RRCConnetionSetupComplete message 1i-15 to the base station. The message includes a control message referred to as SERVICE REQUEST which is for the terminal to request the MME to establish a bearer for a predetermined service. The base station transmits the SERVICE REQUEST message 1i-20 included in the RRCConnetionSetupComplete message to the MME, and the MME determines whether to provide a service requested by the terminal. If the terminal determines, as a determination result, to provide the requested service, the MME transmits an INITIAL CONTEXT SETUP REQUEST message 1i-25 to the base station. The message includes information, such as quality of service (QoS) information to be applied when configuring a data radio bearer (DRB), and security related information (e.g., a security key and a security algorithm) to be applied to the DRB. The base station exchanges a SecurityModeCommand message 1i-30 and a SecurityModeComplete message 1i-35 with the terminal to establish security.

When the security configuration is completed, the base station transmits an RRCConnectionReconfiguration message 1i-40 to the terminal. The message may include an indicator indicating a type of a MAC sub-header structure to be used by the terminal. For example, the indicator may indicate to apply the embodiment (1-1)th embodiment or (1-3)th embodiment (or the (1-2)th embodiment). If there is no such an indicator, the terminal may use a default MAC sub-header structure. The default MAC sub-header structure may be the (1-1) the embodiment, and, if necessary, the (1-3)th embodiment (the (1-2)th embodiment) may be designated. Which MAC sub-header structure is to be used may be indicated for each logical channel or bearer. The message includes configuration information of the DRB, in which user data is to be processed, and the terminal configures the DRB by applying the information and transmits an RRC-ConnectionReconfigurationComplete message 1*i*-45 to the base station.

The base station having completed DRB configuration with the terminal transmits an INITIAL CONTEXT SETUP COMPLETE message 1*i*-50 to the MME, and the MME having received the message exchanges an SI BEARER SETUP message 1*i*-55 and an SI BEARER SETUP RESPONSE message 1*i*-60 to configure an S-GW and an SI bearer. The SI bearer is a data transmission connection established between the S-GW and the base station and corresponds one-to-one to the DRB. When all the above procedures are completed, the terminal transmits data to or receives data from the base station via the S-GW 1*i*-65 and 1*i*-70.

Likewise, a general data transmission procedure includes mainly three steps of RRC connection establishment, security configuration, and DRB configuration. The base station may transmit an RRCConnectionReconfiguration message 1*i*-75 to the terminal to update, add, or change a configuration for a predetermined reason. The message may include an indicator indicating a type of a MAC sub-header structure to be used by the terminal. For example, the indicator may indicate to apply the embodiment (1-1)th embodiment or (1-3)th embodiment (or the (1-2)th embodiment). If there is no such an indicator, the terminal may use a default MAC sub-header structure. The default MAC sub-header structure may be the (1-1) the embodiment, and, if necessary, the (1-3)th embodiment (the (1-2)th embodiment) may be designated. Which MAC sub-header structure is to be used may be indicated for each logical channel or bearer.

As shown in FIG. 1I, whether to use a default MAC sub-header (e.g., the (1-1)th embodiment) or use a modified MAC sub-header structure (e.g., the (1-3)th embodiment) capable of reducing overhead may be configured by the base station on the basis of an RRC message. Which MAC sub-header structure is to be used may be indicated for each logical channel or bearer.

Alternatively, a new MAC control element (MAC CE) may be defined to indicate a structure of the MAC sub-header, and the structure of the MAC sub-header may be dynamically indicated via the new MAC CE. Which MAC sub-header structure is to be used may be indicated for each logical channel or bearer.

When the terminal is indicated, while using the default MAC sub-header structure, to use a MAC sub-header structure modified via the RRC message or MAC CE, the terminal may use the modified MAC sub-header structure. When the base station receives a response message (RRC response message or HARQ ACK) in response thereto, the base station may use the modified MAC sub-header structure.

Note that, because configuration of an E field to 0 in the modified MAC sub-header structure (the (1-2)th embodiment or the (1-3)th embodiment) indicates that there are no additional MAC sub-header and MAC SDU subsequent to the MAC SDU or the MAC sub-header configuring the E field, the modified MAC sub-header structure in this case has the same structure as the default MAC sub-header structure (the (1-1)th embodiment). Therefore, depending on the implementation, the default MAC sub-header structure and the modified MAC sub-header structure may be applied and used according to dynamic needs.

Even if it is instructed to use the modified MAC sub-header structure, the default sub-header structure may be applied when configuring the MAC CE or transmitting data via the common control channel (CCCH). That is, the modified sub-header structure may be applied to only a dedicated traffic channel (DTCH) or a dedicated control channel (DCCH) so as to be used.

If the terminal performs an RRC connection reestablishment procedure, the terminal may fall back to using the default MAC sub-header structure.

Figure 1J:
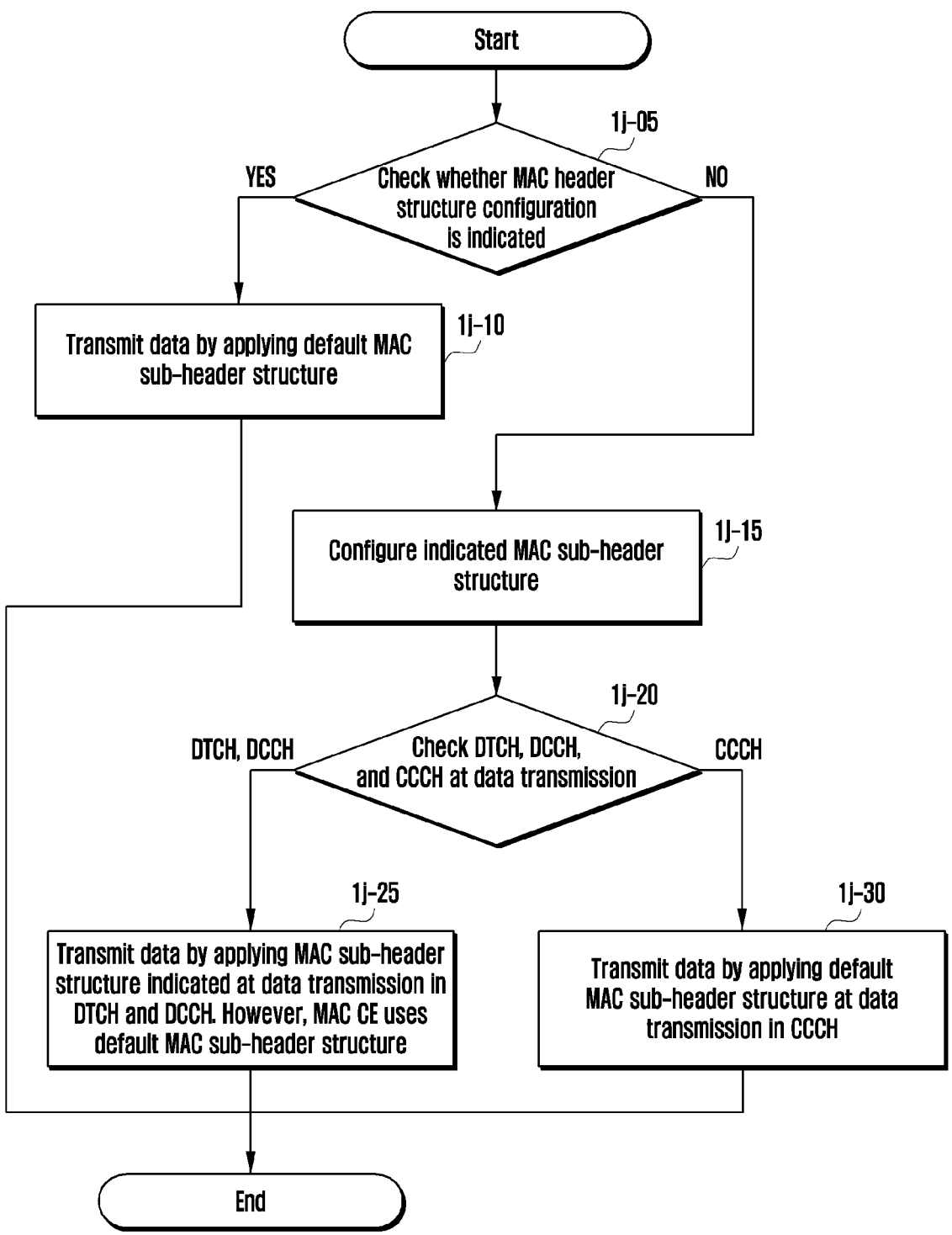
FIG. 1J is a diagram illustrating an operation of a terminal that applies the MAC sub-header structure in the disclosure.

FIG. 1J is a diagram illustrating an operation of a terminal that applies the MAC sub-header structure in the disclosure.

In FIG. 1J, a base station may configure, on the basis of RRC messages, whether a terminal is to use a default MAC sub-header structure (e.g., the (1-1)th embodiment) or use a modified MAC sub-header structure (e.g., the (1-3)th embodiment) capable of reducing overhead. Alternatively, in order to indicate the MAC sub-header structure, a new MAC CE may be defined, and the MAC sub-header structure may be dynamically indicated via the new MAC CE. The terminal may check 1*j*-05 whether the MAC sub-header structure is indicated, and if the terminal fails to receive information indicating the MAC sub-header structure, the terminal may transmit 1*j*-10 data by applying the default MAC sub-header structure. If the information indicating the modified MAC sub-header structure is received via the RRC messages or the MAC CE, the indicated MAC sub-header structure may be configured 1*j*-15. In a case where, at the time of data transmission, the terminal checks 1*j*-20 whether a channel, through which the data is transmitted, is a DTCH, a DCCH, or a CCCH, and attempts to transmit the data through the DTCH, the DCCH, or the CCCH, the terminal may transmit 1*j*-25 the data by applying the indicated MAC sub-header, and the default MAC sub-header structure may be applied to MAC control information, such as the MAC CE. If the data to be transmitted is scheduled to be transmitted via the CCCH, the terminal may transmit 1*j*-30 the data by applying the default MAC sub-header structure instead of applying the indicated MAC sub-header structure.

If the terminal performs an RRC connection re-establishment procedure, the terminal may fall back to using only the default MAC sub-header structure.

Figure 1K:
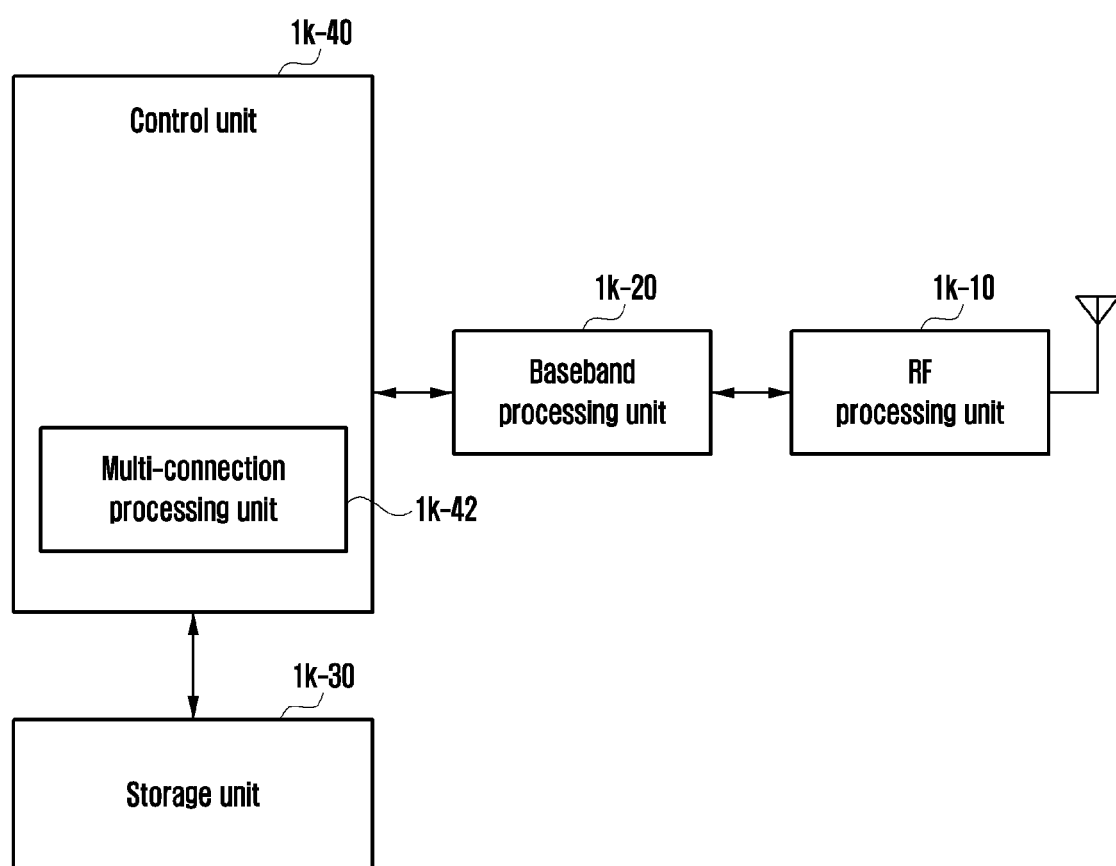
FIG. 1K is a diagram illustrating a structure of a terminal to which an embodiment of the disclosure may be applied.

FIG. 1K illustrates a structure of a terminal to which an embodiment of the disclosure may be applied.

Referring to FIG. 1K, the terminal includes a radio frequency (RF) processing unit 1*k*-10, a baseband processing unit 1*k*-20, a storage unit 1*k*-30, and a control unit 1*k*-40.

The RF processing unit 1*k*-10 performs a function for transmitting or receiving a signal through a wireless channel, such as band conversion and amplification of a signal. That is, the RF processing unit 1*k*-10 up-converts a baseband signal provided from the baseband processing unit 1*k*-20 into an RF band signal, transmits the converted RF band signal through the antenna, and then down-converts the RF band signal received through the antenna into a baseband signal. For example, the RF processing unit 1*k*-10 may include a transmission filter, a reception filter, an amplifier, a mixer, an oscillator, a digital-to-analog convertor (DAC), an analog-to-digital convertor (ADC), and the like. In FIG. 1K, only one antenna is illustrated, but the terminal may have a plurality of antennas. The RF processing unit 1*k*-10 may include a plurality of RF chains. Moreover, the RF processing unit 1*k*-10 may perform beamforming. For the beamforming, the RF processing unit 1*k*-10 may adjust a phase and a size of each signal transmitted or received through a plurality of antennas or antenna elements. The RF processing unit may perform MIMO, and may receive multiple layers when performing MIMO operations. The RF processing unit 1*k*-10 may perform reception beam sweeping by appropriately configuring the plurality of antennas or antenna elements under the control of the control unit, or may adjust the direction and beam width of the reception beam so that the reception beam is coordinated with a transmission beam.

The baseband processing unit 1k-20 performs a function for a conversion between a baseband signal and a bit string according to a physical layer standard of the system. For example, when data is transmitted, the baseband processing unit 1k-20 generates complex symbols by encoding and modulating a transmission bit string. When data is received, the baseband processing unit 1k-20 reconstructs a reception bit string via demodulation and decoding of the baseband signal provided from the RF processing unit 1k-10. For example, in accordance with an orthogonal frequency division multiplexing (OFDM) scheme, when data is transmitted, the baseband processing unit 1k-20 generates complex symbols by encoding and modulating a transmission bit string, maps the complex symbols to subcarriers, and then configures OFDM symbols via an inverse fast Fourier transform (IFFT) operation and a cyclic prefix (CP) insertion. Further, when data is received, the baseband processing unit 1k-20 divides the baseband signal provided from the RF processing unit 1k-10 in units of OFDM symbols, reconstructs the signals mapped to the subcarriers, via a fast Fourier transform (FFT) operation, and then reconstructs a reception bit string via demodulation and decoding.

The baseband processing unit 1k-20 and the RF processing unit 1k-10 transmit and receive signals as described above. Accordingly, the baseband processing unit 1k-20 and the RF processing unit 1k-10 may be referred to as a transmission unit, a reception unit, a transmission/reception unit, or a communication unit. Moreover, at least one of the baseband processing unit 1k-20 and the RF processing unit 1k-10 may include a plurality of communication modules to support a plurality of different radio access technologies. At least one of the baseband processing unit 1k-20 and the RF processing unit 1k-10 may include different communication modules to process signals of different frequency bands. For example, the different radio access technologies may include an LTE network, an NR network, and the like. Further, the different frequency bands may include a super high frequency (SHF) (i.e., 2.5 GHz and 5 Ghz) band and a millimeter (mm) wave (i.e., 60 GHz) band.

The storage unit 1k-30 stores data, such as a basic program, an application program, and configuration information, and the like for operation of the terminal. The storage unit 1k-30 provides stored data in response to a request of the control unit 1k-40.

The control unit 1k-40 controls overall operations of the terminal. For example, the control unit 1k-40 transmits or receives a signal via the baseband processing unit 1k-20 and the RF processing unit 1k-10. The control unit 1k-40 records and reads data in the storage unit 1k-40. To this end, the control unit 1k-40 may include at least one processor. For example, the control unit 1k-40 may include a communication processor (CP) that performs control for communication and an application processor (AP) that controls a higher layer, such as an application program. The control unit 1k-40 may further include a multi-connection processing unit 1k-42 configured to process a multi-connection.

Figure 1L:
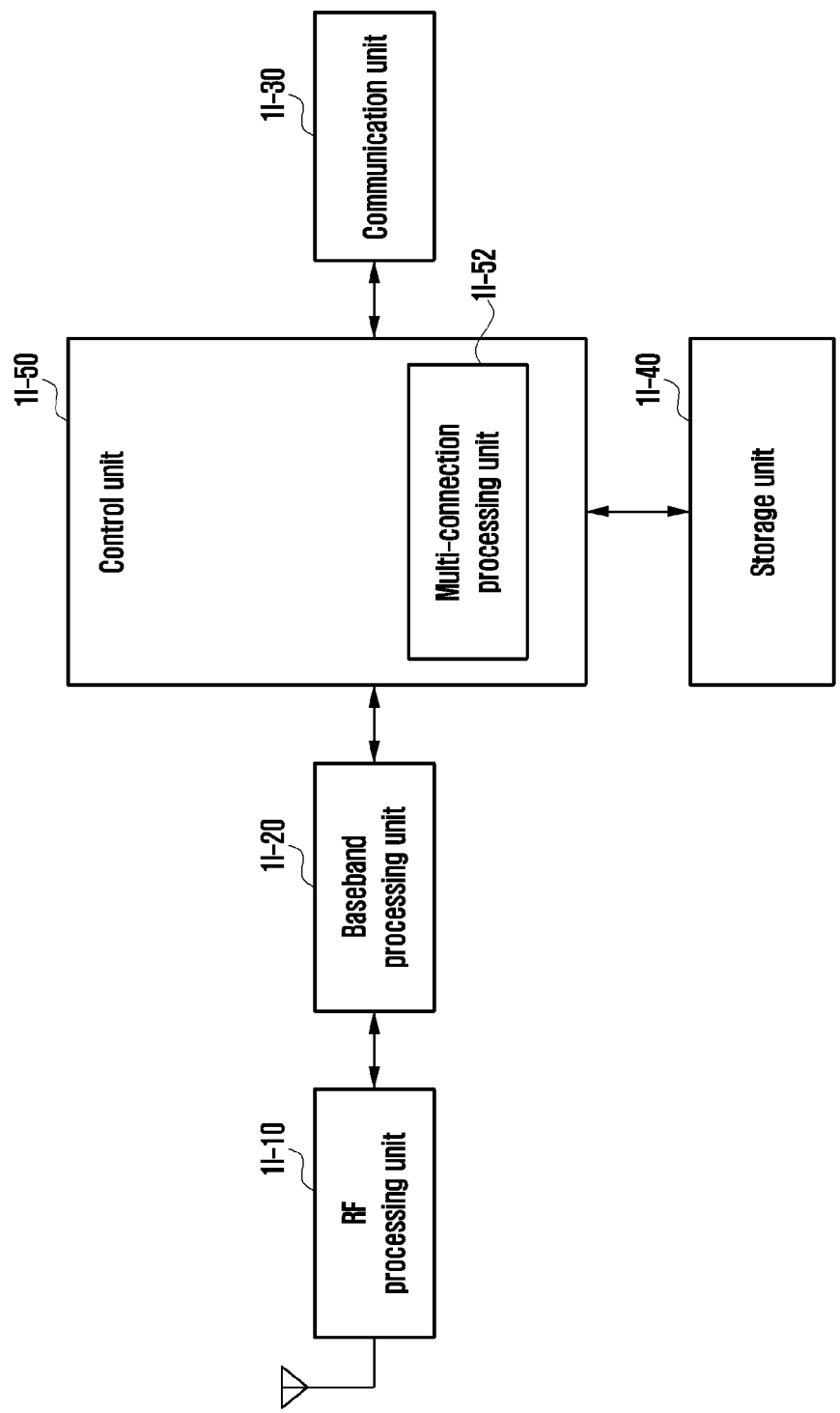
FIG. 1L is a diagram illustrating a block configuration of a transmission reception point (TRP) in a wireless communication system to which an embodiment of the disclosure may be applied.

FIG. 1L illustrates a block configuration of a transmission reception point (TRP) in a wireless communication system to which an embodiment of the disclosure may be applied.

As illustrated in FIG. 1L, a base station includes an RF processing unit 1l-10, a baseband processing unit 1l-20, a backhaul communication unit 1l-30, a storage unit 1l-40, and a control unit 1l-50.

The RF processing unit 1l-10 performs a function for transmitting or receiving a signal through a wireless channel, such as band conversion and amplification of a signal. That is, the RF processing unit 1l-10 up-converts a baseband signal provided from the baseband processing unit 1l-20 into an RF band signal, transmits the converted signal through an antenna, and then down-converts the RF band signal received through the antenna into a baseband signal. For example, the RF processing unit 1l-10 may include a transmission filter, a reception filter, an amplifier, a mixer, an oscillator, a DAC, an ADC, and the like. In FIG. 1L, only one antenna is illustrated, but a first access node may include a plurality of antennas. In addition, the RF processing unit 1l-10 may include a plurality of RF chains. Moreover, the RF processing unit 1l-10 may perform beamforming. For the beamforming, the RF processing unit 1l-10 may adjust a phase and a size of each of signals transmitted or received through the plurality of antennas or antenna elements. The RF processing unit may perform a downlink MIMO operation by transmitting one or more layers.

The baseband processing unit 1l-20 performs a function of conversion between a baseband signal and a bit string according to a physical layer specification of a first radio access technology. For example, when data is transmitted, the baseband processing unit 1l-20 generates complex symbols by encoding and modulating a transmission bit string. Further, when data is received, the baseband processing unit 1l-20 reconstructs a reception bit string by demodulating and decoding a baseband signal provided from the RF processing unit 1l-10. For example, in accordance with an OFDM scheme, when data is transmitted, the baseband processing unit 1l-20 may generate complex symbols by encoding and modulating the transmission bit string, map the complex symbols to subcarriers, and then configure OFDM symbols via an IFFT operation and CP insertion. In addition, when data is received, the baseband processing unit 1l-20 divides a baseband signal provided from the RF processing unit 1l-10 in units of OFDM symbols, reconstructs signals mapped with subcarriers via an FFT operation, and then reconstructs a reception bit string via demodulation and decoding. The baseband processing unit 1l-20 and the RF processing unit 1l-10 transmit and receive a signal as described above. Accordingly, the baseband processing unit 1l-20 and the RF processing unit 1l-10 may be referred to as a transmission unit, a reception unit, a transmission/reception unit, a communication unit, or a wireless communication unit.

The communication unit 1l-30 provides an interface for performing communication with other nodes within the network.

The storage unit 1l-40 stores data, such as a basic program, an application program, configuration information, and the like for the operation of the main base station. Particularly, the storage unit 1l-40 may store information on a bearer assigned to a connected terminal, a measurement result reported from the connected terminal, and the like. The storage unit 1l-40 may store information serving as a criterion for determining whether to provide the terminal with multiple connections or to suspend multiple connections. The storage unit 1l-40 provides stored data in response to a request of the control unit 1l-50.

The control unit 1l-50 controls overall operations of the main base station. For example, the control unit 1l-50 transmits or receives a signal via the baseband processing unit 1*l*-20 and the RF processing unit 1*l*-10 or via the backhaul communication unit 1*l*-30. The control unit 1*l*-50 records and reads data in the storage unit 1*l*-40. To this end, the control unit 1*l*-50 may include at least one processor. The control unit 1*l*-50 may further include a multi-connection processing unit 1*l*-52 configured to process a multi-connection.

Second Embodiment

Figure 2A:
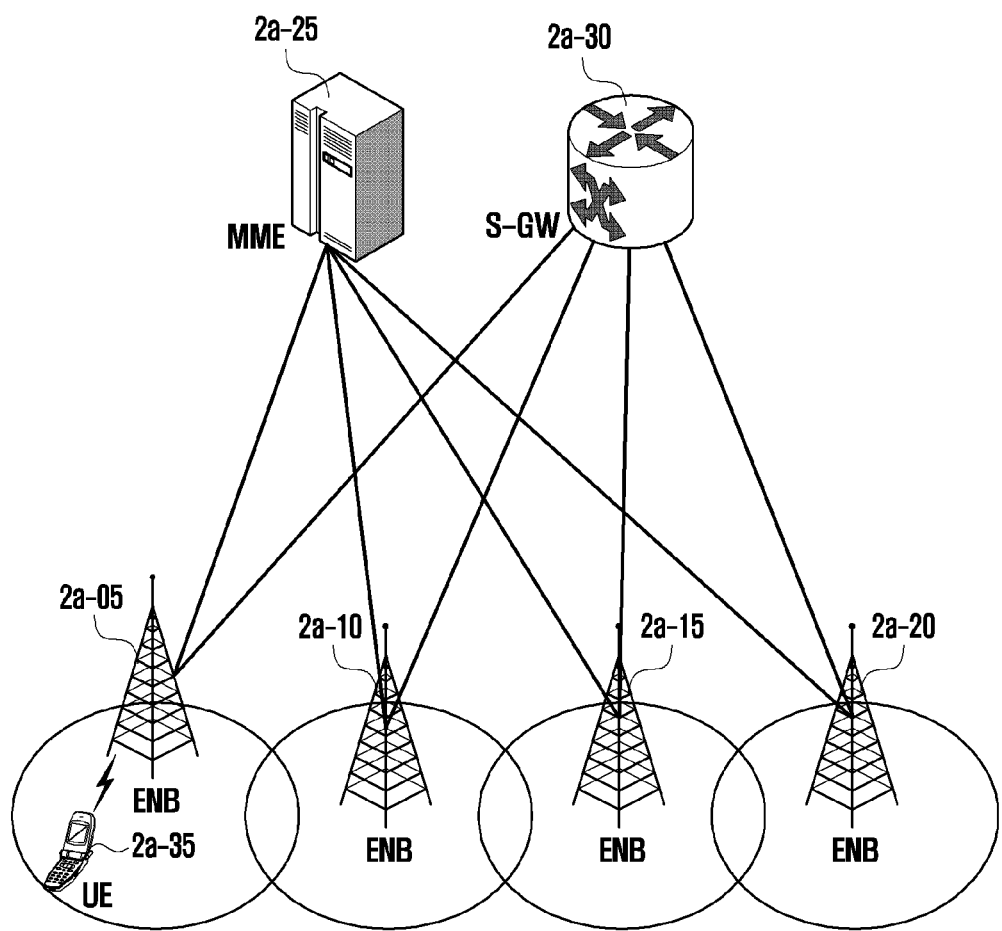
FIG. 2A is a diagram illustrating a structure of the LTE system to which the disclosure may be applied.

FIG. 2A is a diagram illustrating a structure of the LTE system to which the disclosure may be applied.

Referring to FIG. 2A, as illustrated, a radio access network of the LTE system includes next-generation base stations (evolved Node B, hereinafter, ENB, Node B, or base station) 2*a*-05, 2*a*-10, 2*a*-15, and 2*a*-20, a mobility management entity (MME) 2*a*-25, and a serving-gateway (S-GW) 2*a*-30. A user terminal (hereinafter, UE or terminal) 2*a*-35 accesses an external network via the eNBs 2*a*-05, 2*a*-10, 2*a*-15, and 2*a*-20 and the S-GW 2*a*-30.

In FIG. 2A, the eNBs 2*a*-05, 2*a*-10, 2*a*-15, and 2*a*-20 correspond to existing Node Bs of a UMTS system. The eNB is connected to the UE 2*a*-35 via a wireless channel and performs a more complicated role than an existing Node B. In the LTE system, because all user traffic including a real-time service, such as Voice over IP (VoIP) over the Internet protocol, is serviced through a shared channel, a device that collects state information, such as buffer states, available transmission power states, and channel states of UEs, to perform scheduling is necessary, and the eNBs 2*a*-05, 2*a*-10, 2*a*-15, and 2*a*-20 take charge of collecting the state information and performing scheduling. A single eNB typically controls a plurality of cells. For example, in order to implement a transmission rate of 100 Mbps, the LTE system uses an orthogonal frequency division multiplexing (hereinafter, referred to as OFDM) as a radio access technology in a bandwidth of 20 MHz. Further, an adaptive modulation & coding (AMC) scheme that determines a modulation scheme and a channel coding rate according to the channel state of the terminal is applied. The S-GW 2*a*-30 is a device that provides a data bearer, and generates or removes the data bearer under a control of the MME 2*a*-25. The MME is a device that performs various control functions as well as a mobility management function for the terminal, and is connected to a plurality of base stations.

Figure 2B:
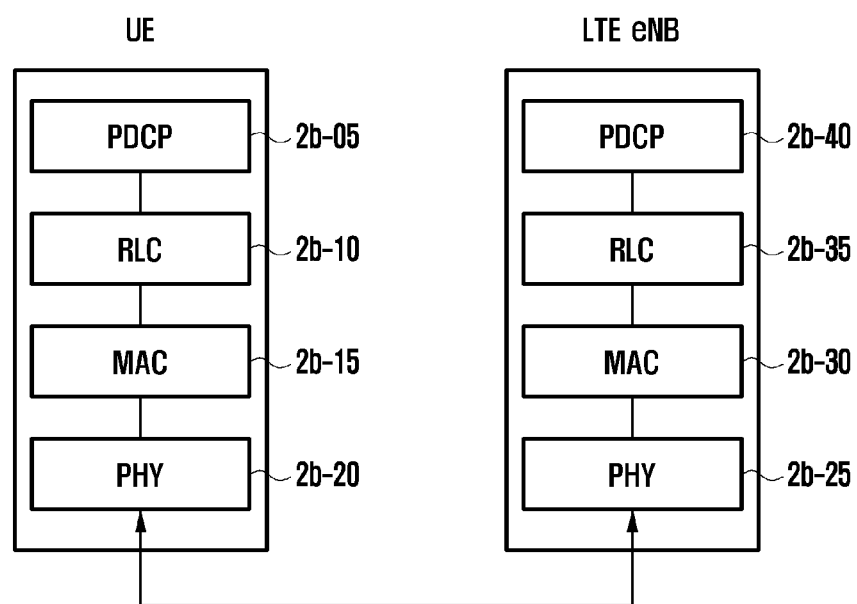
FIG. 2B is a diagram illustrating a radio protocol structure in the LTE system to which the disclosure may be applied.

FIG. 2B is a diagram illustrating a radio protocol structure in the LTE system to which the disclosure may be applied. Referring to FIG. 2B, a radio protocol of the LTE system includes packet data convergence protocols (PDCPs) b-05 and 2*b*-40, radio link controls (RLCs) 2*b*-10 and 2*b*-35, and medium access controls (MACs) 2*b*-15 and 2*b*-30 in the terminal and the eNB, respectively. The packet data convergence protocols (PDCP) 2*b*-05 and 2*b*-40 are in charge of operations, such as IP header compression/restoration, and the like. Main functions of PDCP are summarized as follows.

- a header compression and decompression function (ROHC only)
- a user data transmission function (transfer of user data)
- a sequential delivery function (in-sequence delivery of upper layer PDUs at PDCP re-establishment procedure for RLC AM)
- a reordering function (for split bearers in DC (only support for RLC AM): PDCP PDU routing for transmission and PDCP PDU reordering for reception)
- a duplicate detection function (duplicate detection of lower layer SDUs at PDCP re-establishment procedure for RLC AM)
- a retransmission function (retransmission of PDCP SDUs at handover and, for split bearers in DC, of PDCP PDUs at PDCP data-recovery procedure, for RLC AM)
- an encryption and decryption function (ciphering and deciphering)
- a timer-based SDU delete function (timer-based SDU discard in uplink)

Radio link control (hereinafter, referred to as RLC) 2*b*-10 and 2*b*-35 reconfigures packet data units (PDCP PDUs) to appropriate sizes to perform ARQ operations. Main functions of the RLC are summarized as follows.

- a data transmission function (transfer of upper layer PDUs)
- an ARQ function (error correction through ARQ (only for AM data transfer))
- a concatenation, segmentation, and reassembly function (concatenation, segmentation, and reassembly of RLC SDUs (only for UM and AM data transfer))
- a re-segmentation function (re-segmentation of RLC data PDUs (only for AM data transfer))
- a reordering function (reordering of RLC data PDUs (only for UM and AM data transfer))
- a duplicate detection function (duplicate detection (only for UM and AM data transfer))
- an error detection function (protocol error detection (only for AM data transfer))
- an RLC SDU deletion function (RLC SDU discard (only for UM and AM data transfer))
- an RLC re-establishment function (RLC re-establishment)

The MACs 2*b*-15 and 2*b*-30 are connected to multiple RLC layer devices included in one terminal, multiplex RLC protocol data units (MAC PDUs) to MAC PDUs, and demultiplex the RLC PDUs from the MAC PDUs. Main functions of the MAC are summarized as follows.

- a mapping function (mapping between logical channels and transport channels)
- a multiplexing and demultiplexing function (multiplexing/demultiplexing of MAC SDUs belonging to one or different logical channels into/from transport blocks (TB) delivered to/from the physical layer on transport channels)
- a scheduling information reporting function (scheduling information reporting)
- a HARQ function (error correction through HARQ)
- a function of priority control between logical channels (priority handling between logical channels of one UE)
- a function of priority control between terminals (priority handling between UEs by means of dynamic scheduling)
- an MBMS service identification function (MBMS service identification)
- a transmission format selection function (transport format selection)
- a padding function (padding)

Physical layers 2*b*-20 and 2*b*-25 perform channel-coding and modulation of upper layer data, make the channel-coded and modulated upper layer data into OFDM symbols and transmit the OFDM symbols via a wireless channel, or demodulate and channel-decode the OFDM symbols received through the wireless channel and deliver the same to the upper layer.

Figure 2C:
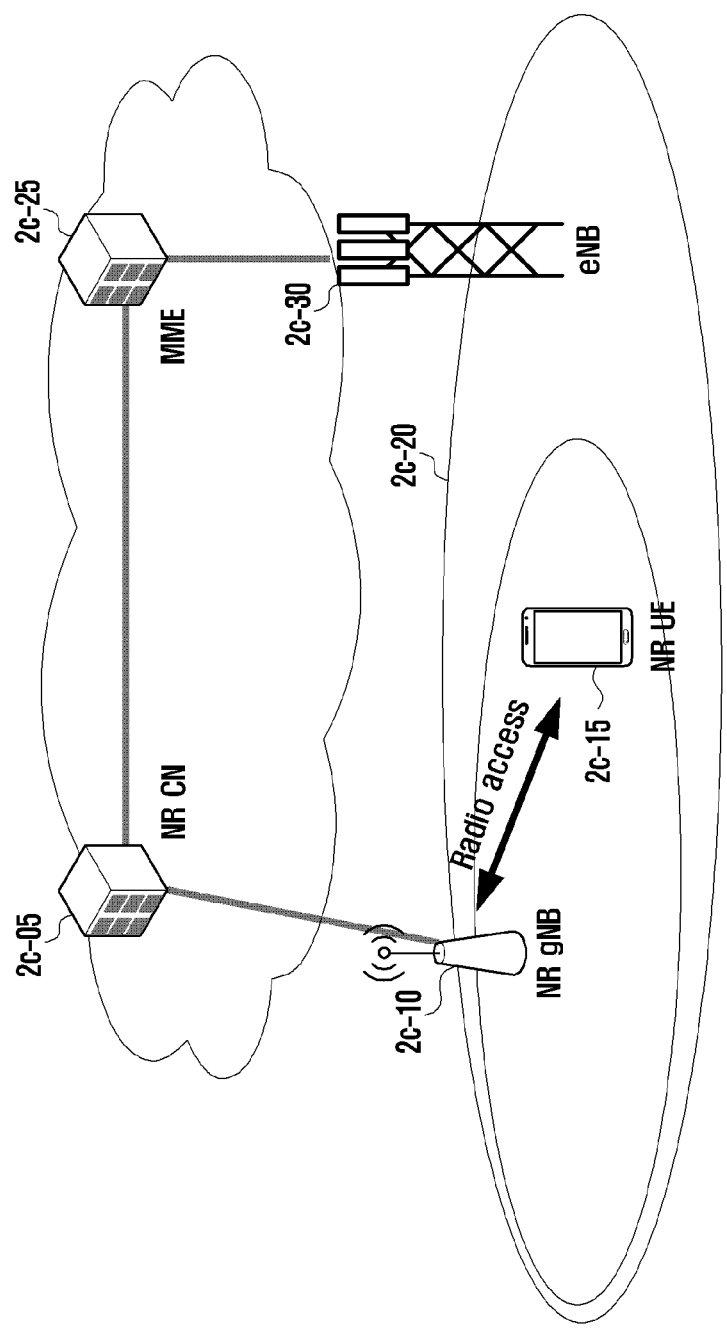
FIG. 2C is a diagram illustrating a structure of the next generation mobile communication system to which the disclosure may be applied.

FIG. 2C is a diagram illustrating a structure of the next generation mobile communication system to which the disclosure may be applied.

Referring to FIG. 2C, as illustrated, a radio access network of the next generation communication system includes a next generation base station (new radio Node B, hereinafter, NR gNB or NE base station) 2c-10 and a new radio core network (NR CN) 2c-05. A user terminal (new radio user equipment, hereinafter, NR UE or terminal) 2c-15 accesses an external network through the NR gNB 2c-10 and the NR CN 2c-05.

In FIG. 2C, the NR gNB 2c-10 corresponds to the evolved Node B (eNB) of the conventional LTE system. The NR gNB is connected to the NR UE 2c-15 via a wireless channel, and may provide a more superior service than an existing node B. In the next generation mobile communication system, because all user traffic is serviced through a shared channel, a device which collects state information, such as buffer states, available transmission power states, and channel states of UEs, to perform scheduling is necessary, and the NR gNB 2c-10 takes charge of collecting the state information to perform scheduling. One NR gNB typically controls a plurality of cells. In order to implement high-speed data transmission compared to the current LTE, an existing maximum bandwidth or more may be available, and orthogonal frequency division multiplexing (hereinafter, referred to as OFDM) may be used as a radio access technology to further combine a beamforming technology. Further, an adaptive modulation & coding (AMC) scheme that determines a modulation scheme and a channel coding rate according to the channel state of the terminal is applied. The NR CN 2c-05 performs functions, such as mobility support, bearer configuration, and QoS configuration. The NR CN is a device that performs various control functions as well as a mobility management function for the terminal, and is connected to a plurality of base stations. Further, the next generation mobile communication system may be linked to the conventional LTE system, and the NR CN is connected to the MME 2c-25 via a network interface. The MME is connected to the eNB 2c-30 that is an existing base station.

Figure 2D:
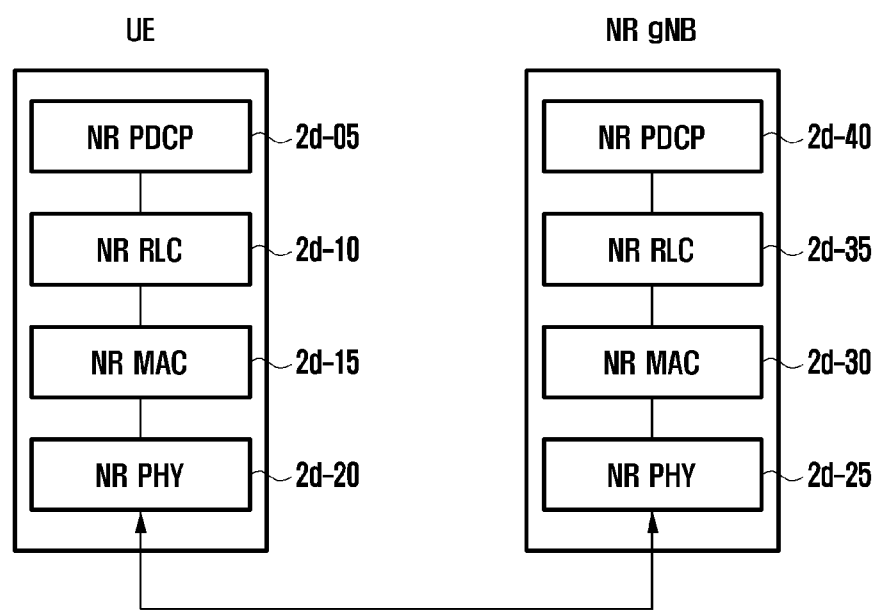
FIG. 2D is diagram illustrating a radio protocol structure of the next generation mobile communication system to which the disclosure may be applied.

FIG. 2D is diagram illustrating a radio protocol structure of the next generation mobile communication system to which the disclosure may be applied.

Referring to FIG. 2D, a radio protocol of the next generation mobile communication system includes NR PDCPs 2d-05 and 2d-40, NR RLCs 2d-10 and 2d-35, and NR MACs 2d-15 and 2d-30 in the terminal and the NR base station, respectively. Main functions of the NR PDCPs 2d-05 and 2d-40 may include a part of the following functions.

- a header compression and decompression function (ROHC only)
- a user data transmission function (transfer of user data)
- a sequential delivery function (in-sequence delivery of upper layer PDUs)
- a non-sequential delivery function (out-of-sequence delivery of upper layer PDUs)
- a reordering function (PDCP PDU reordering for reception)
- a duplicate detection function (duplicate detection of lower layer SDUs)
- a retransmission function (retransmission of PDCP SDUs)
- an encryption and decryption function (ciphering and deciphering)
- a timer-based SDU delete function (timer-based SDU discard in uplink)

In the above, the reordering function of an NR PDCP device refers to a function of rearranging the order (reordering) of PDCP PDUs received in a lower layer, in the order based on PDCP sequence numbers (SN), may include a function of delivering data to an upper layer in the rearranged order or may include a function of directly delivering data without considering the order, may include a function of rearranging the order and recording lost PDCP PDUs, may include a function of reporting states of the lost PDCP PDUs to a transmission side, and may include a function of requesting to retransmit the lost PDCP PDUs.

Main functions of the NR RLCs 2d-10 and 2d-35 may include a part of the following functions.

- a data transmission function (transfer of upper layer PDUs)
- a sequential delivery function (in-sequence delivery of upper layer PDUs)
- a non-sequential delivery function (out-of-sequence delivery of upper layer PDUs)
- an ARQ function (error Correction through ARQ)
- a concatenation, segmentation, and reassembly function (concatenation, segmentation, and reassembly of RLC SDUs)
- a re-segmentation function (re-segmentation of RLC data PDUs)
- a reordering function (reordering of RLC data PDUs)
- a duplicate detection function (duplicate detection)
- an error detection function (protocol error detection)
- an RLC SDU deletion function (RLC SDU discard)
- an RLC re-establishment function (RLC re-establishment)

In the above, the sequential delivery function (in-sequence delivery) of an NR RLC device refers to a function of delivering RLC SDUs received from a lower layer to an upper layer in order, may include a function of, when an originally one RLC SDU is divided into a plurality of RLC SDUs and then received, reassembling and delivering the received RLC PDUs, may include a function of rearranging the received RLC PDUs on the basis of a RLC sequence numbers (SNs) or PDCP sequence numbers (SNs), may include a function of rearranging the order and recording lost RLC PDUs, may include a function of reporting statuses of the lost RLC PDUs to a transmission side, may include a function of requesting to retransmit the lost RLC PDUs, and may include a function of, when there is a lost RLC PDU, delivering only RLC PDUs before the lost RLC PDU to the upper layer in order. Alternatively, the sequential delivery function (in-sequence delivery) may include a function of, although there is the lost RLC SDU, if a predetermined timer has been expired, delivering all RLC SDUs received before starting of the timer to the upper layer in order, or may include a function of, although there is the lost RLC SDU, if the predetermined timer has been expired, delivering all RLC SDUs received up to the present time to the upper layer in order. In the above, the RLC PDUs may be processed in the order of reception thereof (in the order of arrival regardless of the order of the sequence numbers or serial numbers) and may be delivered to the PDCP device regardless of the order (out-of-sequence delivery). In the case of segments, segments stored in a buffer or to be received at a later time may be received, reconfigured into one complete RLC PDU, processed, and then may be delivered to the PDCP device. The NR RLC layer may not include a concatenation function, and the function may be performed in an NR MAC layer or may be replaced with a multiplexing function of the NR MAC layer.

In the above, the non-sequential delivery function (out-of-sequence delivery) of the NR RLC device refers to a function of delivering RLC PDUs received from a lower layer to an immediate upper layer regardless of the order, may include a function of, when originally one RLC SDU is divided into a plurality of RLC SDUs and received, reassembling and delivering the received RLC SDUs, and may include a function of storing the RLC SN or PDCP SN of the received RLC PDUs, arranging the order thereof, and recording lost RLC PDUs.

The NR MAC 2d-15 or 2d-30 may be connected to multiple NR RLC layer devices included in one terminal, and main functions of the NR MAC may include a part of the following functions.

- a mapping function (mapping between logical channels and transport channels)
- a multiplexing and demultiplexing function (multiplexing/demultiplexing of MAC SDUs)
- a scheduling information reporting function (scheduling information reporting)
- a HARQ function (error correction through HARQ)
- a function of priority control between logical channels (priority handling between logical channels of one UE)
- a function of priority control between terminals (priority handling between UEs by means of dynamic scheduling)
- an MBMS service identification function (MBMS service identification)
- a transmission format selection function (transport format selection)
- a padding function (padding)

NR PHY layers 2d-20 and 2d-25 may perform channel-coding and modulation of upper layer data, making the channel-coded and modulated upper layer data into OFDM symbols and transmitting the OFDM symbols via a wireless channel, or demodulating and channel-decoding the OFDM symbols received through the wireless channel and delivering the same to the upper layer.

Figure 2E:
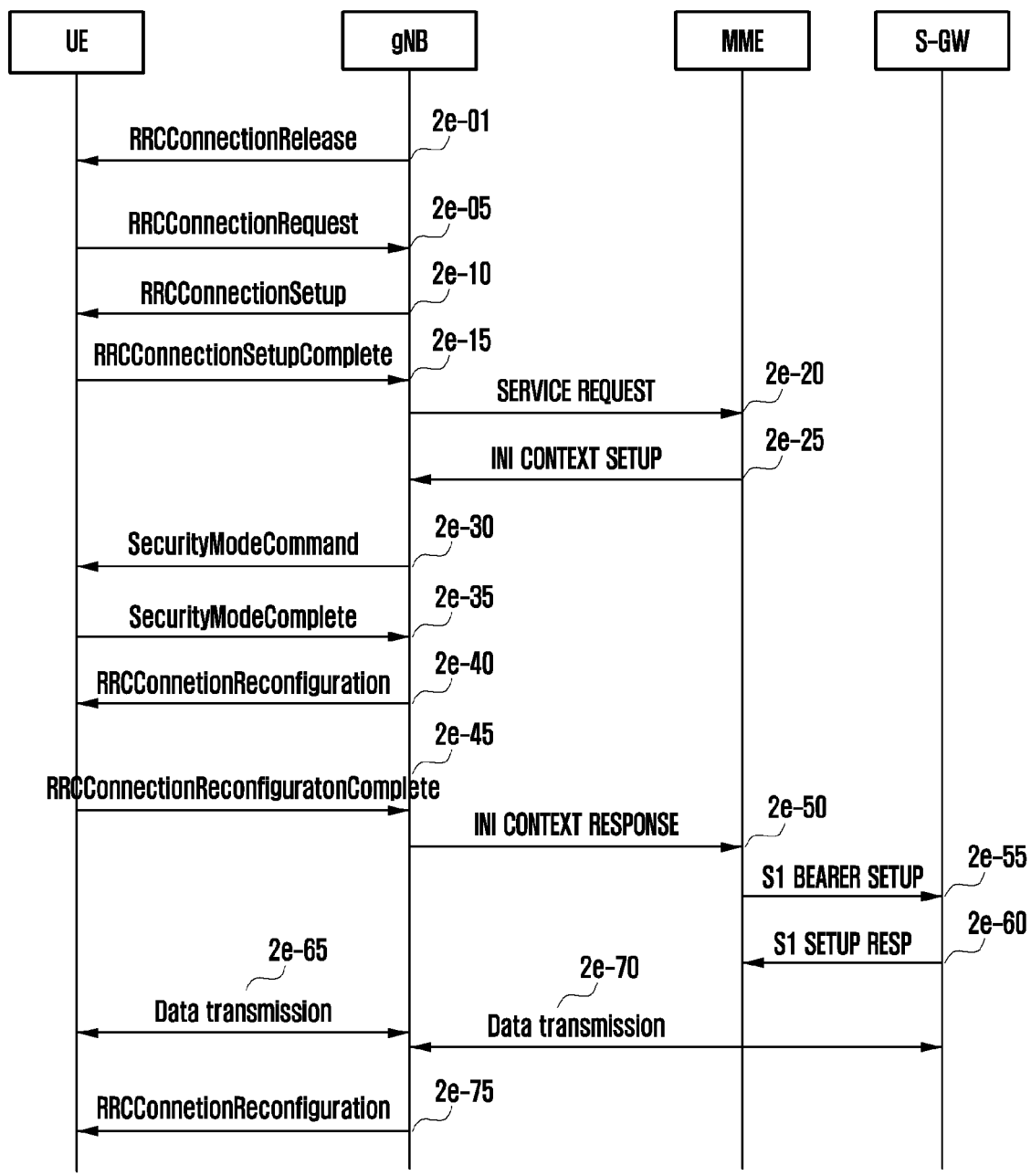
FIG. 2E is a diagram illustrating a procedure of switching from an RRC idle mode to an RRC connected mode to establish a connection to a network, by a terminal.

FIG. 2E is a diagram illustrating a procedure of switching from an RRC idle mode to an RRC connected mode to establish a connection to a network, by a terminal.

In FIG. 2E, if there is no data transmission or reception for a predetermined reason or for a predetermined time, a base station that transmits or receives data in an RRC connection mode may transmit an RRCConnectionRelease message 2e-01 to a terminal so that a mode of the terminal is switched to an RRC idle mode. Subsequently, the terminal (hereinafter, an idle mode UE) that is not currently configured for connection performs an RRC connection establishment procedure with the base station when data to be transmitted is generated. The terminal establishes reverse transmission synchronization with the base station via a random access procedure and transmits an RRCConnectionRequest message 2e-05 to the base station. The message includes an identifier of the terminal, a reason (establishmentCause) for establishing a connection, and the like.

The base station transmits an RRCConnectionSetup message 2e-10 so that the terminal establishes an RRC connection. The message may include configuration information on whether to perform a buffer status report (BSR) in response to a network request for each service/bearer/logical channel, and the message also includes RRC connection establishment information, and the like. The RRC connection is also referred to as a signaling radio bearer (SRB) and is used for transmitting or receiving an RRC message, which is a control message between the terminal and the base station.

The terminal that has established the RRC connection transmits an RRCConnetionSetupComplete message 2e-15 to the base station. The message includes a control message referred to as SERVICE REQUEST which is for the terminal to request the MME to establish a bearer for a predetermined service. The base station transmits the SERVICE REQUEST message 2e-20 included in the RRCConnetionSetupComplete message to the MME, and the MME determines whether to provide a service requested by the terminal. If the terminal determines, as a determination result, to provide the requested service, the MME transmits an INITIAL CONTEXT SETUP REQUEST message 2e-25 to the base station. The message includes information, such as quality of service (QoS) information to be applied when configuring a data radio bearer (DRB), and security related information (e.g., a security key and a security algorithm) to be applied to the DRB.

The base station exchanges a SecurityModeCommand message 2e-30 and a SecurityModeComplete message 2e-35 with the terminal to establish security. When the security configuration is completed, the base station transmits an RRCConnectionReconfiguration message 2e-40 to the terminal. The message may include configuration information on whether to perform a buffer status report (BSR) in response to a network request for each service/bearer/logical channel, and the message also includes configuration information of the DRB in which user data is to be processed, wherein the terminal configures the DRB by applying the information and transmits an RRCConnectionReconfigurationComplete message 2e-45 to the base station.

The base station having completed DRB configuration with the terminal transmits an INITIAL CONTEXT SETUP COMPLETE message 2e-50 to the MME, and the MME having received the message exchanges an S1 BEARER SETUP message 2e-55 and an S1 BEARER SETUP RESPONSE message 2e-60 to configure an S-GW and an S1 bearer. The S1 bearer is a data transmission connection established between the S-GW and the base station and corresponds one-to-one to the DRB. When all the above procedures are completed, the terminal transmits data to or receives data from the base station via the S-GW 2e-65 and 2e-70.

Likewise, a general data transmission procedure includes mainly three steps of RRC connection establishment, security configuration, and DRB configuration. The base station may transmit an RRCConnectionReconfiguration message 2e-75 to the terminal to update, add, or change a configuration for a predetermined reason. The message may include configuration information on whether to perform a buffer status report (BSR) in response to a network request for each service/bearer/logical channel, and the base station may request the BSR by means of the RRC message.

FIG. 2F is a diagram illustrating a (2-1)th embodiment of a method for requesting a buffer status report based on the network in the disclosure.

2f-05 and 2f-10 in FIG. 2F are diagrams showing examples of a MAC sub-header structure. In the next generation mobile communication system, the MAC sub-header may include a 6-bit LCID field, an F field (a field indicating the size of an L field), and an L field (a field indicating the size of an MAC SDU). The MAC sub-header may include an R field or new fields for other purposes/functions.

In the disclosure, a network/base station may define a polling (P) field in a MAC sub-header, as in 2f-05 and 2f-10, in order to request a BSR from a terminal. The P field may mean that a buffer status report (BSR) is requested for a logical channel indicated by an LCID field of a corresponding MAC sub-header (or a logical channel group to which the logical channel belongs). For example, when the P field is configured to 1 in the received MAC sub-header, the terminal may check a buffer status of the logical channel (or the logical channel group to which the logical channel belongs) and may prepare to report the buffer status.

Figure 2G:
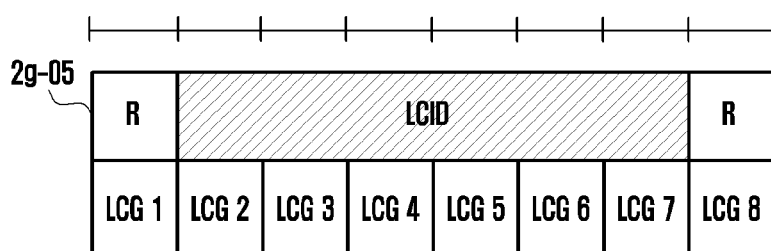
FIG. 2G is a diagram illustrating a (2-2)th embodiment of a method for requesting the buffer status report based on the network in the disclosure.

FIG. 2G is a diagram illustrating a (2-2)th embodiment of a method for requesting the buffer status report based on the network in the disclosure.

In FIG. 2G, a network may define a new MAC control element (MAC CE) to indicate a buffer status report request to a terminal. Defining of the new MAC CE means that one LCID value among values available for a 6-bit LCID field is allocated for the new MAC CE. The new MAC CE may have a format such as 2g-05. That is, the network/base station indicates, using the LCID, the new MAC CE requesting a buffer status report, and a logical channel group, for which the buffer status report is necessary, among 8 logical channel groups may be indicated using 1 byte by means of a bitmap method. That is, each bit corresponding to 1 byte (8 bits) may be mapped to each logical channel group, and the buffer status report may be performed only for a logical channel group configured to 1. For example, when the base station transmits a MAC CE, such as 2g-05, to the terminal, if it is desired to request a buffer status for logical channel groups 1, 3, and 5, first, third, and fifth bits may be configured to 1, and the MAC CE may be transmitted to the terminal. The terminal having received the MAC CE may check a buffer status for a logical channel group corresponding to each bit, and may prepare to report the buffer status. A content of the newly defined MAC CE may have a different size instead of the above-described 1 byte, and may indicate each logical channel or each logical channel group in a different form.

Figure 2H:
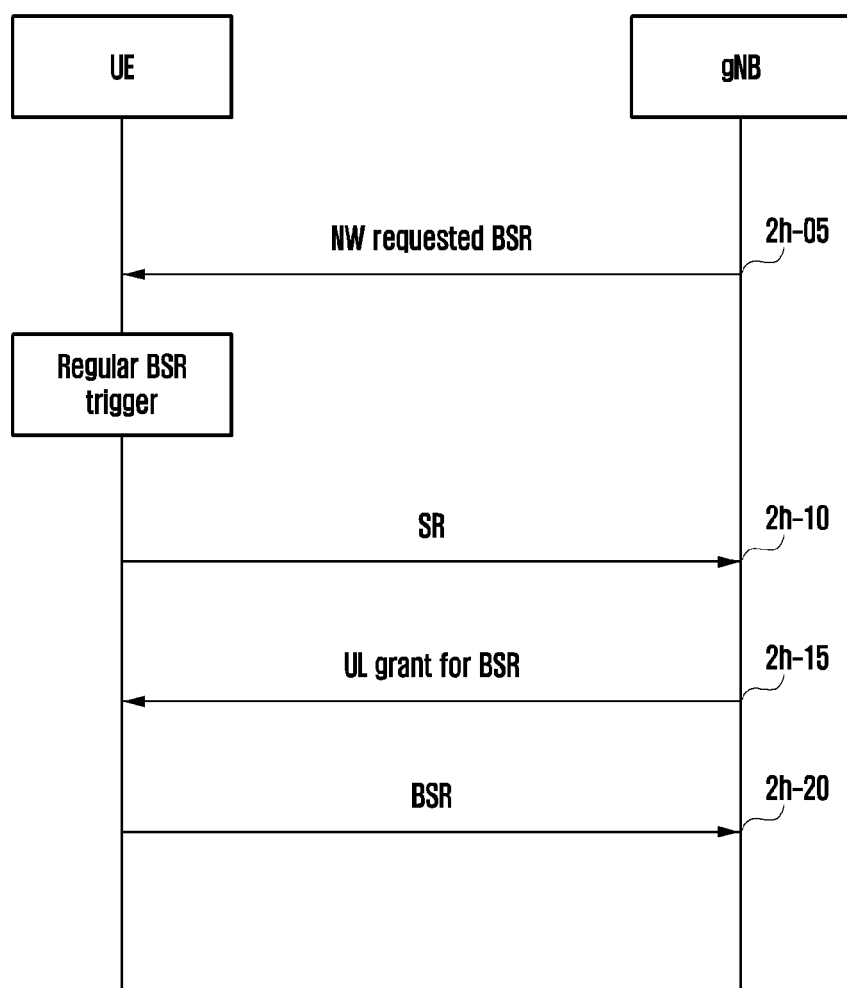
FIG. 2H is a diagram illustrating the (2-1)th embodiment of a buffer status report procedure, to which the (2-1)th embodiment or the (2-2)th embodiment of the method for requesting the buffer status report based on the network is applied, in the disclosure.

FIG. 2H is a diagram illustrating the (2-1)th embodiment of a buffer status report procedure, to which the (2-1)th embodiment or the (2-2)th embodiment of the method for requesting the buffer status report based on the network is applied, in the disclosure.

The terminal may receive a buffer status report request 2h-05 from the base station according to the above-described network-based buffer status report request method (the (2-1)th embodiment or the (2-2) the embodiment). When the terminal receives the network-based buffer statue report request (NW requested BSR), the terminal may trigger a regular BSR and, if necessary, may reset a BSR retransmission timer (retxBSRtimer) to zero. When the regular BSR is triggered in the terminal, the terminal may make a scheduling request to the base station in order to request a transmission resource for transmitting the BSR (SR, scheduling request, 2h-10), and the base station may allocate 2h-15 the transmission resource therefor. When the transmission resource for the buffer status report is allocated, the terminal transmits 2h-20 the buffer status report for logical channels or logical channel groups requested by the network.

Figure 2I:
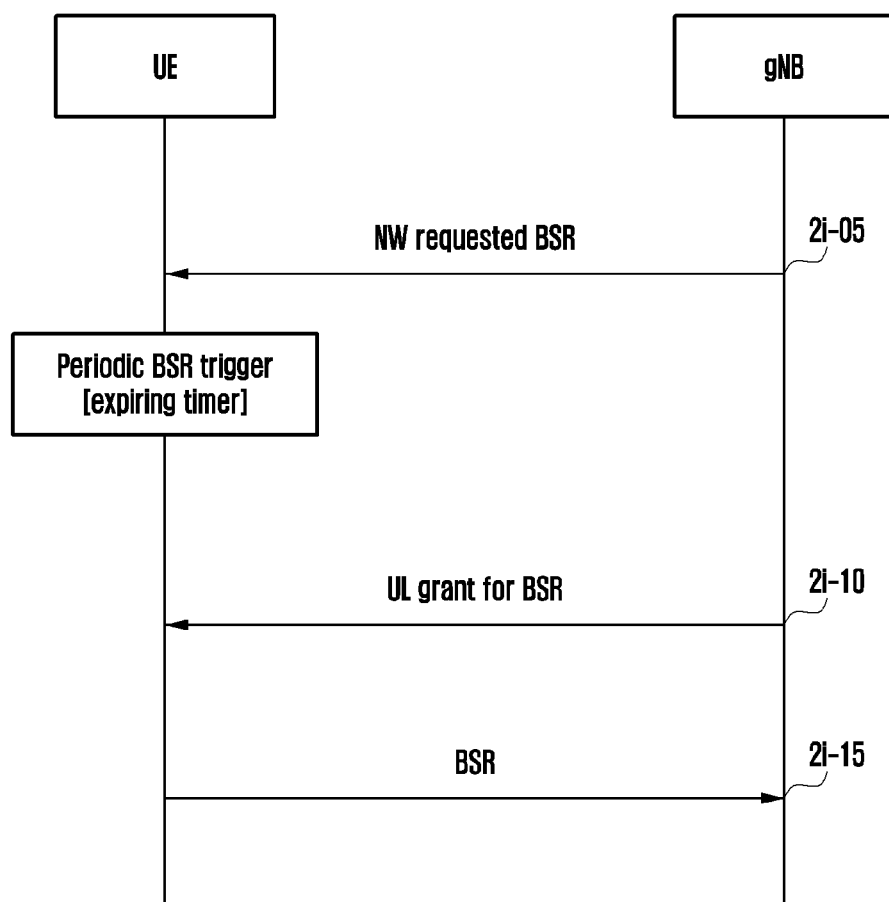
FIG. 2I is a diagram illustrating a (2-2)th embodiment of the buffer status report procedure, to which the (2-1)th embodiment or the (2-2)th embodiment of the method for requesting the buffer status report based on the network is applied, in the disclosure.

FIG. 2I is a diagram illustrating a (2-2)th embodiment of the buffer status report procedure, to which the (2-1)th embodiment or the (2-2)th embodiment of the method for requesting the buffer status report based on the network is applied, in the disclosure.

The terminal may receive a buffer status report request 2i-05 from the base station according to the above-described network-based buffer status report request method (the (2-1)th embodiment or the (2-2) the embodiment). When the terminal receives the network-based buffer status report request, the terminal triggers a periodic BSR. Triggering of the periodic BSR means that a periodic timer expires and the BSR is ready to be transmitted. That is, the terminal allows expiration of the periodic timer and resets the periodic timer to zero. (The terminal may also reset a BSR retransmission timer (retxBSRtimer) to 0 if necessary.) When the periodic BSR is triggered, the terminal prepares to perform buffer status reporting for the logical channels or logical channel groups requested by the network for transmission of the BSR. Because the network/base station has requested the buffer status report, the network/base station may allocate 2i-10, to the terminal, a transmission resource for reporting the buffer status immediately or after a predetermined time. When the transmission resource for the buffer status report is allocated, the terminal transmits 2i-15 the buffer status report for logical channels or logical channel groups requested by the network.

Figure 2J:
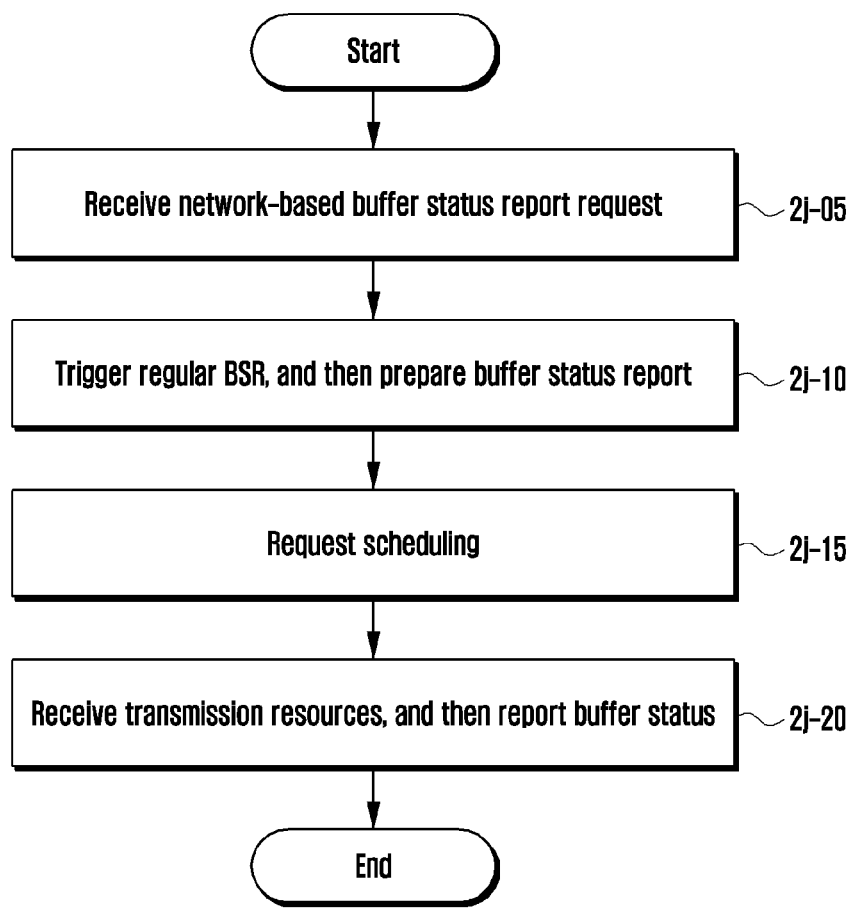
FIG. 2J is a diagram illustrating a terminal operation for the (2-1)th embodiment of a buffer status report procedure, to which the (2-1)th embodiment or the (2-2)th embodiment of a method for requesting a buffer status report based on the network is applied, in the disclosure.

FIG. 2J is a diagram illustrating a terminal operation for the (2-1)th embodiment of a buffer status report procedure, to which the (2-1)th embodiment or the (2-2)th embodiment of a method for requesting a buffer status report based on the network is applied, in the disclosure.

The terminal may receive a buffer status report request 2j-05 from the base station according to the above-described network-based buffer status report request method (the (2-1)th embodiment or the (2-2) the embodiment). If the terminal receives the network-based buffer statue report request, the terminal may trigger a regular BSR and, if necessary, may reset 2j-10 a BSR retransmission timer (retxBSRtimer) to zero. When the regular BSR is triggered, the terminal may make a scheduling request to the base station in order to request a transmission resource for transmitting the BSR (SR, scheduling request, 2j-15), and the base station may allocate the transmission resource therefor. When the transmission resource for the buffer status report is allocated, the terminal transmits 2j-20 the buffer status report for logical channels or logical channel groups requested by the network.

Figure 2K:
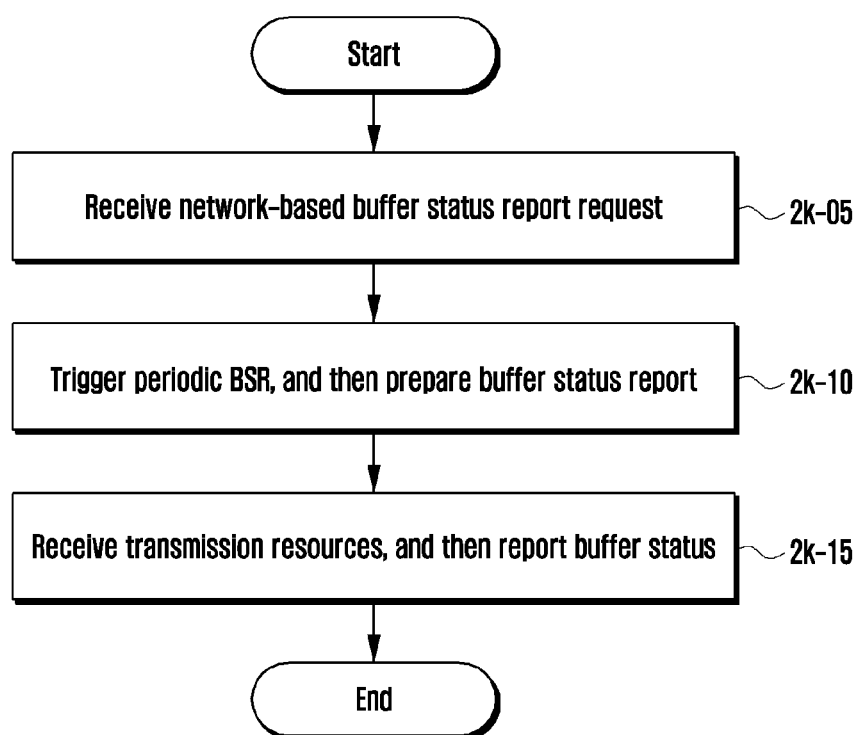
FIG. 2K is a diagram illustrating a terminal operation for a (2-2)th embodiment of a buffer status report procedure, to which the (2-1)th embodiment or the (2-2)th embodiment of the method for requesting the buffer status report based on the network is applied, in the disclosure.

FIG. 2K is a diagram illustrating a terminal operation for a (2-2)th embodiment of a buffer status report procedure, to which the (2-1)th embodiment or the (2-2)th embodiment of the method for requesting the buffer status report based on the network is applied, in the disclosure.

The terminal may receive a buffer status report request 2k-05 from the base station according to the above-described network-based buffer status report request method (the (2-1)th embodiment or the (2-2) the embodiment). When the terminal receives the network-based buffer status report request, the terminal triggers a periodic BSR 2k-10. Triggering of the periodic BSR means that a periodic timer expires and the BSR is ready to be transmitted. That is, the terminal allows expiration of the periodic timer and resets the periodic timer to zero. (The terminal may also reset a BSR retransmission timer (retxBSRtimer) to 0 if necessary.) When the periodic BSR is triggered, the terminal prepares to perform buffer status reporting for the logical channels or logical channel groups requested by the network for transmission of the BSR. Because the network/base station has requested the buffer status report, the network/base station may allocate, to the terminal, a transmission resource for reporting the buffer status immediately or after a predetermined time. When the transmission resource for the buffer status report is allocated, the terminal transmits 2k-15 the buffer status report for logical channels or logical channel groups requested by the network.

Figure 2L:
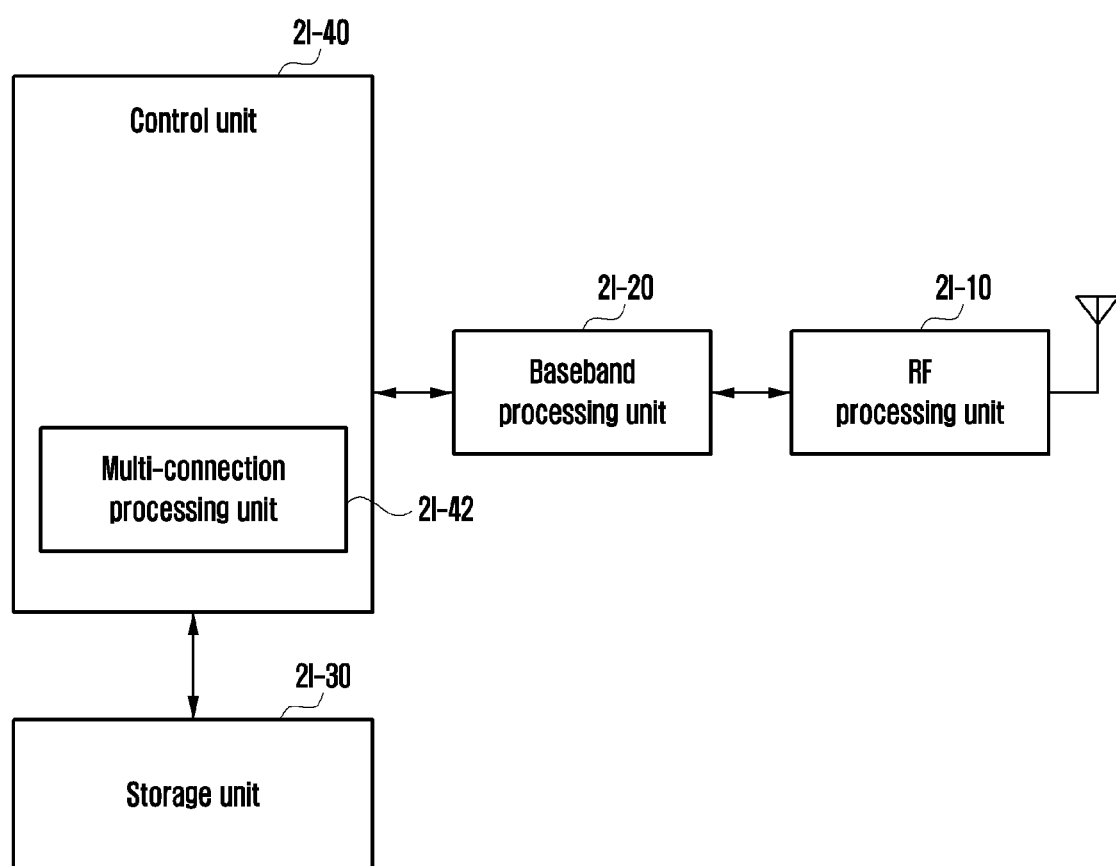
FIG. 2L is a diagram illustrating a structure of a terminal to which an embodiment of the disclosure may be applied.

FIG. 2L illustrates a structure of a terminal to which an embodiment of the disclosure may be applied.

Referring to FIG. 2H, the terminal includes a radio frequency (RF) processing unit 2*l*-10, a baseband processing unit 2*l*-20, a storage unit 2*l*-30, and a control unit 2*l*-40.

The RF processing unit 2*l*-10 performs a function for transmitting or receiving a signal through a wireless channel, such as band conversion and amplification of a signal. That is, the RF processing unit 2*l*-10 up-converts a baseband signal provided from the baseband processing unit 2*l*-20 into an RF band signal, transmits the converted RF band signal through an antenna, and then down-converts the RF band signal received through the antenna into a baseband signal. For example, the RF processing unit 2*l*-10 may include a transmission filter, a reception filter, an amplifier, a mixer, an oscillator, a digital-to-analog convertor (DAC), an analog-to-digital convertor (ADC), and the like. In FIG. 2L, only one antenna is illustrated, but the terminal may have a plurality of antennas. In addition, the RF processing unit 2*l*-10 may include a plurality of RF chains. Moreover, the RF processing unit 2*l*-10 may perform beamforming. For the beamforming, the RF processing unit 2*l*-10 may adjust a phase and a size of each of signals transmitted or received through a plurality of antennas or antenna elements. The RF processing unit may perform MIMO, and may receive multiple layers when performing MIMO operations. The RF processing unit 2*l*-10 may perform reception beam sweeping by appropriately configuring the plurality of antennas or antenna elements under the control of the control unit, or may adjust the direction and beam width of the reception beam so that the reception beam is coordinated with a transmission beam.

The baseband processing unit 2*l*-20 performs a function for a conversion between a baseband signal and a bit string according to a physical layer standard of the system. For example, when data is transmitted, the baseband processing unit 2*l*-20 generates complex symbols by encoding and modulating a transmission bit string. Further, when data is received, the baseband processing unit 2*l*-20 reconstructs a reception bitstream by demodulating and decoding a baseband signal provided from the RF processing unit 2*l*-10. For example, in an OFDM (orthogonal frequency division multiplexing) scheme, when data is transmitted, the baseband processing unit 2*l*-20 generates complex symbols by encoding and modulating a transmission bit string, maps the complex symbols to subcarriers, and then configures OFDM symbols through an IFFT (inverse fast Fourier transform) operation and a CP (cyclic prefix) insertion. Further, when data is received, the baseband processing unit 2*l*-20 divides the baseband signal provided from the RF processor 2*l*-10 in the units of OFDM symbols, reconstructs the signals mapped to the subcarriers, via an FFT (fast Fourier transform) operation, and then reconstructs a reception bit string via demodulation and decoding.

The baseband processing unit 2*l*-20 and the RF processing unit 2*l*-10 transmit and receive a signal as described above. Accordingly, the baseband processing unit 2*l*-20 and the RF processing unit 2*l*-10 may be referred to as a transmission unit, a reception unit, a transmission/reception unit, or a communication unit. Moreover, at least one of the baseband processing unit 2*l*-20 and the RF processing unit 2*l*-10 may include a plurality of communication modules to support a plurality of different radio access technologies. In addition, at least one of the baseband processing unit 2*l*-20 and the RF processing unit 2*l*-10 may include different communication modules to process signals of different frequency bands. For example, the different radio access technologies may include an LTE network, an NR network, and the like. Further, the different frequency bands may include a super high frequency (SHF) (i.e., 2.5 GHz and 5 Ghz) band and a millimeter (mm) wave (i.e., 60 GHz) band.

The storage unit 2*l*-30 stores data, such as a basic program, an application program, and configuration information, and the like for operation of the terminal. The storage unit 2*l*-30 provides stored data in response to a request of the control unit 2*l*-40.

The controller 2*l*-40 controls overall operations of the terminal. For example, the control unit 2*l*-40 transmits or receives a signal via the baseband processing unit 2*l*-20 and the RF processing unit 2*l*-10. The control unit 2*l*-40 records and reads data in the storage unit 2*l*-40. To this end, the control unit 2*l*-40 may include at least one processor. For example, the control unit 2*l*-40 may include a communication processor (CP) that performs control for communication and an application processor (AP) that controls a higher layer, such as an application program. The control unit 2*l*-40 may further include a multi-connection processing unit 2*l*-42 configured to process a multi-connection.

Figure 2M:
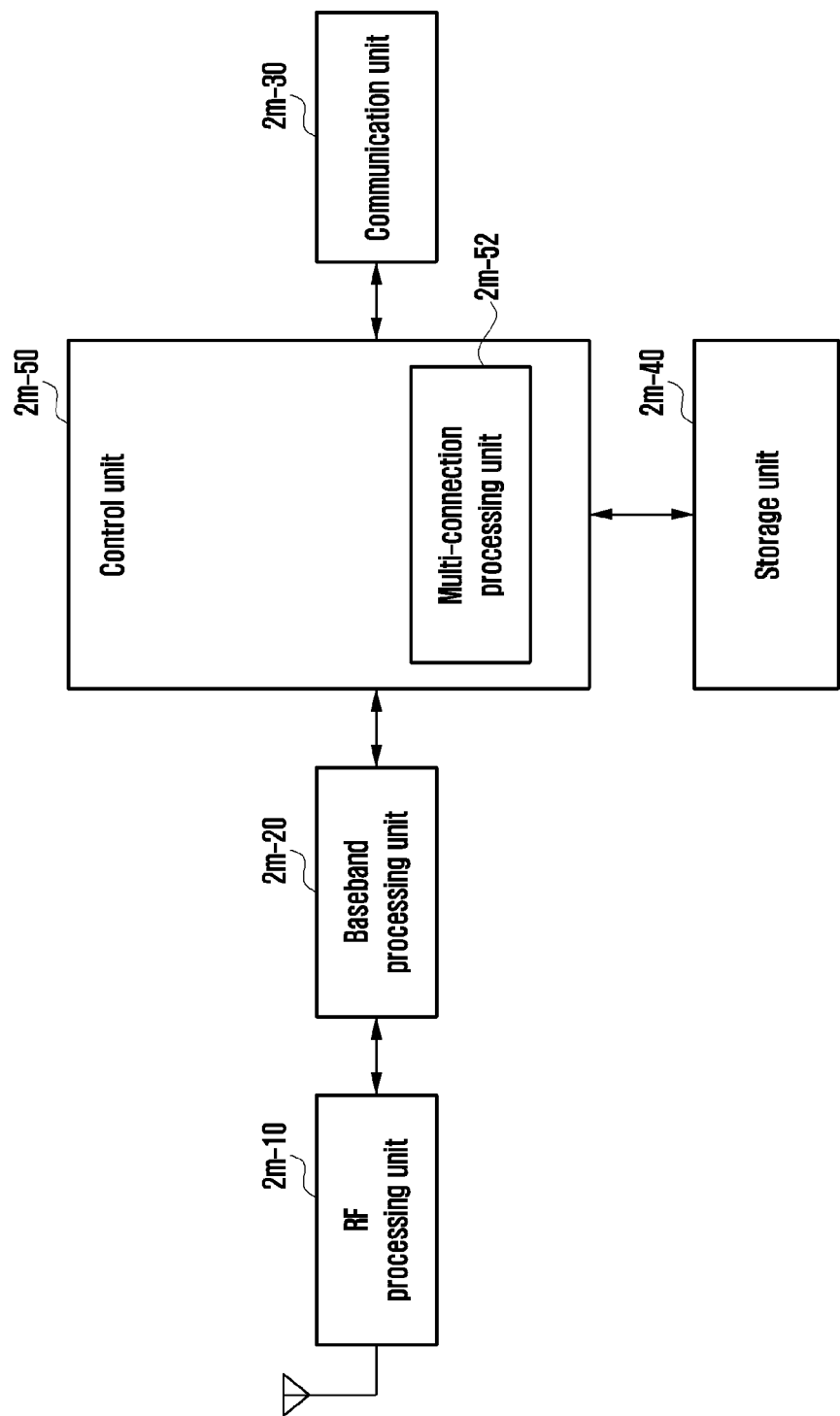
FIG. 2M is a diagram illustrating a block configuration of the TRP in the wireless communication system to which an embodiment of the disclosure may be applied.

FIG. 2M is a diagram illustrating a block configuration of the TRP in the wireless communication system to which an embodiment of the disclosure may be applied.

As illustrated in FIG. 2M, a base station includes an RF processing unit 2*m*-10, a baseband processing unit 2*m*-20, a backhaul communication unit 2*m*-30, a storage unit 2*m*-40, and a control unit 2*m*-50.

The RF processing unit 2*m*-10 performs a function for transmitting or receiving a signal through a wireless channel, such as band conversion and amplification of a signal. That is, the RF processing unit 2*m*-10 up-converts a baseband signal provided from the baseband processing unit 2*m*-20 into an RF band signal, transmits the converted signal through an antenna, and then down-converts an RF band signal received through the antenna into a baseband signal. For example, the RF processing unit 2*m*-10 may include a transmission filter, a reception filter, an amplifier, a mixer, an oscillator, a DAC, and an ADC. In FIG. 2M, only one antenna is illustrated, but a first access node may include a plurality of antennas. In addition, the RF processing unit 2*m*-10 may include a plurality of RF chains. The RF processing unit 2*m*-10 may perform beamforming. For the beamforming, the RF processing unit 2*m*-10 may adjust a phase and a size of each of signals transmitted or received through the plurality of antennas or antenna elements. The RF processing unit may perform a downlink MIMO operation by transmitting one or more layers.

The baseband processing unit 2*m*-20 performs a function of conversion between a baseband signal and a bit string according to a physical layer specification of a first radio access technology. For example, when data is transmitted, the baseband processing unit 2*m*-20 generates complex symbols by encoding and modulating a transmission bit string. Further, when data is received, the baseband processing unit 2*m*-20 reconstructs a reception bit string by demodulating and decoding a baseband signal provided from the RF processing unit 2*m*-10. For example, in accordance with an OFDM scheme, when data is transmitted, the baseband processing unit 2*m*-20 generates complex symbols by encoding and modulating the transmission bit string, maps the complex symbols to subcarriers, and then configures OFDM symbols via an IFFT operation and CP insertion. In addition, when data is received, the baseband processing unit 2*m*-20 divides a baseband signal provided from the RF processing unit 2*m*-10 in units of OFDM symbols, reconstructs signals mapped to subcarriers, via an FFT operation, and then reconstructs a reception bit string via demodulation and decoding. The baseband processing unit 2m-20 and the RF processing unit 2m-10 transmit and receive a signal as described above. Accordingly, the baseband processing unit 2m-20 and the RF processing unit 2m-10 may be referred to as transmission unit, a reception unit, a transmission/reception unit, a communication unit, or a wireless communication unit.

The communication unit 2m-30 provides an interface that performs communication with other nodes within the network.

The storage unit 2m-40 stores data, such as a basic program, an application program, configuration information, and the like for operation of the main base station. Particularly, the storage unit 2m-40 may store information on a bearer assigned to a connected terminal, a measurement result reported from the connected terminal, and the like. The storage unit 2m-40 may store information serving as a criterion for determining whether to provide the terminal with multiple connections or to suspend multiple connections. The storage unit 2m-40 provides stored data in response to a request of the control unit 2m-50.

The control unit 2m-50 controls overall operations of the base station. For example, the control unit 2m-50 transmits or receives a signal via the baseband processing unit 2m-20 and the RF processing unit 2m-10 or via the backhaul communication unit 2m-30. The control unit 2m-50 records and reads data in the storage unit 2m-40. To this end, the control unit 2m-50 may include at least one processor. The control unit 2m-50 may further include a multi-connection processing unit 2m-52 configured to process a multi-connection.

Third Embodiment

Figure 3A:
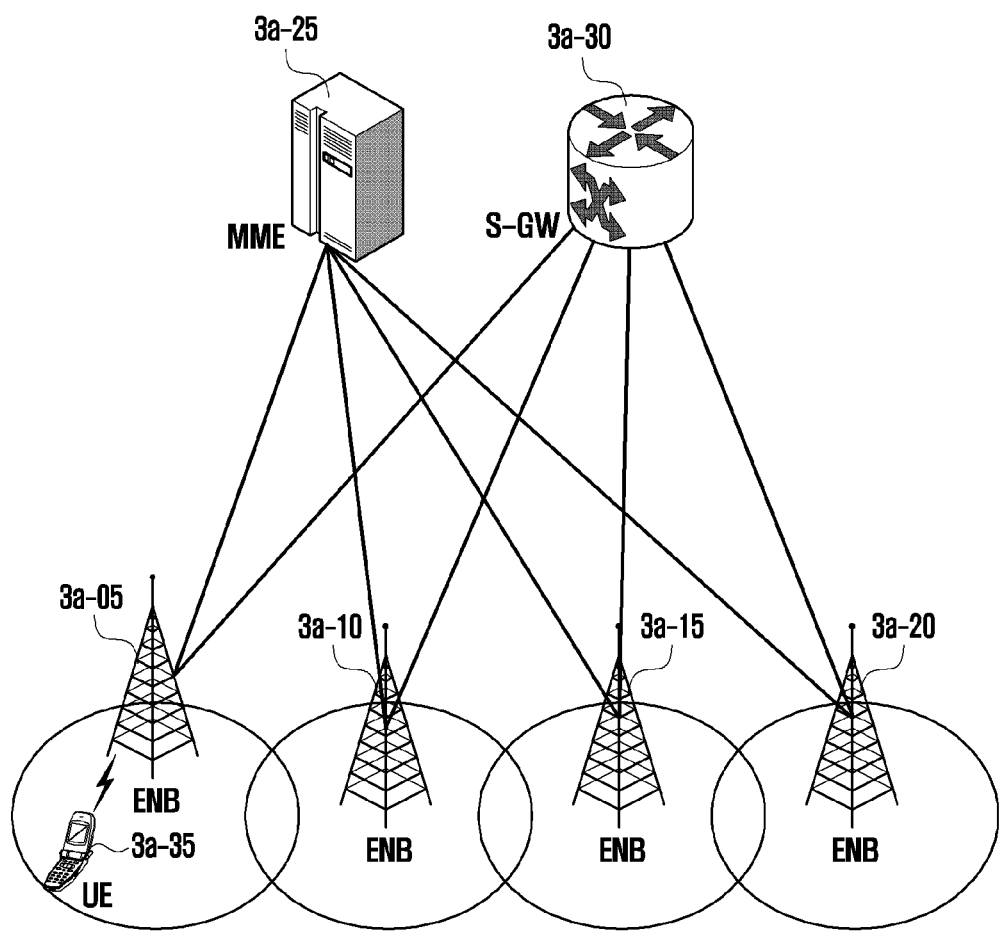
FIG. 3A is a diagram illustrating a structure of the LTE system for reference for reference for description of the disclosure.

FIG. 3A is a diagram illustrating a structure of the LTE system for reference for reference for description of the disclosure.

Referring to FIG. 3A, as illustrated, a radio access network of the LTE system includes next generation base stations (evolved Node B, hereinafter, eNB, Node B, or base station) 1a-05, 3a-10, 3a-15, and 3a-20, a mobility management entity (MME) 3a-25, and a serving-gateway (S-GW) 3a-30. A user terminal (hereinafter, UE or terminal) 3a-35 accesses an external network via the eNBs 3a-05, 3a-10, 3a-15, and 3a-20 and the S-GW 3a-30.

In FIG. 3A, the eNBs 3a-05, 3a-10, 3a-15, and 3a-20 correspond to existing Node Bs of a UMTS system. The eNB is connected to the UE 3a-35 via a wireless channel and performs a more complicated role than an existing Node B. In the LTE system, because all user traffic including a real-time service, such as voice over IP (VoIP) over the Internet protocol, is serviced through a shared channel, a device which collects state information, such as buffer states, available transmission power states, and channel states of UEs, to perform scheduling is necessary, and the eNBs 3a-05, 3a-10, 3a-15, and 3a-20 take charge of collecting the state information and performing scheduling. A single eNB typically controls a plurality of cells. For example, in order to implement a transmission rate of 100 Mbps, the LTE system uses an orthogonal frequency division multiplexing (hereinafter, referred to as OFDM) as a radio access technology in a bandwidth of 20 MHz. Further, an adaptive modulation & coding (AMC) scheme that determines a modulation scheme and a channel coding rate according to the channel state of the terminal is applied. The S-GW 3a-30 is a device that provides a data bearer, and generates or removes the data bearer under a control of the MME 3a-25. The MME is a device that performs various control functions as well as a mobility management function for the terminal, and is connected to a plurality of base stations.

Figure 3B:
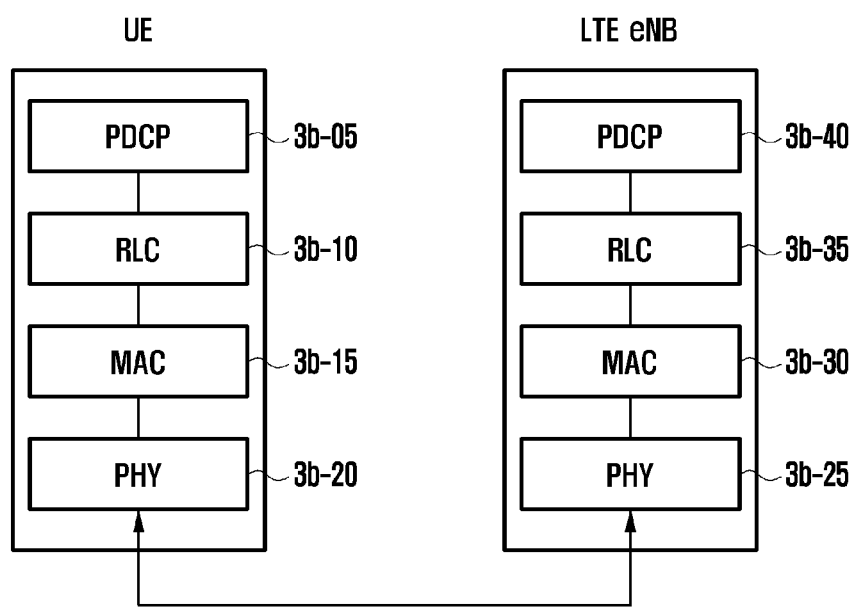
FIG. 3B is a diagram illustrating a radio protocol structure in the LTE system for reference for description of the disclosure.

FIG. 3B is a diagram illustrating a radio protocol structure in the LTE system for reference for description of the disclosure.

Referring to FIG. 3B, a radio protocol of the LTE system includes packet data convergence protocols (PDCPs) 3b-05 and 3b-40, radio link controls (RLCs) 3b-10 and 3b-35, and medium access controls (MACs) 3b-15 and 3b-30 in the terminal and the eNB, respectively. The PDCP 3b-05 and 3b-40 are in charge of operations, such as IP header compression/restoration, and the like. Main functions of PDCP are summarized as follows.

- a header compression and decompression function (ROHC only)
- a user data transmission function (transfer of user data)
- a sequential delivery function (in-sequence delivery of upper layer PDUs at PDCP re-establishment procedure for RLC AM)
- a reordering function (for split bearers in DC (only support for RLC AM): PDCP PDU routing for transmission and PDCP PDU reordering for reception)
- a duplicate detection function (duplicate detection of lower layer SDUs at PDCP re-establishment procedure for RLC AM)
- a retransmission function (retransmission of PDCP SDUs at handover and, for split bearers in DC, of PDCP PDUs at PDCP data-recovery procedure, for RLC AM)
- an encryption and decryption function (ciphering and deciphering)
- a timer-based SDU delete function (timer-based SDU discard in uplink)

Radio link control (hereinafter, referred to as RLC) 3b-10 and 3b-35 reconfigures packet data units (PDCP PDUs) to appropriate sizes to perform ARQ operations. Main functions of the RLC are summarized as follows.

- a data transmission function (transfer of upper layer PDUs)
- an ARQ function (error correction through ARQ (only for AM data transfer))
- a concatenation, segmentation, and reassembly function (concatenation, segmentation, and reassembly of RLC SDUs (only for UM and AM data transfer))
- a re-segmentation function (re-segmentation of RLC data PDUs (only for AM data transfer))
- a reordering function (reordering of RLC data PDUs (only for UM and AM data transfer)
- a duplicate detection function (duplicate detection (only for UM and AM data transfer))
- an error detection function (protocol error detection (only for AM data transfer))
- an RLC SDU deletion function (RLC SDU discard (only for UM and AM data transfer))
- an RLC re-establishment function (RLC re-establishment)

The MACs 3b-15 and 3b-30 are connected to multiple RLC layer devices included in one terminal, multiplex RLC protocol data units (MAC PDUs) to MAC PDUs, and demultiplex the RLC PDUs from the MAC PDUs. Main functions of the MAC are summarized as follows.

- a mapping function (mapping between logical channels and transport channels)
- a multiplexing and demultiplexing function (multiplexing/demultiplexing of MAC SDUs belonging to one or different logical channels into/from transport blocks (TB) delivered to/from the physical layer on transport channels)

a scheduling information reporting function (scheduling information reporting)

a HARQ function (error correction through HARQ)

a function of priority control between logical channels (priority handling between logical channels of one UE)

a function of priority control between terminals (priority handling between UEs by means of dynamic scheduling)

an MBMS service identification function (MBMS service identification a transmission format selection function (transport format selection)

a padding function (padding)

Physical layers 3b-20 and 3b-25 perform channel-coding and modulation of upper layer data, make the channel-coded and modulated upper layer data into OFDM symbols and transmit the OFDM symbols via a wireless channel, or demodulate and channel-decode the OFDM symbols received through the wireless channel and delivering the same to the upper layer.

Figure 3C:
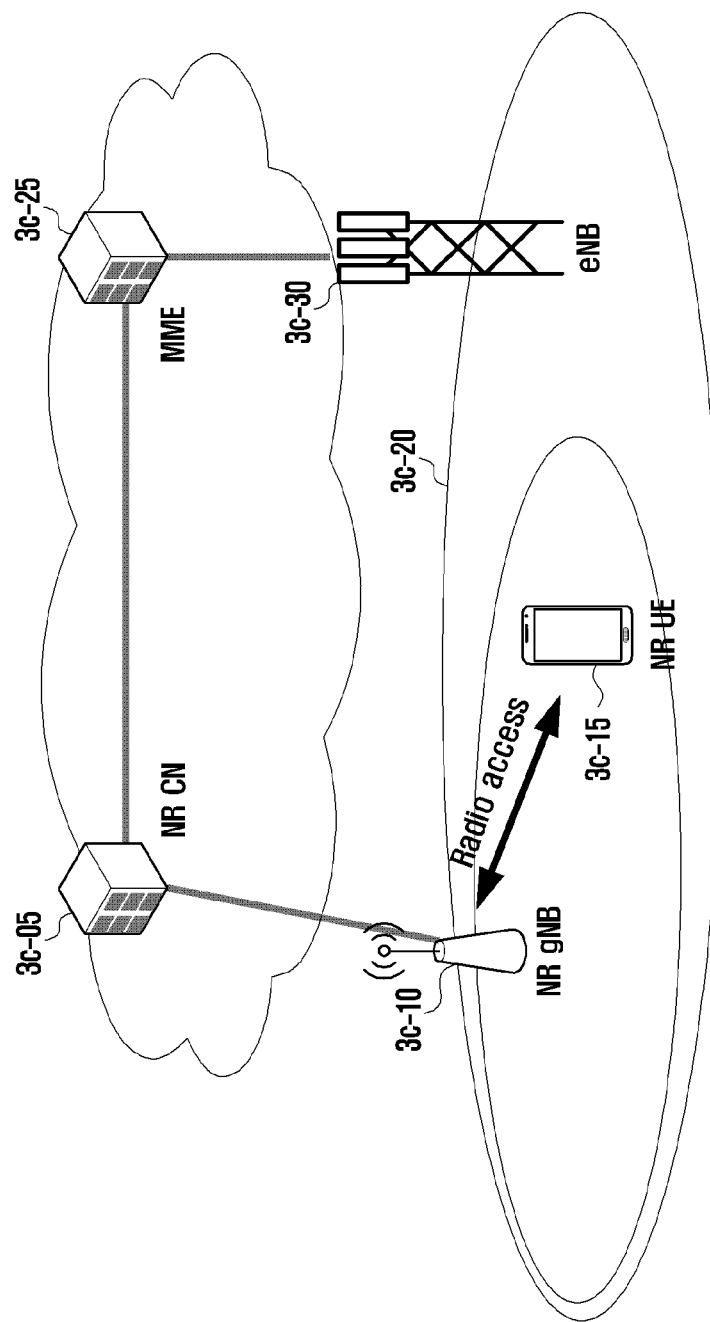
FIG. 3C is a diagram illustrating a structure of the next generation mobile communication system, to which the disclosure is applied.

FIG. 3C is a diagram illustrating a structure of the next generation mobile communication system, to which the disclosure is applied.

Referring to FIG. 3C, as illustrated, a radio access network of the next generation communication system includes a next generation base station (new radio Node B, hereinafter, NR NB) 3c-10 and a new radio core network (NR CN) 3c-05. A user terminal (new radio user equipment, hereinafter, NR UE or terminal) 3c-15 accesses an external network via the NR NB 3c-10 and the NR CN 3c-05.

In FIG. 3C, the NR NB 3c-10 corresponds to the evolved Node B (eNB) of the conventional LTE system. The NR NB is connected to the NR UE 3c-15 via a wireless channel, and may provide a more superior service than an existing node B. In the next generation mobile communication system, because all user traffic is serviced through a shared channel, a device which collects state information, such as buffer states, available transmission power states, and channel states of UEs, to perform scheduling is necessary, and the NR NB 3c-10 takes charge of collecting the state information and performing scheduling. A single NR NB typically controls a plurality of cells. In order to implement high-speed data transmission compared to the conventional LTE, an existing maximum bandwidth or more may be available, and orthogonal frequency division multiplexing (hereinafter, referred to as OFDM) may be used as a radio access technology to further combine a beamforming technology. Further, an adaptive modulation & coding (AMC) scheme that determines a modulation scheme and a channel coding rate according to the channel state of the terminal is applied. The NR CN 3c-05 performs functions, such as mobility support, bearer configuration, and QoS configuration. The NR CN is a device that performs various control functions as well as a mobility management function for the terminal, and is connected to a plurality of base stations. Further, the next generation mobile communication system may be linked to the conventional LTE system, and the NR CN is connected to the MME 3c-25 via a network interface. The MME is connected to the eNB 3c-30 that is an existing base station.

Figure 3D:
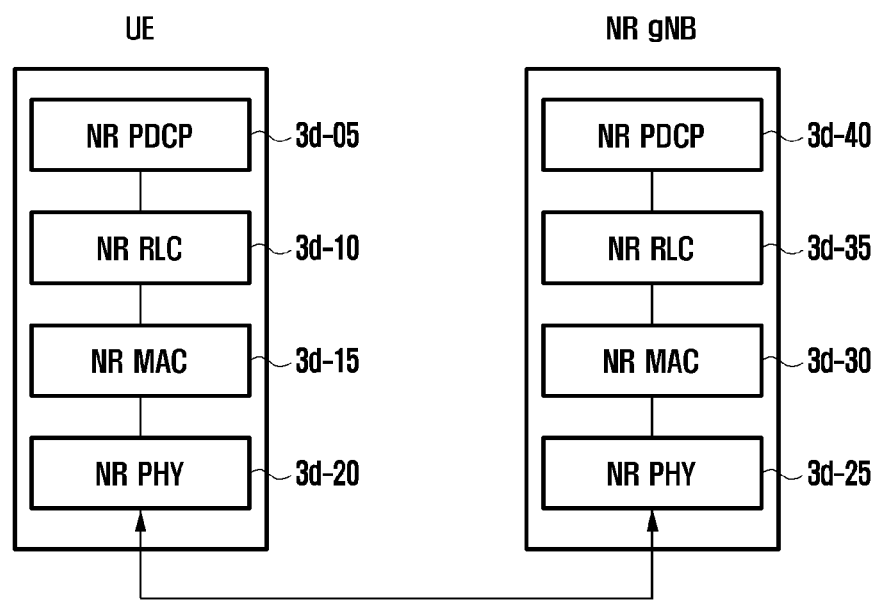
FIG. 3D is a diagram illustrating a radio protocol structure of the next generation mobile communication system, to which the disclosure is applied.

FIG. 3D is diagram illustrating a radio protocol structure of the next generation mobile communication system to which the disclosure may be applied.

Referring to FIG. 3D, a radio protocol of the next generation mobile communication system includes NR PDCPs 3d-05 and 3d-40, NR RLCs 3d-10 and 3d-35, and NR MACs 3d-15 and 3d-30 in the terminal and the NR base station, respectively. Main functions of the NR PDCPs 3d-05 and 3d-40 may include a part of the following functions.

a header compression and decompression function (ROHC only)

a user data transmission function (transfer of user data)

a sequential delivery function (in-sequence delivery of upper layer PDUs)

a reordering function (PDCP PDU reordering for reception)

a duplicate detection function (duplicate detection of lower layer SDUs)

a retransmission function (retransmission of PDCP SDUs)

an encryption and decryption function (ciphering and deciphering)

a timer-based SDU delete function (timer-based SDU discard in uplink)

In the above, the reordering function of an NR PDCP device refers to a function of reordering PDCP PDUs received from a lower layer, in the order based on PDCP sequence numbers (SN), and may include a function of delivering data to an upper layer in a rearranged order, may include a function of rearranging the order and recording lost PDCP PDUs, may include a function of reporting states of the lost PDCP PDUs to a transmission side, and may include a function of requesting to retransmit the lost PDCP PDUs.

Main functions of the NR RLCs 3d-10 and 3d-35 may include a part of the following functions.

a data transmission function (transfer of upper layer PDUs)

a sequential delivery function (in-sequence delivery of upper layer PDUs)

a non-sequential delivery function (out-of-sequence delivery of upper layer PDUs)

an ARQ function (error Correction through ARQ)

a concatenation, segmentation, and reassembly function (concatenation, segmentation, and reassembly of RLC SDUs)

a re-segmentation function (re-segmentation of RLC data PDUs)

a reordering function (reordering of RLC data PDUs)

a duplicate detection function (duplicate detection)

an error detection function (protocol error detection)

an RLC SDU deletion function (RLC SDU discard)

an RLC re-establishment function (RLC re-establishment)

In the above, the sequential delivery function (in-sequence delivery) of an NR RLC device refers to a function of delivering RLC SDUs received from a lower layer to an upper layer in order, may include a function of, when an originally one RLC SDU is divided into a plurality of RLC SDUs and then received, reassembling and delivering the received RLC PDUs, may include a function of rearranging the received RLC PDUs on the basis of a RLC sequence numbers (SNs) or PDCP sequence numbers (SNs), may include a function of rearranging the order and recording lost RLC PDUs, may include a function of reporting statuses of the lost RLC PDUs to a transmission side, may include a function of requesting to retransmit the lost RLC PDUs, and may include a function of, when there is a lost RLC PDU, delivering only RLC PDUs before the lost RLC PDU to the upper layer in order. Alternatively, the sequential delivery function (in-sequence delivery) may include a function of, although there is the lost RLC SDU, if a predetermined timer has been expired, delivering all RLC SDUs received before starting of the timer to the upper layer in order, or may include a function of, although there is the lost RLC SDU, if the predetermined timer has been expired, delivering all RLC SDUs received up to the present time to the upper layer in order. In the above, the RLC PDUs may be processed in the order of reception thereof (in the order of arrival regardless of the order of the sequence numbers or serial numbers) and may be delivered to the PDCP device regardless of the order (out-of-sequence delivery). In the case of segments, segments stored in a buffer or to be received at a later time may be received, reconfigured into one complete RLC PDU, processed, and then may be delivered to the PDCP device. The NR RLC layer may not include a concatenation function, and the function may be performed in an NR MAC layer or may be replace with a multiplexing function of the NR MAC layer.

In the above, the non-sequential delivery function (out-of-sequence delivery) of the NR RLC device refers to a function of delivering RLC SDUs received from a lower layer to an immediate upper layer regardless of the order, may include a function of, when originally one RLC SDU is divided into a plurality of RLC SDUs and received, reassembling and delivering the received RLC SDUs, and may include a function of storing the RLC SN or PDCP SN of the received RLC PDUs, arranging the order thereof, and recording lost RLC PDUs.

The NR MAC 3d-15 or 3d-30 may be connected to multiple NR RLC layer devices included in one terminal, and main functions of the NR MAC may include a part of the following functions.

- a mapping function (mapping between logical channels and transport channels)
- a multiplexing and demultiplexing function (multiplexing/demultiplexing of MAC SDUs)
- a scheduling information reporting function (scheduling information reporting)
- a HARQ function (error correction through HARQ)
- a function of priority control between logical channels (priority handling between logical channels of one UE)
- a function of priority control between terminals (priority handling between UEs by means of dynamic scheduling)
- an MBMS service identification function (MBMS service identification)
- a transmission format selection function (transport format selection)
- a padding function (padding)

NR PHY layers 3d-20 and 3d-25 may perform channel-coding and modulation of upper layer data, making the channel-coded and modulated upper layer data into OFDM symbols and transmitting the OFDM symbols via a wireless channel, or demodulating and channel-decoding the OFDM symbols received through the wireless channel and delivering the same to the upper layer.

Table 1 below describes information and variables that may be included in the MAC header.

TABLE 1

| Variables | Usage |
|---|---|
| LCID | An LCID may indicate an identifier of an RLC entity having generated an RLC PDU (or a MAC SDU) received from a higher layer. Alternatively, the LCID may indicate a MAC control element (CE) or padding. The LCID may be defined |

TABLE 1-continued

| Variables | Usage |
|---|---|
|  | differently depending on a channel for transmission. For example, the LCID may be defined differently according to DL-SCH, UL-SCH, and MCH. |
| L | L indicates a length of a MAC SDU, and may indicate a length of a MAC CE having a variable length. In the case of a MAC CE having a fixed length, an L-field may be omitted. For a predetermined reason, an L-field may be omitted. The predetermined reason refers to a case in which the size of a MAC SDU is fixed, the size of the MAC PDU is transmitted from a transmission side to a reception side, or a length can be calculated via calculation at the reception side. |
| F | F indicates a length of an L-field. If an L-field is absent, F may be omitted, and if an F-field is present, a predetermined size may limit the size of an L-field. |
| M | M indicates whether a tail indicator, i.e., an indicator to indicate a starting position of a MAC CE, is present. A predetermined bit of a first MAC sub-header in a MAC PDU may be indicated by tail indicator existence. |
| R | R is a reserved bit. |

Figure 3E:
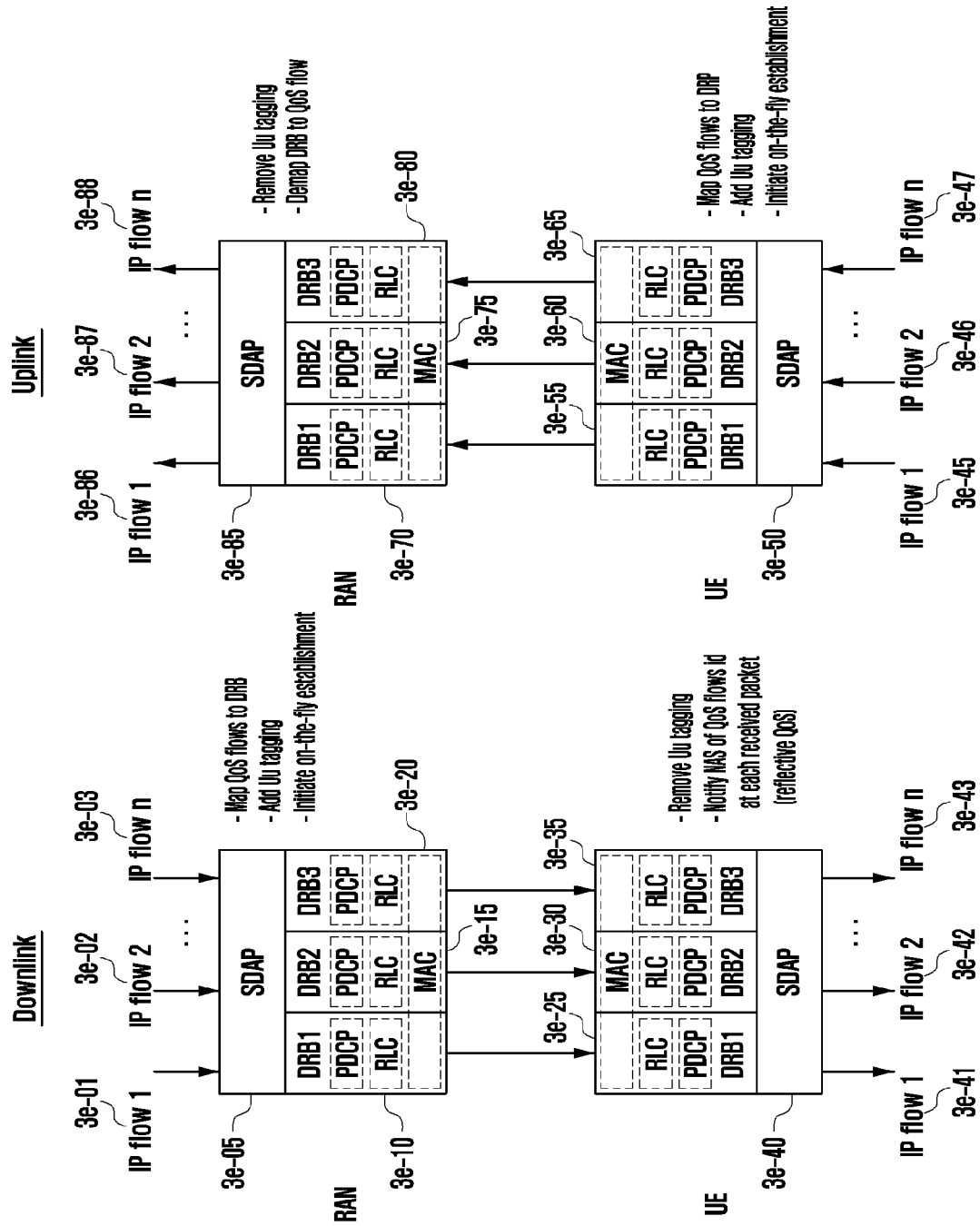
FIG. 3E is a diagram for describing a new layer and functions for handling a QoS in a next generation system.

FIG. 3E is a diagram for describing a new layer and functions for handling a QoS in a next generation system.

In the next generation system, a service requiring different quality of service (QoS) may be required, that is, a user traffic transmission path should be configured according to QoS requirements, or a service IP flow should be controlled for each service. In the next generation mobile communication system, a plurality of QoS flows may be mapped to a plurality of data radio bearers (DRBs), and the mapping may be configured simultaneously. That is, for downlink, the plurality of QoS flows 3e-01, 3e-02, and 3e-03 may be mapped to the same DRB or different DRBs 3e-10, 3e-15, and 3e-20, so that marking a QoS flow ID in a downlink packet is necessary to distinguish the QoS flows. Because such a function is absent in an existing LTE PDCP layer, a new layer (service data association protocol (SDAP)) 3e-05, 3e-40, 3e-50, and 3e-85 in charge of the same may be introduced. The marking may allow the terminal to implement a reflective QoS for uplink. Marking the QoS flow ID explicitly in the downlink packet, as described above, is a simple method for providing NAS of the terminal with the information by access stratum (AS) of the terminal. A method of mapping IP flows to DRBs in downlink may be performed in the following two steps.

1. NAS level mapping: IP flow→QoS flow
2. AS level mapping: QoS flow→DRB

In downlink reception, whether QoS flow mapping information and reflective QoS operations exist for each of the received DRBs 3e-25, 3e-30, and 3e-35 may be determined and corresponding information may be delivered to the NAS.

Similarly, two levels of mapping may be used for the uplink. First, IP flows are mapped to QoS flows via NAS signaling, and QoS flows are mapped to determined DRBs 3e-55, 3e-60, and 3e-65 in the AS. The terminal may mark the QoS flow IDs in the uplink PDCP packet or may deliver the packet as it is without marking the QoS flow Ids. The function is performed in a new layer (SDAP) of the terminal. When the QoS flow IDs are marked in the uplink PDCP packet, the base station may mark the QoS flow IDs without an uplink traffic flow template (TFT) in the packet for transmitting the information to an NG-U, and may transmit the same.

Figure 3F:
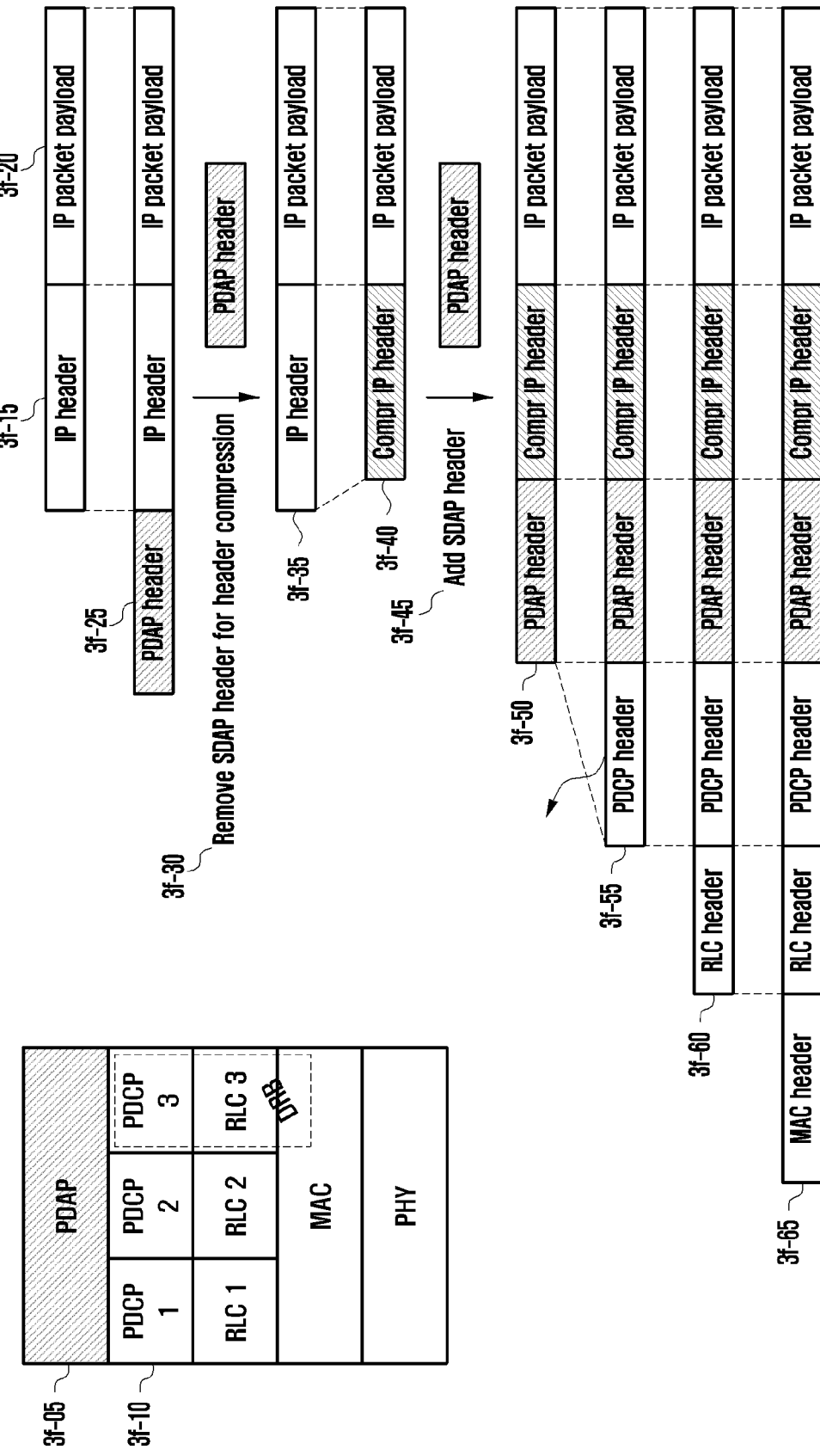
FIG. 3F is a diagram illustrating an operation performed in a service data adaptation protocol (SDAP) layer in order to process a QoS for each IP flow by a transmission end.

FIG. 3F is a diagram illustrating an operation performed in the SDAP layer in order to process a QoS for each IP flow by a reception end.

In FIG. 3F of the disclosure, an SDAP layer 3f-05 may be introduced above a PDCP layer 3f-10. The new layer may include the following functions.

1. A function of routing or mapping QoS flows to DRB
2. A function of marking QoS flow identifiers (IDs) in downlink packets
3. A function of marking QoS flow identifiers (IDs) in uplink packets In the case where an SDAP header should be attached when an IP packet is received, a QoS flow ID or other necessary information is inserted in the SDAP header by applying mapping information of a QoS flow and an IP flow preconfigured in the network. The SDAP header may be attached to the front of the IP packet and delivered to the PDCP layer, 3f-25.

When the IP packet is received from the SDAP layer, the PDCP layer may perform the following operations to process the IP packet supporting various QoS services.

A transmission end PDCP layer receives data from an SDAP layer,

If a (1-1)th condition is satisfied, a (1-1)th operation is performed, and

If a (2-1)th condition is satisfied, a (2-1)th operation is performed.

The (1-1)th condition is referred to as a case where the PDCP layer may identify or receive an indication that the SDAP header is attached, from the SDAP layer (e.g., the SDAP header may be always attached), or a case where it may be identified indirectly the SDAP header is attached, by recognizing that terminal is connected to a 5G Core Network (5G-CN).

The (2-1)th condition is referred to as a case where the PDCP layer may identify or receive an indication that the SDAP header is not attached, from the SDAP layer, or a case where it may be identified indirectly that the SDAP header is not attached, by recognizing that terminal is connected to an enhanced packet core (LTE EPC).

An (1-1)th operation indicates operations of the PDCP layer, for: removing first n bytes of the PDCP SDU, i.e., removing the SDAP header 3f-30; performing header compression for an IP header 3f-40; and performing ciphering, attaching the SDAP header again, and then configuring 1-bit indicator field, so as to indicate the presence of the SDAP header or attach the PDCP header without an indicator and deliver PDCP PDU to an RLC layer 3f-45. If there is no 1-bit indicator in the PDCP header, another mechanism (informing, via a MAC CE, a logical channel in which the SDAP header is present from a count, and informing, via a PDCP control PDU, a count from which the SDAP header is present) which plays the same role may be used.

An (2-1)th operation indicates operations of the PDCP layer, for performing header compression for an IP header 3f-40, proceeding ciphering, and then configuring a 1-bit indicator field in the PDCP header, so as to indicate the absence of the SDAP header and attach the PDCP header, or attach the PDCP header without a 1-bit indicator and deliver the PDCP PDU to an RLC layer, 3f-45.

The compression is an important procedure to reduce overhead in data transmission. The RLC layer performs functions described in FIG. 3D, attaches the RLC header 3f-60, and performs delivery to a MAC layer, and the MAC layer receives the same, performs the functions described in FIG. 3D, and attaches a MAC header 3f-65.

Figure 3G:
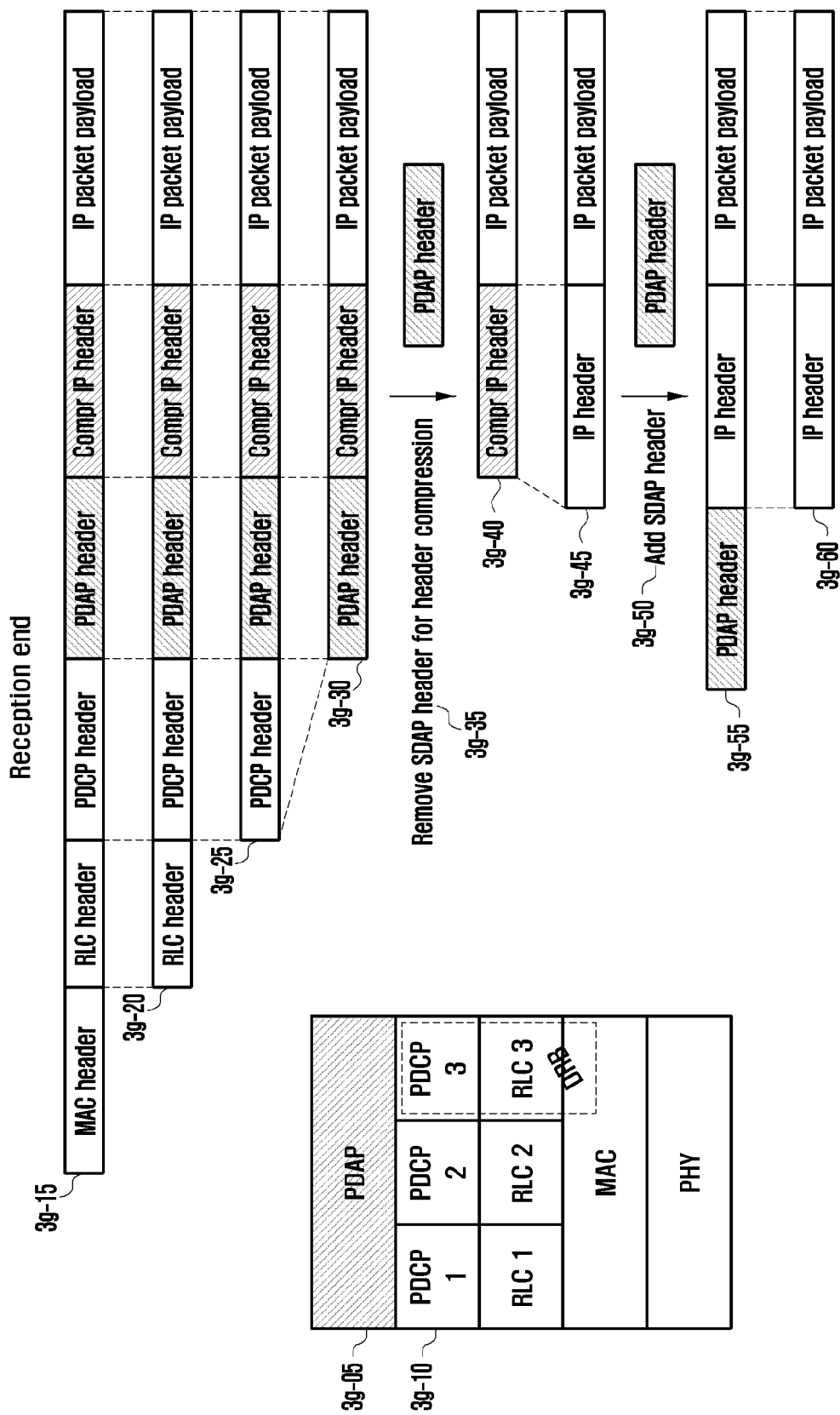
FIG. 3G is a diagram illustrating an operation performed in the SDAP layer in order to process a QoS for each IP flow by a reception end.

FIG. 3G is a diagram illustrating an operation performed in the SDAP layer in order to process a QoS for each IP flow by a reception end.

A reception end PDCP layer receives data from an RLC layer,

If a (1-2)th condition is satisfied, a (1-2)th operation is performed, and

If a (2-2)th condition is satisfied, a (2-2)th operation is performed.

The (1-2)th condition refers to a case where it may be identified indirectly that the SDAP header is attached, by recognizing that the terminal is connected to the 5G core network (5G-CN), or a case where the SDAP header is always attached.

The (2-2)th condition refers to a case where it may be identified indirectly that the SDAP header is not attached, by recognizing that the terminal is connected to an enhanced packet core (LTE EPC).

A (1-2)th operation refers to operations of the PDCP layer, for removing the PDCP header, removing first n bytes of the PDCP SDU, i.e., removing the SDAP header 3g-35, performing deciphering, and restoring the compressed IP header 3g-40, so as to recover the original IP header 3g-45, attach the SDAP header 3g-55 again, and deliver the data to the SDAP layer (it may be indicated that the SDAP header is present in the SDAP layer).

A (2-2)th operation refers to operations of the PDCP layer, for removing the PDCP header, deciphering the PDCP SDU, and then restoring the compressed IP header 3g-40, so as to recover the original IP header 3g-45 and deliver the data to the SDAP layer (it may be indicated that the SDAP header is absent in the SDAP layer).

Figure 3H:
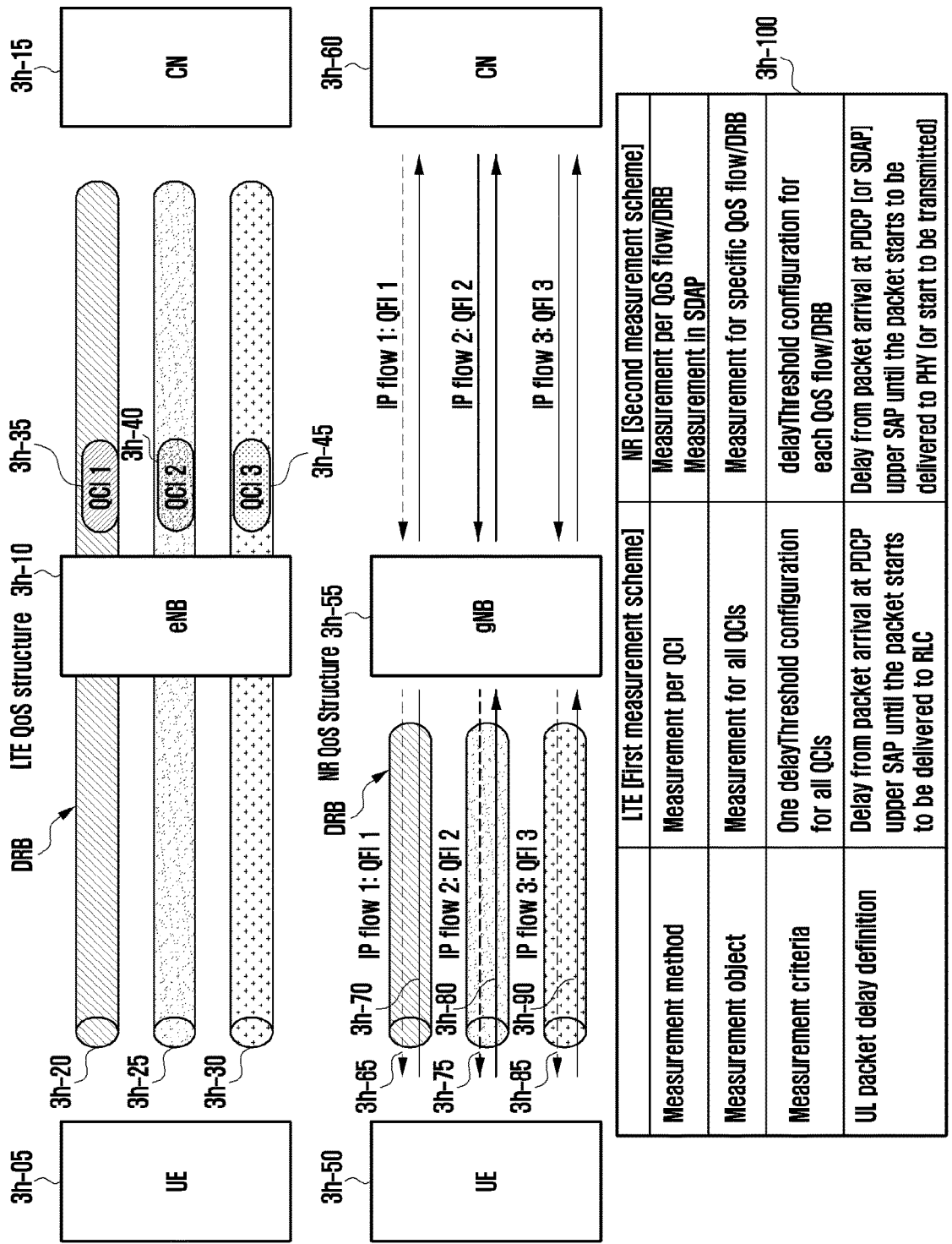
FIG. 3H is a diagram illustrating a comparison of a method for measuring a delay of an uplink PDCP packet with a case of LTE, and newly defining of the same.
Figure 31:
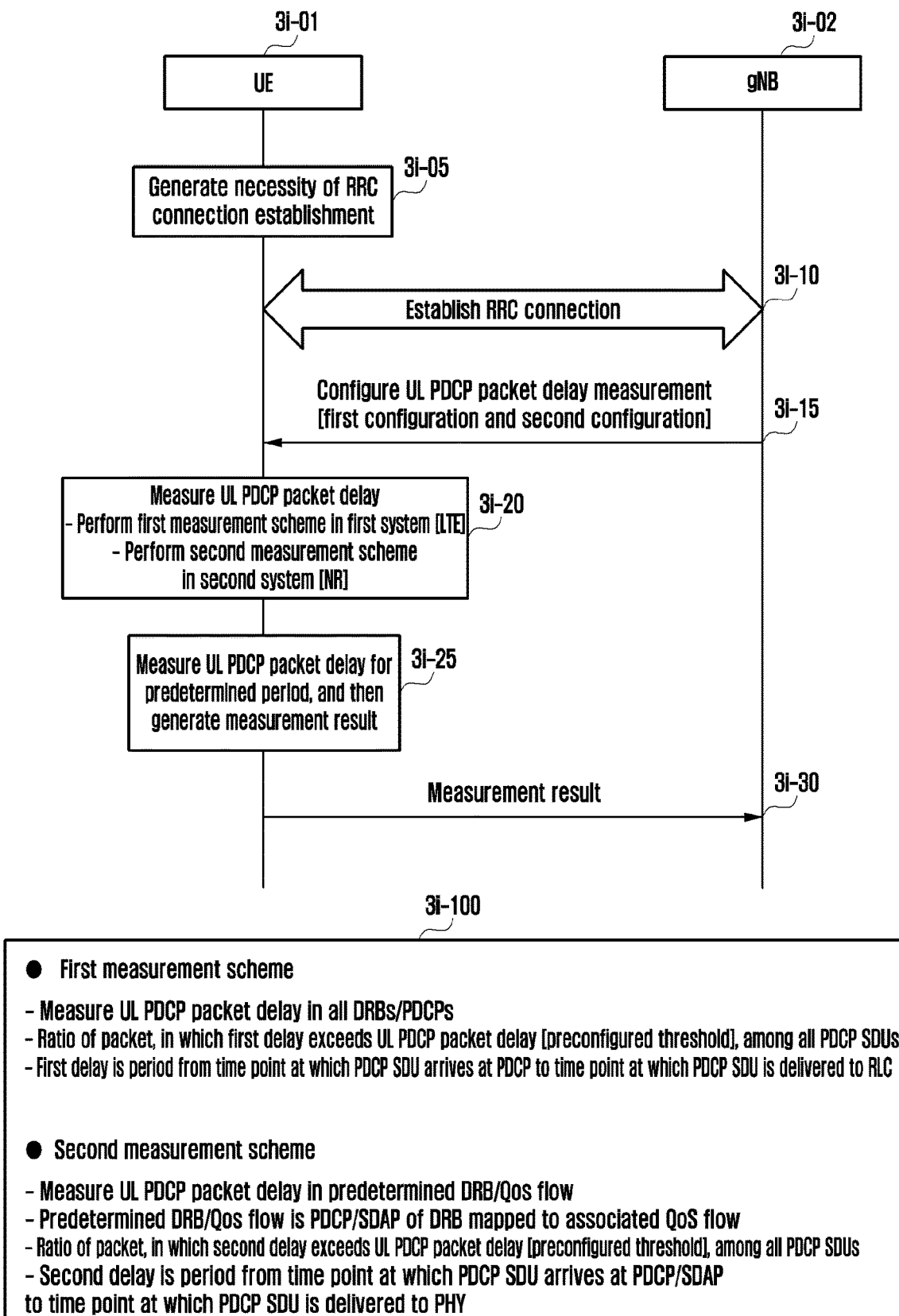

FIG. 3H is a diagram illustrating a comparison of a method for measuring a delay of an uplink PDCP packet in NR with a case of LTE, and newly defining of the same.

When an LTE terminal 3h-05 is wirelessly connected to a base station, bearers 3h-20, 3h-25, and 3h-30 are configured by the base station. The bearers include a signaling radio bearer (SRB) and a data radio bearer (DRB) for data transmission. The evolved packet system (EPS) bearer type includes a default bearer and a dedicated bearer. When the terminal accesses an LTE network, an IP address is assigned, and a default EPS bearer is generated while generating a packet data network (PDN) connection from a CN 3h-15. When a user uses a service (e.g., the Internet) via the default bearer and uses a service (e.g., VoD) that cannot be properly provided by the default bearer, a dedicated bearer is generated on-demand. That is, the dedicated bearer is configured to a QoS different from a bearer having already been configured. The UE may access multiple access point names (APNs) and may configure one default EPS bearer and multiple dedicated EPS bearers per APN, wherein up to 11 EPS bearers may be configured.

Referring to an uplink PDCP packet delay measurement method in LTE, it is defined, in LTE, to measure an uplink PDCP packet delay for each QoS class identifier (QCI) 3h-35, 3h-40, or 3h-45. Here, the QCI is expressed as an integer value (1 to 9) by standardizing different QoS characteristics, and is pre-configured in the eNB. The parameters of the QCI include a resource type, priority, a packet delay budget, and a packet error loss rate. The uplink PDCP packet delay in LTE is defined by Equation 1 below, and parameters of Equation 1 are defined as shown in Table 2 below.

$$M(T, qci) = \frac{nExcess(T, qci)}{nTotal(T, qci)} \quad \text{[Equation 1]}$$

$tULdelaly(i, qci) = tDeliv(i, qci) - tArrival(i, qci)$

TABLE 2

| | |
|---|---|
| M (T, qci) | Ratio of packets in UL per QCI exceeding the configured delay threshold among the UL PDCP SDUs transmitted. |
| nExcess(T, qci) | Number of PDCP SDUs of a data radio bearer with QCI = qci, for which ULdelay tULdelay(i, qci) exceeded the configured delayThreshold as defined in TS 36.331 [5] during the time period T. |
| nTotal(T, qci) | Number of PDCP SDUs of a data radio bearer with QCI = qci, for which at least a part SDU was transmitted during the time period T. |
| tULdelay(i, qci) | Queuing delay observed at the UE PDCP layer from packet arrival at PDCP upper SAP until the packet starts to be delivered to RLC, the packet belongs to a data radio bearer with QCI = qci. |
| tDeliv(i, qci) | The point in time when the PDCP SDU i of a data radio bearer with QCI = qci was delivered to lower layers. |
| tArrival(i, qci) | The point in the time when the PDCP SDU i of a data radio bearer with QCI = qci arrives at PDCP upper SAP. |
| i | Index of PDCP SDU that arrives at the PDCP upper SAP during time period T. |
| T | Time period during which the measurement is performed. |

[Table 2] may correspond to contents described in [Table 2-1] below.

TABLE 2-1

| | |
|---|---|
| M (T, qci) | Ratio of packets in UL per QCI exceeding the configured delay threshold among the UL PDCP SDUs transmitted. |
| nExcess(T, qci) | Number of PDCP SDUs of a data radio bearer with QCI = qci for which ULdelay tULdelay(i, qci) exceeded the configured delayThreshold as defined in TS 36.331 [5] during the time period T. |
| nTotal(T, qci) | Number of PDCP SDUs of a data radio bearer with QCI = qci, for which at least a part SDU was transmitted during the time period T. |
| tULdelay(i, qci) | Queuing delay observed at the UE PDCP layer from packet arrival at PDCP upper SAP until the packet starts to be delivered to RLC, the packet belongs to a data radio bearer with QCI = qci. |
| tDeliv(i, qci) | The point in time when the PDCP SDU i of a data radio bearer with QCI = qci was delivered to lower layers. |
| tArrival(i, qci) | The point in the time when the PDCP SDU i of a data radio bearer with QCI = qci arrives at PDCP upper SAP. |
| i | Index of PDCP SDU that arrives at the PDCP upper SAP during time period T. |
| T | Time period during which the measurement is performed. |

That is, the uplink PDCP packet delay is obtained by calculating a PDCP packet having a delay time exceeding a preconfigured threshold value delay Threshold among all PDCP packets during the measurement period T, and obtaining a ratio thereof. As shown in the above equation, the PDCP packet delay is obtained for each QCI and is measured for all QCIs. A reason that the PDCP packet delay is defined to be from a time point at which a data packet is received from an upper service access point (SAP) to a time point at which the data packet is delivered to RLC is because: in LTE, the terminal is unable to pre-process an uplink data packet; and, in MAC, information such as QCI is viewed, a grant is allocated, and then the PDCP packet is delivered to RLC. In other words, it is because it may be considered that data is transmitted from a time point at which the data packet having been buffered in the PDCP until actual data transmission is performed is delivered to RLC. If the terminal transmits corresponding information to a minimization of drive test (MDT) server, the base station may use the information for subsequent network operations.

As illustrated in FIG. 3E, in the next generation mobile communication system, an TP flow for each service should be controlled or a user traffic transmission path should be configured according to QoS requirements. In the next generation mobile communication system, a plurality of QoS flows 3h-65, 3h-70, 3h-75, 3h-80, 3h-85, and 3h-90 may be mapped to a plurality of DRBs, and may be concurrently configured. That is, for downlink, the plurality of QoS flows 3h-70, 3h-80, and 3h-90 may be mapped to the same DRB or different DRBs, so that marking a QoS flow ID in a downlink packet is necessary to distinguish the QoS flows. Likewise, the terminal may mark the QoS flow IDs in the uplink PDCP packet or may deliver the packet as it is without marking the QoS flow Ids. The function is performed in a new layer (SDAP) of the terminal. When the QoS flow ID 3h-65, 3h-75, or 3h-85 is marked in the uplink PDCP packet, the base station may mark the QoS flow ID without an uplink TFT in the packet for transmission of the information to the NG-U and deliver the packet.

In summary, in NR, unlike the LTE, the bearer is configured for each QCI so that radio data is not managed, and an IP flow is classified according to each service. Therefore, the uplink PDCP packet delay is required to be measured for each QoS flow or DRB. Because the classification is possible in the SDAP layer, delay measurement of the uplink PDCP packet is also measured in the SDAP layer. Alternatively, in the SDAP layer, the QoS flow and DRB information may be delivered to the PDCP layer to measure a delay of the uplink PDCP packet in the PDCP layer.

Unlike LTE, in NR, a specific QoS flow or DRB received in an RRC control message may be measured. This is because, unlike the QCI, the QoS of the data packet is managed for each IP flow of a corresponding service, and a flow ID-specific configuration is possible in a procedure of mapping a corresponding IP flow to the DRB. When delay measurement of the uplink PDCP packet is performed, a measurement threshold may be configured differently according to a service. That is, delayThreshold for each QoS flow or DRB may be configured to a different value. In the configuration of the threshold value, a DRB configuration is possible via RRC messages and a QoS flow configuration can be concurrently performed therewith.

Lastly, the uplink PDCP packet delay in the next generation mobile communication system is defined as follows. The uplink PDCP packet delay is a delay time from a time point of receiving a data packet at an SAP over the PDCP layer or at an SAP over the SDAP layer to a time of delivering data to a physical layer (PHY). A reason for the definition is that, in the next generation mobile communication system, pre-processing is possible so that a time of, as in LTE, being stored in the PDCP buffer and delivered to RLC may not be applied, and the uplink PDCP packet delay may be calculated as an actual delivery time to the PHY.

Table 3 below is a table comparing a method of measuring an uplink PDCP packet transmission delay in the NR proposed in the disclosure with that of a case in LTE (3h-100 of FIG. 3). With regard to UL packet delay definition entries in Table 3, in LTE, the UL packet delay is defined as a delay from a time at which a packet arrives at a PDCP upper SAP to a time at which the packet starts to be delivered to the RLC. Further, in NR, the UL packet delay is defined from a time at which a packet arrives at a PDCP (or SDAP) upper SAP to a time at which the packet starts to be delivered (or is transmitted to) the PHY.

TABLE 3

| | LTE | NR |
|---|---|---|
| Measurement method | Measurement per QCI | Measurement per QoS flow/DRB Measurement in SDAP |
| Measurement object | Measurement for all QCIs | Measurement for specific QoS flow/DRB |
| Measurement criteria | One delay Threshold configuration for all QCIs | delayThreshold configuration for each QoS flow/DRB |
| UL packet delay definition | The delay from packet arrival at PDCP upper SAP until the packet starts to be delivered to RLC | The delay from packet arrival at PDCP (or SDAP) upper SAP until the packet starts to be delivered to PHY (or start to be transmitted) |

In order to measure the UL packet delay by the terminal in NR according to the above-described embodiment, each layer that processes a packet may measure a time for receiving and delivering a packet, and the SDAP layer may collect time measured by each layer so as to measure a total UL packet delay. Information on the time measured for each layer may be shared between different layers, and the terminal or the SDAP layer of the terminal may obtain information on the time measured for each layer.

FIG. 3I is an overall diagram illustrating a method for measuring a delay of the uplink PDCP packet in the next generation mobile communication system proposed in the disclosure.

Due to needs 3i-05 for RRC connection establishment with a base station 3i-02, the terminal 3i-01 performs an RRC connection establishment step 3i-10. An Example of the necessity of RRC connection establishment includes a case where data to be transmitted to the base station by the terminal is generated, a case where data to be transmitted to the terminal by the base station is generated, and the like. In the disclosure, for MDT, the base station requests the terminal to perform uplink PDCP packet delay measurement and receives a measurement result. If the terminal transmits corresponding information to the MDT server in response to the request of the base station, the base station may use the information for subsequent network operations.

In step 3i-15, the base station delivers a configuration for delay measurement of the uplink PDCP packet to the terminal via an RRC control message. The base station may indicate, as configuration values, a first configuration and a second configuration, and delivers corresponding configuration values (parameters). A first configuration method refers to a configuration scheme used in a first system (LTE system), and is a method for configuring all QCIs with one threshold value (delayThreshold). On the other hand, a second configuration refers to a configuration scheme used in a second system (NR system), and a list of QoS flows, for which uplink PDCP packet delay is to be measured, and a threshold value for each QoS flow (delayThreshold (QoS-Flow)) may be given. Alternatively, a list of DRBs, for which a uplink PDCP packet delay is to be measured, and a threshold value for each DRB (delayThreshold (DRB)) may be given. That is, the uplink PDCP packet delay is summarized as follows.

the first configuration scheme in the first system (LTE)
the first configuration scheme: configuring all QCIs with one delayThreshold value
the second configuration scheme in the second system (NR)

the second con scheme: the list of QoS flows/DRBs for which a UL PDCP packet delay is to be measured delayThreshold for each QoS flow/DRB Thereafter, the terminal performs measurement 3i-20 according to the uplink PDCP packet delay measurement configuration value received from the base station, and generates 3i-25 a measurement result for reporting of the measurement value. That is, the uplink PDCP packet delay is defined to be a delay from a time point at which an uplink PDCP packet arrives at an SAP over the PDCP or SDAP to a time point at which a corresponding PDCP PDU is actually delivered to the PHY, and the time is measured in the PDCP or SDAP layer. The measurement may be performed for each QoS flow or DRB preconfigured by the base station. Because information on the QoS flow is received in the SDAP layer, it may be more preferable to measure the time. Equation 2 and Table 4 below represent definition of the uplink PDCP packet delay applicable in the NR. For reference, parts indicated as QoS Flow and QoSFlow in the following equation correspond to a case where the base station indicates measurement for each QoS flow, and if the base station indicates an uplink PDCP packet delay measurement for each DRB, the part indicated as QoS flow is replaced by DRB.

$$M\_NR(T, QoSFlow) = \frac{nExcess(T, QoSFlow)}{nTotal(T, QoSFlow)} \quad \text{[Equation 2]}$$

$$tULdelay(i, QoSFlow) =$$

$$tDeliv(i, QoSFlow) - tArrival(i, QoSFlow)$$

TABLE 4

| | |
|---|---|
| M(T, QoSFlow) | Ratio of packets in UL per QoS flow (for DRB) exceeding the configured delay threshold among the UL PDCP SDUs transmitted. |
| nExcess(T, QoSFlow) | Number of PDCP SDUs of a data radio bearer with QoS flow = QoSflow, for which ULdelay tULdelay(i, QoSFlow) exceeded the configured delayThreshold(QoSFlow) during the time period T. |
| nTotal(T, QoSFlow) | Number of PDCP SDUs of a data radio bearer with QoS flow = QoSflow, for which at least a part of SDU was transmitted during the time period T. |
| tULdelay(i, QoSFlow) | Queuing delay observed at the SDAP layer from packet arrival at SDAP upper SAP until the packet starts to be delivered to PHY, the packet belongs to a data radio bearer with QoS flow = QoSflow. |
| tDeliv(i, QoSflow) | The point in time when the PDCP SDU i of a data radio bearer with QoS flow = QoSflow was delivered to PHY layers. |
| tArrival(i, QoSFlow) | The point in the time when the PDCP SDU i of a data radio bearer with QoS flow = QoSflow arrives at SDAP upper SAP. |
| i | Index of PDCP SDU that arrives at the SDAP upper SAP during time period T. |
| T | Time period during which the measurement is performed. |

[Table 4] may correspond to contents described in [Table 4-1] below.

TABLE 4-1

| | |
|---|---|
| M(T, QoSFlow) | Ratio of UL packets per QoS flow (or DRB) exceeding a configured delay threshold value among transmitted UL PDCP SDUs. |
| nExcess(T, QoSFlow) | Number of PDCP SDUs of a data radio bearer with QoS flow = QoSflow, for which a UL delay tULdelay(i, QoSFlow) exceeds |

TABLE 4-1-continued

| | |
|---|---|
| | delayThreshold(QoSFlow) configured as defined in TS 38.331, during time period T. |
| nTotal(T, QoSFlow) | Number of PDCP SDUs of a data radio bearer with QoS flow = QoSflow, for which at least a part of SDU has been transmitted during time period T. |
| tULdelay(i, QoSFlow) | Queuing delay observed in the SDAP layer from packet arrival at PDCP upper SAP until the paket starts to be delivered to PHY, the packet belongs to a data radio bearer with QoS flow = QoSflow. |
| tDeliv(i, QoSflow) | The point in time when the PDCP DSU i of a data radio bearer with QoS flow = QoSflow has been delivered to PHY layers. |
| tArrival(i, QoSFlow) | The point in the time when the PDCP SDU i of a data radio bearer with QoS flow = QoSflow arrives at PDCP upper SAP. |
| i | Index of PDCP SDU that arrives at the PDCP upper SAP during time period T. |
| T | Time period during which measurement is performed. |

When the measurement is performed in the SDAP layer, a timing, at which a corresponding PDCP packet is actually delivered to the DRB and QoS flow indicated by the SDAP layer, is measured and a measurement result is delivered to the SDAP or PDCP.

The terminal delivers 3*i*-30 the uplink PDCP packet delay result measured and generated in the above step to the base station via the RRC control message. The above-described embodiments may be arranged as shown in 3*i*-100 of FIG. 3I.

Figure 3J:
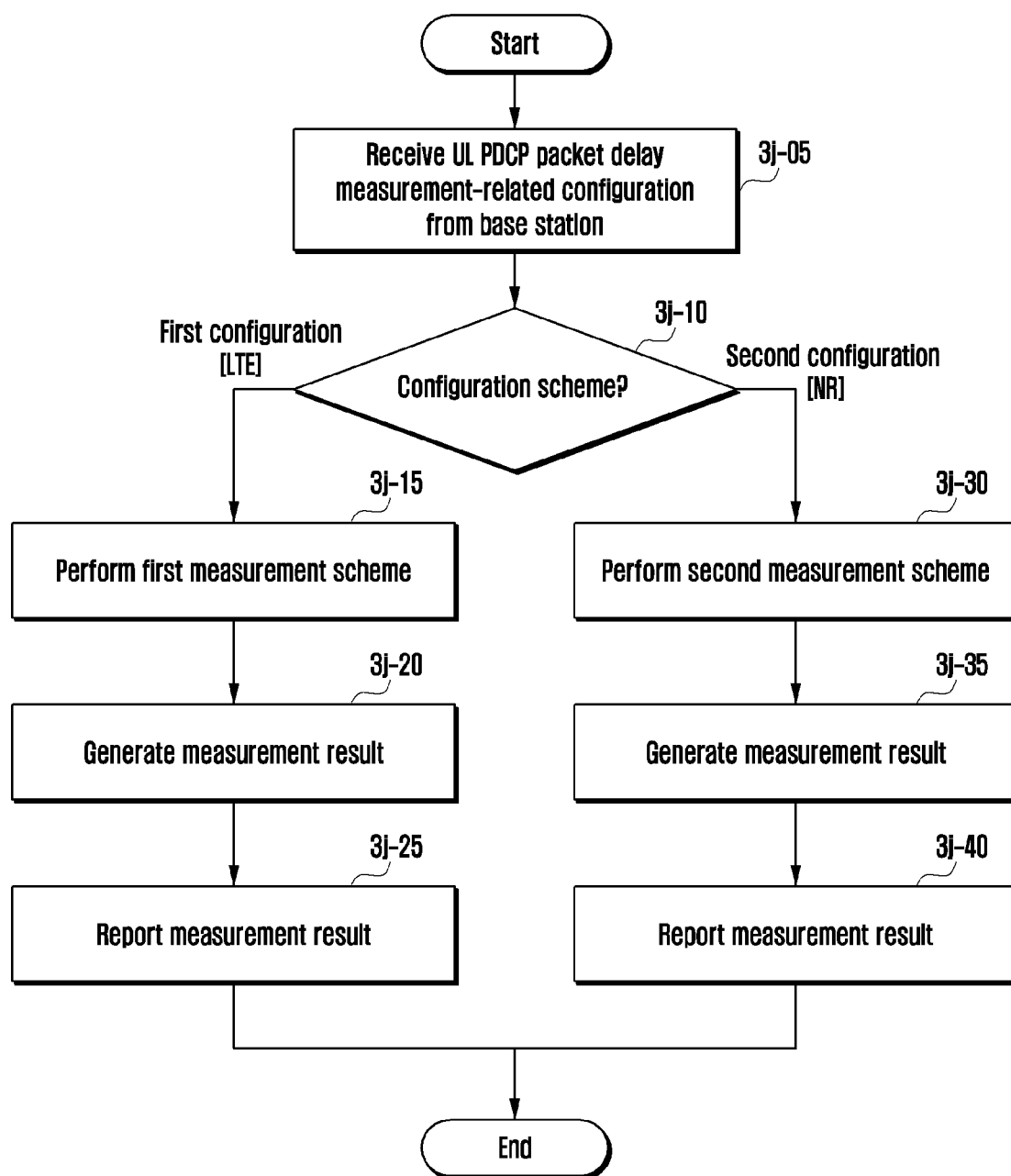
FIG. 3J is a diagram illustrating a terminal operation in the disclosure.

FIG. 3J is a diagram illustrating a terminal operation in the disclosure.

The terminal may receive a request for uplink PDCP packet transmission delay measurement for the MDT from the base station, and may report a corresponding result. First, the terminal receives 3*j*-05 an RRC control message delivered from the base station, and determines 3*j*-10 how to measure an uplink PDCP packet transmission delay. The RRC control message may include a corresponding configuration value for the following measurement.

the first configuration scheme in the first system (LTE)
    the first configuration scheme: configuring all QCIs with one delayThreshold value
the second configuration scheme in the second system (NR)
    the second con scheme: the list of QoS flows/DRBs for which a UL PDCP packet delay is to be measured
    delayThreshold for each QoS flow/DRB That is, when the terminal receives an indication of the first configuration scheme via the RRC control message, the terminal measures the uplink PDCP packet transmission delay for all QCIs with a configured one threshold value (delayThreshold), generates a measurement result, and reports the result to the base station, 3*j*-15, 3*j*-20, and 3*j*-25. In a method for measuring the uplink PDCP packet transmission delay, the first system (LTE system) described in FIG. 3I is used. On the other hand, if the second configuration is indicated via the RRC control message, the uplink PDCP packet transmission delay scheme used in the second system (NR system) is applied, and a corresponding result is generated and reported, 3*j*-30, 3*j*-35, and 3*j*-40. The main difference between the second measurement scheme and the first measurement scheme is the list of QoS flows or DRBs, for which the uplink PDCP packet delay is to be measured, and a threshold value (delayThreshold (QoSFlow)) for each QoS flow or a threshold value (delayThreshold (DRB)) for each DRB may be given. There is also a difference in time of measurement. The difference in the method of measuring an uplink PDCP packet transmission delay in LTE and that in NR may be summarized as shown in Table 3 described above.

The biggest feature of the terminal operation is to differently perform a method for measuring and reporting the uplink PDCP packet transmission delay according to an uplink PDCP packet transmission delay configuration value in the RRC control message received from the base station and the capability (either an LTE terminal or an NR terminal) of the terminal. A specific uplink PDCP packet transmission delay operation of the terminal is summarized in FIG. 3I.

Figure 3K:
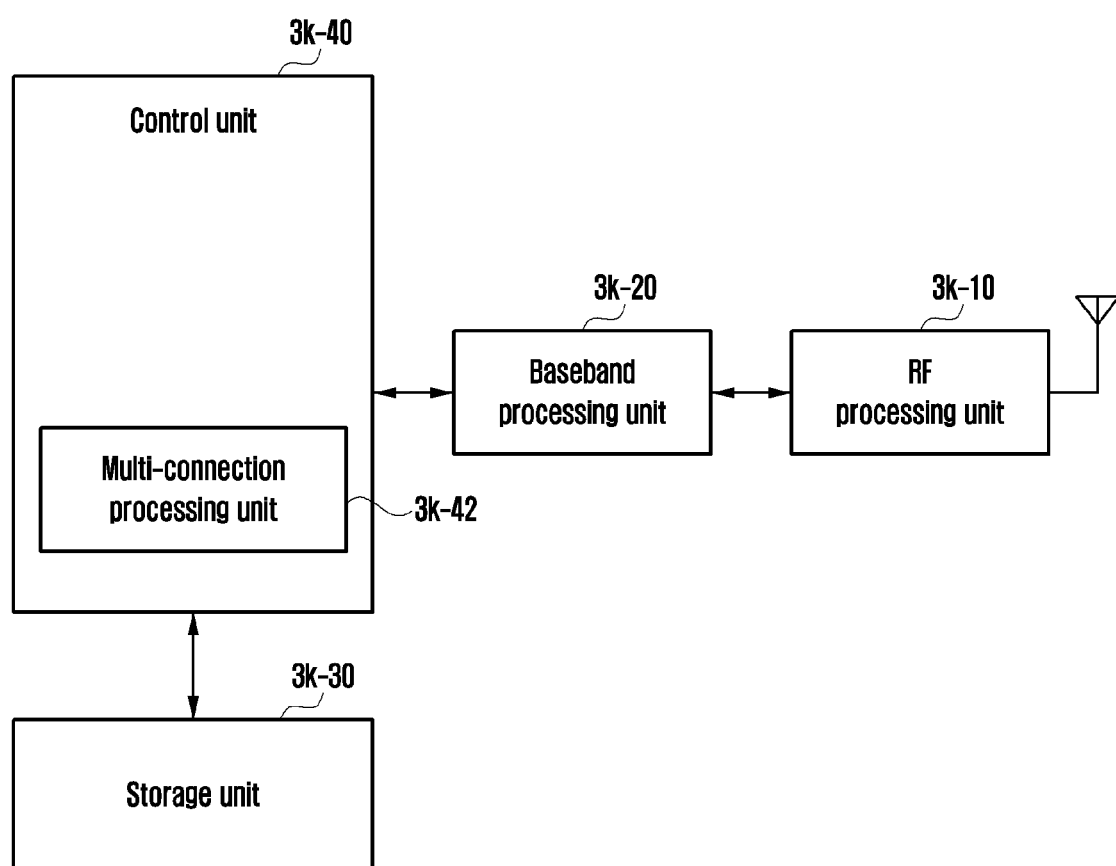
FIG. 3K is a block diagram illustrating an internal structure of a terminal, to which the disclosure is applied.

FIG. 3K is a block diagram illustrating an internal structure of a terminal, to which the disclosure is applied.

Referring to FIG. 1K, the terminal includes a radio frequency (RF) processing unit 3*k*-10, a baseband processing unit 3*k*-20, a storage unit 3*k*-30, and a control unit 3*k*-40.

The RF processing unit 3*k*-10 performs a function for transmitting or receiving a signal through a wireless channel, such as band conversion and amplification of a signal. That is, the RF processing unit 3*k*-10 up-converts a baseband signal provided from the baseband processing unit 3*k*-20 into an RF band signal, transmits the converted RF band signal through the antenna, and then down-converts the RF band signal received through the antenna into a baseband signal. For example, the RF processing unit 3*k*-10 may include a transmission filter, a reception filter, an amplifier, a mixer, an oscillator, a digital-to-analog convertor (DAC), an analog-to-digital convertor (ADC), and the like. In FIG. 2L, only one antenna is illustrated, but the terminal may have a plurality of antennas. The RF processing unit 3*k*-10 may include a plurality of RF chains. Moreover, the RF processing unit 3*k*-10 may perform beamforming. For the beamforming, the RF processing unit 3*k*-10 may adjust a phase and a size of each signal transmitted or received through a plurality of antennas or antenna elements. The RF processing unit may perform MIMO, and may receive multiple layers when performing an MIMO operation.

The baseband processing unit 3*k*-20 performs a function for a conversion between a baseband signal and a bit string according to a physical layer standard of the system. For example, the baseband processing unit 3*k*-20, when transmitting data, generates complex symbols by encoding and modulating a transmission bit string. When data is received, the baseband processing unit 3*k*-20 reconstructs a reception bit string via demodulation and decoding of the baseband signal provided from the RF processing unit 3*k*-10. For example, in accordance with an orthogonal frequency division multiplexing (OFDM) scheme, when data is transmitted, the baseband processing unit 3*k*-20 generates complex symbols by encoding and modulating a transmission bit string, maps the complex symbols to subcarriers, and then configures OFDM symbols through an IFFT (inverse fast Fourier transform) operation and a CP (cyclic prefix) insertion. Further, when data is received, the baseband processing unit 3*k*-20 divides the baseband signal provided from the RF processor 3*k*-10 in the unit of OFDM symbols, reconstructs the signals mapped to the subcarriers, via an FFT (fast Fourier transform) operation, and then reconstructs a reception bit string through demodulation and decoding.

The baseband processing unit 3*k*-20 and the RF processing unit 3*k*-10 transmit and receive signals as described above. Accordingly, the baseband processing unit 3*k*-20 and the RF processing unit 3*k*-10 may be referred to as a transmission unit, a reception unit, a transmission/reception unit, or a communication unit. Moreover, at least one of the baseband processing unit 3*k*-20 and the RF processing unit 3*k*-10 may include a plurality of communication modules to support a plurality of different radio access technologies. At least one of the baseband processing unit 3*k*-20 and the RF processing unit 3*k*-10 may include different communication modules to process signals of different frequency bands. For example, the different radio access technologies may include a wireless LAN (e.g., IEEE 802.11), a cellular network (e.g., LTE), and the like. Further, the different frequency bands may include a super high frequency (SHF) (i.e., 2.NRHz and NRhz) band and a millimeter (mm) wave (i.e., 60 GHz) band.

The storage unit 3*k*-30 stores data, such as a basic program, an application program, and configuration information, and the like for operation of the terminal. Particularly, the storage unit 3*k*-30 may store information related to a second access node that performs wireless communication by using a second radio access technology. The storage unit 3*k*-30 provides stored data in response to a request of the control unit 3*k*-40.

The control unit 3*k*-40 controls overall operations of the terminal. For example, the control unit 3*k*-40 transmits or receives a signal via the baseband processing unit 3*k*-20 and the RF processing unit 3*k*-10. The control unit 3*k*-40 records and reads data in the storage unit 3*k*-40. To this end, the control unit 3*k*-40 may include at least one processor. For example, the control unit 3*k*-40 may include a communication processor (CP) that performs control for communication and an application processor (AP) that controls a higher layer, such as an application program. The control unit 3*k*-40 may further include a multi-connection processing unit 3*k*-42 configured to process a multi-connection.

Figure 3L:
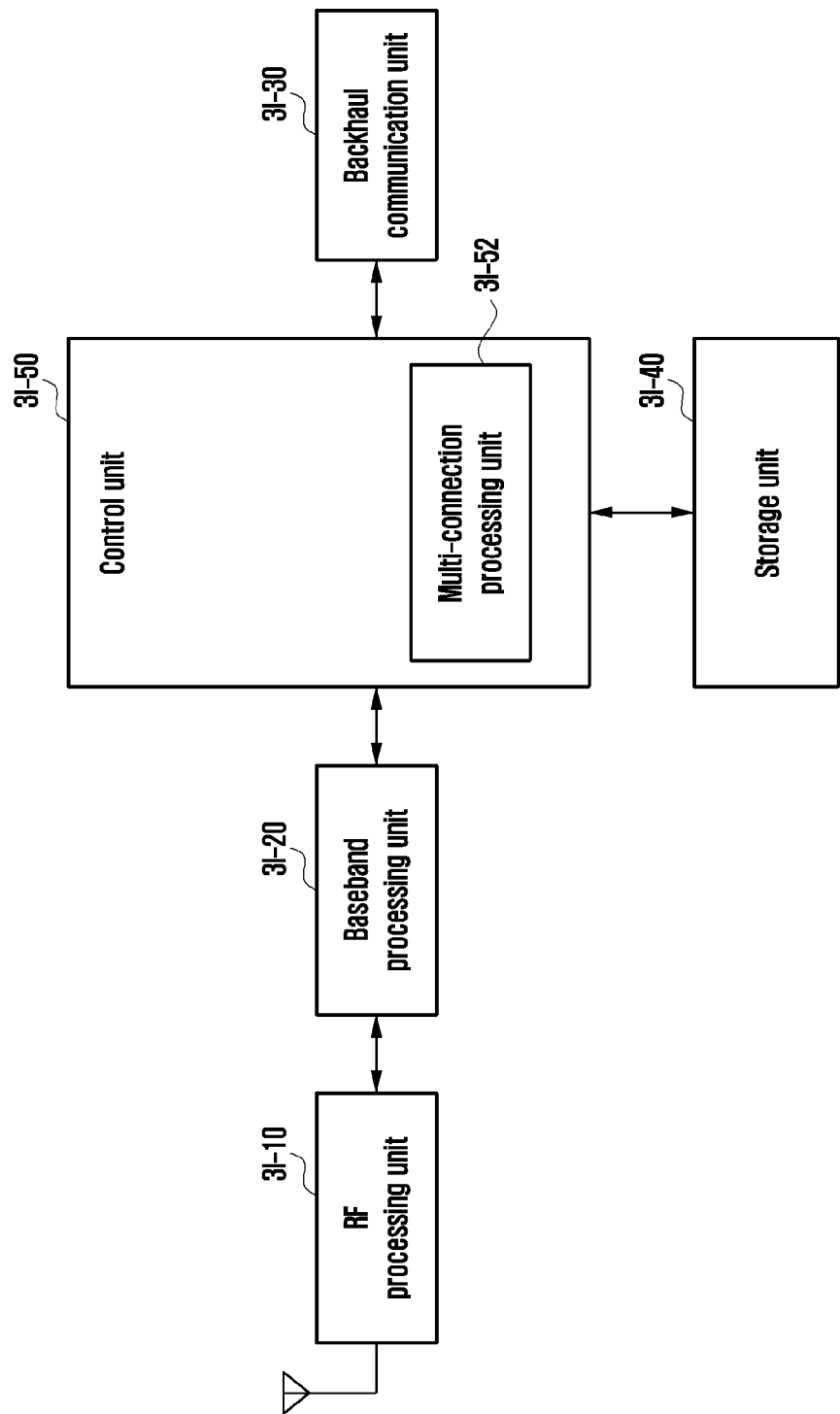
FIG. 3L is a block diagram illustrating a configuration of a base station according to the disclosure.

FIG. 3L is a block diagram illustrating a configuration of a base station according to the disclosure.

As illustrated in FIG. 3L, the base station includes an RF processing unit 3*l*-10, a baseband processing unit 3*l*-20, a backhaul communication unit 3*l*-30, a storage unit 3*l*-40, and a control unit 3*l*-50.

The RF processing unit 3*l*-10 performs a function for transmitting or receiving a signal through a wireless channel, such as band conversion and amplification of a signal. That is, the RF processing unit 3*l*-10 up-converts a baseband signal provided from the baseband processing unit 3*l*-20 into an RF band signal, transmits the converted RF band signal through an antenna, and then down-converts the RF band signal received through the antenna into a baseband signal. For example, the RF processing unit 3*l*-10 may include a transmission filter, a reception filter, an amplifier, a mixer, an oscillator, a DAC, an ADC, and the like. In FIG. 3I, only one antenna is illustrated, but a first access node may include a plurality of antennas. In addition, the RF processing unit 3*l*-10 may include a plurality of RF chains. Moreover, the RF processing unit 3*l*-10 may perform beamforming. For the beamforming, the RF processing unit 3*l*-10 may adjust a phase and a size of each of signals transmitted or received through the plurality of antennas or antenna elements. The RF processing unit may perform a downlink MIMO operation by transmitting one or more layers.

The baseband processing unit 3*l*-20 performs a function of conversion between a baseband signal and a bit string according to a physical layer specification of a first radio access technology. For example, when data is transmitted, the baseband processing unit 3*l*-20 generates complex symbols by encoding and modulating a transmission bit string. Further, when data is received, the baseband processing unit 3*l*-20 reconstructs a reception bit string by demodulating and decoding a baseband signal provided from the RF processing unit 3*l*-10. For example, in accordance with an OFDM scheme, when data is transmitted, the baseband processing unit 3*l*-20 may generate complex symbols by encoding and modulating the transmission bit string, map the complex symbols to subcarriers, and then configure OFDM symbols via an IFFT operation and CP insertion. In addition, when data is received, the baseband processing unit 3*l*-20 divides a baseband signal provided from the RF processing unit 3*l*-10 in units of OFDM symbols, reconstructs signals mapped with sub-carriers through an FFT operation, and then reconstructs a reception bit string through demodulation and decoding. The baseband processing unit 3*l*-20 and the RF processing unit 3*l*-10 transmit and receive a signal as described above. Accordingly, the baseband processing unit 3*l*-20 and the RF processing unit 3*l*-10 may be referred to as a transmission unit, a reception unit, a transmission/reception unit, a communication unit, or a wireless communication unit.

The backhaul communication unit 3*l*-30 provides an interface that performs communication with other nodes within the network. That is, the backhaul communication unit 3*l*-30 converts a bit string transmitted to another node in the main base station, such as an auxiliary base station and a core network, into a physical signal, and converts a physical signal received from the another node into a bit string.

The storage unit 3*l*-40 stores data, such as a basic program, an application program, configuration information, and the like for the operation of the main base station. Particularly, the storage unit 3*l*-40 may store information on a bearer assigned to a connected terminal, a measurement result reported from the connected terminal, and the like. The storage unit 3*l*-40 may store information serving as a criterion for determining whether to provide the terminal with multiple connections or to suspend multiple connections. The storage unit 3*l*-40 provides stored data in response to a request of the control unit 3*l*-50.

The control unit 3*l*-50 controls overall operations of the main base station. For example, the control unit 3*l*-50 transmits or receives a signal via the baseband processing unit 3*l*-20 and the RF processing unit 3*l*-10 or via the backhaul communication unit 3*l*-30. The control unit 3*l*-50 records and reads data in the storage unit 3*l*-40. To this end, the control unit 3*l*-50 may include at least one processor. The control unit 3*l*-50 may further include a multi-connection processing unit 3*l*-52 configured to process a multi-connection.

The embodiments disclosed in the specifications and drawings are provided merely to readily describe and to help a thorough understanding of the disclosure but are not intended to limit the scope of the disclosure. Therefore, it should be construed that, in addition to the embodiments disclosed herein, all modifications and changes or modified and changed forms derived from the technical idea of the disclosure fall within the scope of the disclosure.

What is claimed is:

1. A method performed by a terminal in a wireless communication system, the method comprising:
receiving, from a base station, a radio resource control (RRC) message including information configuring a measurement report for an uplink packet data convergence protocol (PDCP) packet delay per data radio bearer (DRB), wherein the information includes a list of DRBs to be measured and an uplink packet for a quality of service (QoS) flow is mapped to a DRB at a service data adaptation protocol (SDAP) layer;
performing a measurement of the uplink PDCP packet delay for each DRB in the list of DRBs based on the information, wherein the uplink PDCP packet delay for each DRB is measured based on a delay from an uplink packet arrival at a PDCP upper service access point (SAP) until a transmission of an uplink packet is available; and transmitting, to the base station, a result of the measurement based on the information.

2. The method of claim 1,
wherein the measurement is performed by a PDCP layer of the terminal, and
wherein the result includes at least one measured uplink PDCP packet delay for a DRB from the list of the DRBs.

3. The method of claim 1,
wherein an uplink PDCP packet delay for a QoS flow is obtained based on the uplink PDCP packet delay for each DRB.

4. The method of claim 1, further comprising:
mapping the uplink packet for the QoS flow to the DRB in the list of DRBs at the SDAP layer of the terminal; and
submitting the uplink packet for the QoS flow to the PDCP upper SAP from the SDAP layer of the terminal.

5. A terminal in a wireless communication system, the terminal comprising:
a transceiver configured to transmit and receive a signal; and
a controller coupled with the transceiver and configured to:
receive, from a base station, a radio resource control (RRC) message including information configuring a measurement report for an uplink packet data convergence protocol (PDCP) packet delay per data radio bearer (DRB), wherein the information includes a list of DRB s to be measured and an uplink packet for a quality of service (QoS) flow is mapped to a DRB at a service data adaptation protocol (SDAP) layer,
perform a measurement of the uplink PDCP packet delay for each DRB in the list of DRBs based on the information, wherein the uplink PDCP packet delay for each DRB is measured based on a delay from an uplink packet arrival at a PDCP upper service access point (SAP) until a transmission of an uplink packet is available; and
transmit, to the base station, a result of the measurement based on the information.

6. The terminal of claim 5,
wherein the measurement is performed by a PDCP layer of the terminal, and
wherein the result includes at least one measured uplink PDCP packet delay for a DRB from the list of the DRBs.

7. The terminal of claim 5,
wherein an uplink PDCP packet delay for a QoS flow is obtained based on the uplink PDCP packet delay for each DRB.

8. The terminal of claim 5, the controller is further configured to:
map the uplink packet for the QoS flow to the DRB in the list of DRBs at the SDAP layer of the terminal; and
submit the uplink packet for the QoS flow to the PDCP upper SAP from the SDAP layer of the terminal.

9. A method performed by a base station in a wireless communication system, the method comprising:
transmitting, to a terminal, a radio resource control (RRC) message including information configuring a measurement report for an uplink packet data convergence protocol (PDCP) packet delay per data radio bearer (DRB), the information including a list of DRBs to be measured; and receiving, from the terminal, a result of a measurement of the uplink PDCP packet delay for each DRB in the list of DRBs based on the information,
wherein an uplink packet for a quality of service (QoS) flow is mapped to a DRB at a service data adaptation protocol (SDAP) layer, and
wherein the uplink PDCP packet delay for each DRB is measured based on a delay from an uplink packet arrival at a PDCP upper service access point (SAP) until a transmission of an uplink packet is available.

10. The method of claim 9,
wherein the measurement is performed by a PDCP layer of the terminal, and
wherein the result includes at least one measured uplink PDCP packet delay for a DRB from the list of the DRBs.

11. The method of claim 9,
wherein an uplink PDCP packet delay for a QoS flow is obtained based on the uplink PDCP packet delay for each DRB.

12. The method of claim 9,
wherein the uplink packet for the QoS flow is mapped to the DRB in the list of DRBs at the SDAP layer of the terminal, and
wherein the uplink packet for the QoS flow is submitted to the PDCP upper SAP from the SDAP layer of the terminal.

13. A base station in a wireless communication system, the base station comprising:
a transceiver configured to transmit and receive a signal; and
a controller coupled with the transceiver and configured to:
transmit, to a terminal, a radio resource control (RRC) message including information configuring a measurement report for an uplink packet data convergence protocol (PDCP) packet delay per data radio bearer (DRB), the information including a list of DRBs to be measured; and
receive, from the terminal, a result of a measurement of the uplink PDCP packet delay for each DRB in the list of DRBs performed based on the information,
wherein an uplink packet for a quality of service (QoS) flow is mapped to a DRB at a service data adaptation protocol (SDAP) layer, and
wherein the uplink PDCP packet delay for each DRB is measured based on a delay from an uplink packet arrival at a PDCP upper service access point (SAP) until a transmission of an uplink packet is available.

14. The base station of claim 13, wherein the measurement is performed by a PDCP layer of the terminal, and
wherein the result includes at least one measured uplink PDCP packet delay for a DRB from the list of the DRBs.

15. The base station of claim 13, wherein an uplink PDCP packet delay for a QoS flow is obtained based on the uplink PDCP packet delay for each the DRB.

16. The base station of claim 13, wherein the uplink packet for the QoS flow is mapped to the DRB in the list of DRBs at the SDAP layer of the terminal, and wherein the uplink packet for the QoS flow is submitted to the PDCP upper SAP from the SDAP layer of the terminal.

* * * * *